US012719754B2

(12) United States Patent
Bai et al.

(10) Patent No.: US 12,719,754 B2
(45) Date of Patent: Aug. 25, 2026

(54) RADIO RESOURCE PLANNING AND SLICE-AWARE SCHEDULING FOR INTELLIGENT RADIO ACCESS NETWORK SLICING

(71) Applicant: Intel Corporation, Santa Clara, CA (US)

(72) Inventors: Jingwen Bai, San Jose, CA (US); Shu-ping Yeh, Campbell, CA (US); Shilpa Talwar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 18/550,387

(22) PCT Filed: Jun. 30, 2022

(86) PCT No.: PCT/US2022/035759
§ 371 (c)(1),
(2) Date: Sep. 13, 2023

(87) PCT Pub. No.: WO2023/283102
PCT Pub. Date: Jan. 12, 2023

(65) Prior Publication Data

US 2024/0305533 A1 Sep. 12, 2024

Related U.S. Application Data

(60) Provisional application No. 63/219,631, filed on Jul. 8, 2021.

(51) Int. Cl.
*H04L 41/0895* (2022.01)
*H04L 41/5009* (2022.01)
(Continued)

(52) U.S. Cl.
CPC ...... *H04L 41/0895* (2022.05); *H04L 41/5009* (2013.01); *H04W 24/08* (2013.01); *H04W 72/11* (2023.01); *H04W 72/115* (2023.01)

(58) Field of Classification Search
CPC ........... H04L 41/0895; H04L 41/5009; H04W 24/08; H04W 72/11; H04W 72/115
See application file for complete search history.

(56) References Cited

U.S. PATENT DOCUMENTS

2019/0335366 A1* 10/2019 Jin ........................ H04W 48/18
2020/0267753 A1* 8/2020 Adjakple .............. H04W 72/54
(Continued)

FOREIGN PATENT DOCUMENTS

CN 109743213 A * 5/2019 ............. H04L 41/40
EP 4210376 A1 * 7/2023 ......... H04L 41/5025
WO WO 2021-048831 A1 3/2021

OTHER PUBLICATIONS

International Search Report and Written Opinion mailed Oct. 27, 2022 for International Patent Application No. PCT/US2022/035759, 13 pages.
(Continued)

*Primary Examiner* — Kenny S Lin
(74) *Attorney, Agent, or Firm* — Essential Patents Group, LLP; Christopher K. Gagne

(57) ABSTRACT

The present disclosure provides a resilient (radio) access network ((R)AN) slicing framework encompassing a resource planning engine and distributed dynamic slice-aware scheduling modules at one or more network access nodes, edge compute nodes, or cloud computing service. The resilient (R)AN slicing framework includes resource planning and slice-aware scheduling, as well as signaling exchanges for provisioning resilient (R)AN slicing. The intelligent (R)AN slicing framework can realize resource
(Continued)

isolation in a more efficient and agile manner than existing network slicing technologies.

13 Claims, 13 Drawing Sheets

(51) Int. Cl.

| | |
|---|---|
| ***H04W 24/08*** | (2009.01) |
| ***H04W 72/11*** | (2023.01) |
| ***H04W 72/115*** | (2023.01) |

(56) References Cited

U.S. PATENT DOCUMENTS

| | | | | |
|---|---|---|---|---|
| 2020/0367109 | A1* | 11/2020 | Chen | H04W 28/18 |
| 2021/0160333 | A1 | 5/2021 | Wang | |
| 2021/0160763 | A1 | 5/2021 | Lou et al. | |
| 2021/0297876 | A1* | 9/2021 | Bellamkonda | G06N 20/00 |
| 2021/0320878 | A1* | 10/2021 | Young | H04L 47/283 |
| 2022/0124560 | A1* | 4/2022 | Yeh | H04W 28/18 |
| 2022/0201556 | A1* | 6/2022 | Yang | H04W 28/24 |
| 2022/0271992 | A1* | 8/2022 | Verma | H04W 48/18 |
| 2023/0262502 | A1* | 8/2023 | Gautam | H04L 41/145 455/414.1 |
| 2024/0305533 | A1* | 9/2024 | Bai | H04W 24/02 |

OTHER PUBLICATIONS

3GPP, "TSG SA; Management and orchestration; Self-Organizing Networks (SON) for 5G networks (Release 17)", 3GPP TS 28.313 V17.1.0, Jun. 24, 2021, 50 pages.

ETSI, "Zero-touch network and Service Management (ZSM); Requirements based on documented scenarios", ETSI GS ZSM 001 V1.1.1, Oct. 2019, 89 pages.

* cited by examiner 1550
1556
processor 1552
instructions 1581
trusted execution environment 1590
1560
memory 1554
instructions 1582
storage 1558
instructions 1583
output circuitry 1584
input circuitry 1586
acceleration circuitry 1564
1566
1566y
1566x
1566z
network interface 1568
external interface 1570
battery 1526
battery monitor / charger 1528
edge devices 1562
edge cloud 1563
sensors 1572
actuators 1574
pos 1575
power block 1580

RADIO RESOURCE PLANNING AND SLICE-AWARE SCHEDULING FOR INTELLIGENT RADIO ACCESS NETWORK SLICING

RELATED APPLICATIONS

The present application is a national stage entry under 35 U.S.C. § 371 of Int'l App. No. PCT/US2022/035759 filed Jun. 30, 2022 which claims priority under 35 U.S.C. § 119(e) to U.S. Provisional App. No. 63/219,631 filed on Jul. 8, 2021, the contents of each of which are hereby incorporated by reference in their entireties.

TECHNICAL FIELD

The present disclosure is generally relate to edge computing, network communication, communication system implementations, artificial intelligence (AI) and machine learning (ML), and in particular, to AI/ML techniques for managing traffic in multi-access communications networks.

BACKGROUND

In order to fulfill diverse communication requirements for different industry segments, mobile network operators (MNOs) have adopted network slicing, which allows multiple logical and virtualized networks to run on a common physical infrastructure. Network slicing requires careful design to ensure each network slice fulfils their negotiated service level agreements (SLAs) and to provision network resources (e.g., radio resources, and the like) in a resource efficient manner.

There are naïve network slicing resource management approaches that allocate dedicated radio resource for a network slice. However, the naïve network slicing resource management approaches tend to over-provision (e.g., waste) network and/or radio resources for network slices. In addition, naïve network slicing resource management approaches cannot provide good performance guarantees for network reliability. At present, there are no existing resource management solutions to ensure resilient network slicing provisioning.

Additionally, network slicing can be realized by hard physical resource isolation (e.g., dedicated base stations or dedicated radio units for a particular slice). There are also research works proposing powerful scheduling algorithms to achieve network slicing resource isolation. However, the resource utilization efficiency for hard physical resource isolation is low. More physical resources usually need to be provisioned to meet SLA requirements. Furthermore, pure scheduler-based slicing resource isolation can be very compute intensive.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
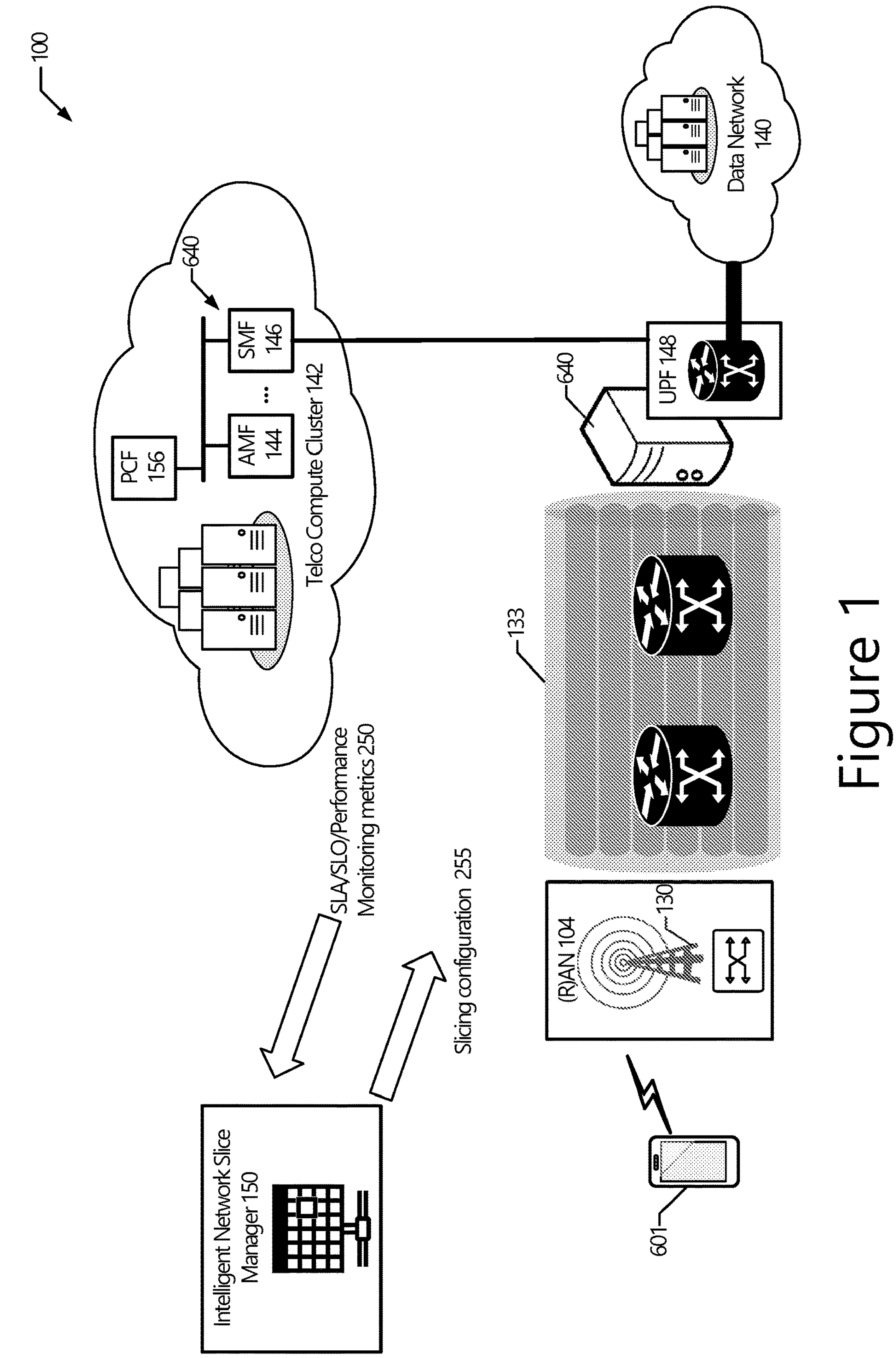
FIG. 1 depicts an example network slicing network architecture.

The present disclosure provides a framework that involves an intelligent resource planning engine and slice-aware radio resource scheduling module, signaling, and measurements to support this framework and algorithms for resource planning and slice-aware scheduling. In particular, a RAN slicing framework is described that encompasses a resource planning engine and distributed dynamic slice-aware scheduling modules at a NAN (e.g., DU). Algorithms for resource planning and slice-aware scheduling and signaling exchanges for the RAN slicing framework are also provided. This intelligent RAN slicing framework can provide more efficient and flexible resource allocation for slices with diverse SLA/QoS requirement. With resource allocation guidance provided for each network slice, the complexity (and thus, resource consumption) for slice-aware scheduler can be greatly reduced. The various example implementations discussed herein may be included in future specifications/standards published by industrial alliance such as [O-RAN], [ISEO], 3GPP, ETSI, and/or the like. In addition, the embodiments herein can include message exchanges between edge/cloud server(s)/node(s) and RAN nodes. In one example, the slice-aware scheduler discussed herein can be implemented as part of Intel® FlexRAN reference code.

1. Network Slicing Management Aspects

Edge computing technologies (ECTs) are emerging technologies that provide intelligence at the network's edge to address the need of latency-sensitive applications, such as gaming, autonomous driving, and factory automation, and the like. One such emerging ECT is ETSI Multi-access Edge Computing (MEC) (see e.g., [MEC]). ECTs offer a more efficient compute-offload model by placing distributed computing and storage resources in proximity to data providers and consumers. As more and more client devices (e.g., UEs 821, 811 of FIG. 8) are equipped with multiple radio interfaces, and can access multiple radio access networks (RANs) (see e.g., RANs including one or more NANs 831-833 of FIG. 8) using multiple types of radio access technologies (RATs) (e.g., 5G/NR, LTE, WiFi, LoRa, and/or the like). There has been increasing interest to establish multiple concurrent connections between multi-radio devices and the network for enhanced bandwidth and reliability.

A network slice is a logical network topology including a set of nodes, and connections between the set of nodes, using a set of shared or dedicated set of compute and/or network resources that are used to satisfy one or more SLAs and/or service level objectives (SLOs). As examples, an SLA may define or specify a type of service to be provided (e.g., a description, policy specification, or other data structure of the type of service and any additional details of type of service to be provided such as operation and maintenance of networking equipment, connection bandwidth to be provided, and/or the like); the service's desired performance level, especially its reliability and responsiveness (e.g., a reliable service will be the one that suffers minimum disruption in a specific amount of time and is available at almost all times; a service with good responsiveness will perform the desired action promptly after the customer requests it); monitoring process and service level reporting (e.g., a description, policy specification, or other data structure of how performance levels are supervised and monitored; this process involves gathering different type of statistics, how frequently these statistics will be collected and how they will be accessed by the customers); steps for reporting issues with the service (e.g., a description, policy specification, or other data structure of how and where to report detected problems and the order in which details about detected issues have to be reported, a time range in which the problems will be looked into and when the issues will be resolved); and/or response and issue resolution time-frame (e.g., a description, policy specification, or other data structure of a response time-frame is the time period by which the service provider will start the investigation of the issue. Issue resolution time-frame is the time period by which the current service issue will be resolved and fixed.); and/or repercussions for service provider not meeting its commitment (e.g., a description, policy specification, or other data structure of consequences or actions to be taken if the service provider is not able to meet the requirements as stated in SLA. These consequences may include customer's right to terminate the contract or ask for a refund for losses incurred by the customer due to failure of service.

Additionally or alternatively, a network slice may combine the connectivity resource requirements and associated network behaviors (e.g., bandwidth, latency, jitter, network functions (NFs), and/or the like) with other resource behaviors (e.g., compute and storage availability). For purposes of the present disclosure, a network slice may be independent of the (radio) access technologies ((R)ATs) used in the underlay network. Additionally or alternatively, an individual network slice may be sliced into multiple network slices (e.g., "sub-network slices" or "sub-slices"), which may be combined hierarchically and/or combined sequentially so that various different networks can each be sliced and the network slices placed into a sequence to provide an end-to-end (e2e) service (see e.g., [TS23501]).

Network slicing creates independent logical and/or virtual channels with characteristics and capabilities tailored to different application, service, user, and/or network requirements while sharing a common network infrastructure and/or virtualization infrastructure. Software Defined Networking (SDN), Network Function Virtualization (NFV), orchestration, analytics, and automation, allow mobile network operators (MNOs) to create network slices that can support specific instances, applications, services, users (or sets of users), and/or networks. Network slices can span multiple network domains, including access, core, and transport, and be deployed across MNOs and/or other service providers. Each network slice is specified with a pre-negotiated SLAs that defines the resource constraints and e2e network performance requirements for the slice. An SLA may be defined or otherwise specified in terms of one or more SLOs, which in turn, may be defined or otherwise specified in terms of one or more service level indicators (SLIs). Provisioning for a network slice involves resource configuration for various parts of the network (e.g., as illustrated in FIG. 1) in order to meet the service requirements (e.g., SLAs, SLOs, and/or the like).

Existing network slicing orchestration and/or management systems assume that network slices are technology-agnostic, where network slice realization is selected based upon multiple considerations including its service requirements and the capabilities of the underlying network. Additionally, the existing network slicing orchestration systems also assumes that the underlying network is capable of changing the configurations of the network devices on demand through, for example, in-band signaling or via controller(s) and fulfilling all or some of SLOs and/or service level expectations (SLEs) to all of the traffic in the slice or to specific flows. These assumptions make it difficult to provide reliable and/or resilient network slices.

The present disclosure provides a resilient (radio) access network ((R)AN) slicing framework encompassing a resource planning engine and distributed dynamic slice-aware scheduling modules at one or more network access nodes (NANs) (e.g., base stations (BS), access points (APs), distributed units (DUs), and/or the like), edge compute nodes, and/or cloud computing clusters. The resilient (R)AN slicing framework includes resource planning and slice-aware scheduling, as well as signaling exchanges for provisioning resilient (R)AN slicing. The signaling exchanges for provisioning resilient (R)AN slicing can include, for example, signaling and/or message exchanges between one or more NANs and one or more edge compute nodes. Such signaling and/or message exchanges (including message formats and the like) can be specified by suitable network management API and/or standards or specification such as 3GPP standards (e.g., [SA6Edge], [TS23501], and/or the like), ETSI standards (e.g., [MEC]), Open RAN (O-RAN) (see e.g., [O-RAN]), Intel® Smart Edge Open framework (e.g., [ISEO]), and/or any other suitable specifications/standards. The intelligent (R)AN slicing framework can realize resource isolation in a more efficient and agile manner than existing network slicing technologies. In addition, by incorporating reliability target in slice provisioning process, better service guarantees can be achieved with more efficient resource allocation than can be provided by existing solutions.

FIG. 1 depicts an example network slicing network architecture 100 including core, transport and (R)AN configuration and slicing options. In the (R)AN 104, a (R)AN slice is part of a network slice created and/or deployed to provide appropriate resources at the (R)AN 104 for application and/or service requirements (e.g., SLAs, SLOs, and/or the like). Depending on implementation, use case, and/or SLAs, some or all aspects of a (R)AN slice can be shared with other (R)AN slices, or dedicated/exclusive to a particular MNO or set of subscribers.

The network slicing network architecture 100 includes an Intelligent Network Slice Manager (INSM) 150 (also referred to as "slice manager 150", "slice-aware scheduler 150", "resource planning engine 150", or the like), which collects network performance measurements/metrics 250 (also referred to as "SLA metrics 250", "SLO metrics 255", and/or the like) and updates network configurations 255 (e.g., "slicing configurations 255") according to app/service requirements for network slices and observation of network performance. The INSM 150 allocates radio resources as per slice requirements and/or predetermined or negotiated SLAs. This includes an initial deployment and for recovery purposes. Additionally or alternatively, different network slices can be grouped according to resiliency levels and/or priority levels. To serve multiple service consumers and/or multiple slices, INSM 150 includes or operates one or more sophisticated scheduling functions to meet competing and conflicting needs of different slice consumers, subscribers, deployment scenarios, and/or use cases such as, for example, enhanced mobile broadband (eMBB), ultra-reliable low latency communications (URLLC), industrial Internet of Things (IIoT), and/or the like. In one example, the INSM 150 may provide differentiated handling of data traffic or traffic flows by creating or instantiating different user plane and/or control plane functions to serve individual slices in a dedicated fashion.

The INSM 150 may encompass one or more (or a collection of) network functions (NFs), such as a Network Slice Admission Control Function (NSACF), Network Slice-specific and SNPN Authentication and Authorization Function (NSSAAF), Network Slice Selection Function (NSSF), Network Slice Management Function (NSMF) or Network Slice Subnet Management Function (NSSMF) defined in 3GPP standards/specifications such as [TS23501] or the like. Additionally or alternatively, the INSM 150 may encompass one or more (or a collection of) other network slice functions such as an IETF Network Slice service provider, IETF Network Slice Controller (NSC), and/or a 5G E2E Network Slice Orchestrator as discussed in Geng et al., "5G End-to-end Network Slice Mapping from the view of Transport Network", IETF Network Working Group, draft-geng-teas-network-slice-mapping-04 (25 Oct. 2021) ("[IETF-Geng]") and Farrel et al., "Framework for IETF Network Slices", IETF Network Working Group, draft-ietf-teas-ietf-network-slices-05 (25 Oct. 2021) ("[IETF-Geng]"), the contents of each of which are hereby incorporated by reference in their entirety.

In some implementations, the INSM 150 is deployed at the (R)AN 104 (e.g., in a central unit (CU) of a CU/DU split architecture (see e.g., [TS38401])), in a network access node (NAN) within (e.g., at or co-located with a Distributed Unit (DU) of a CU/DU split architecture (see e.g., [TS38401])), and/or the like. In some implementations, the INSM 150 is deployed at an edge compute node (e.g., edge compute node 836 in FIG. 8). For example, some or all of the functionalities of the INSM 150 can be implemented as one or multiple xApps located at Near-Real-Time (RT) RAN Intelligent Controller (RIC) and/or one or multiple rApps at Non-RT RIC in O-RAN framework (see e.g., [O-RAN]). Additionally or alternatively, the INSM 150 can be implement as an edge application (app) such as a MEC app operating in a MEC host (see e.g., [MEC]), an Edge Application Server (EAS) and/or Edge Configuration Server (ECS) in a 3GPP edge computing framework (see e.g., [SA6Edge]), or as a management function based on Zero-touch System Management (ZSM) architecture (see e.g., ETSI GS ZSM 001 V1.1.1 (2019-10), ETSI GS ZSM 002 v1.1.1 (2019-08), ETSI GS ZSM 003 v1.1.1 (2021-06) ETSI GS ZSM 009-1 V1.1.1 (2021-06), ETSI GS ZSM 009-2 V1.1.1 (2022-06), ETSI GS ZSM 007 V1.1.1 (2019-08) (collectively referred to as "[ZSM]"), the contents of each of which are hereby incorporated by reference in their entireties). Additionally or alternatively, the INSM 150 can be implement as an ONAP module in the Linux Foundation® Open Network Automation Platform (ONAP) (see e.g., ONAP Architecture, Rev. 9e77fad2 (updated 7 Jun. 2022), https://docs.onap.org/en/latest/guides/onap-developer/architecture/index.html). The INSM 150 concepts described in this disclosure can be applied to any or all of the aforementioned frameworks.

Figure 6:
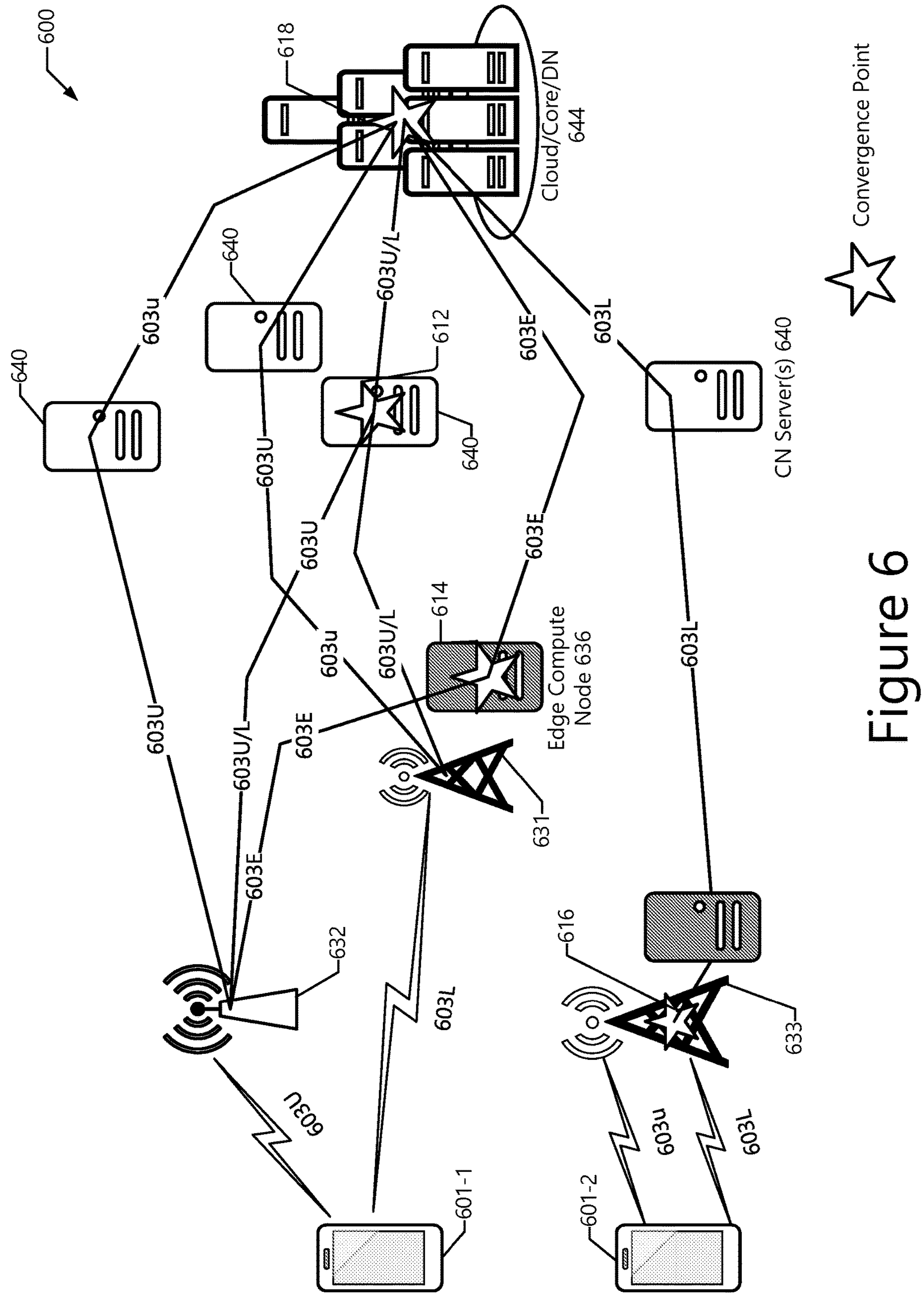
FIG. 6 depicts an example Multi-RAT network with different convergence architectures.
Figure 8:
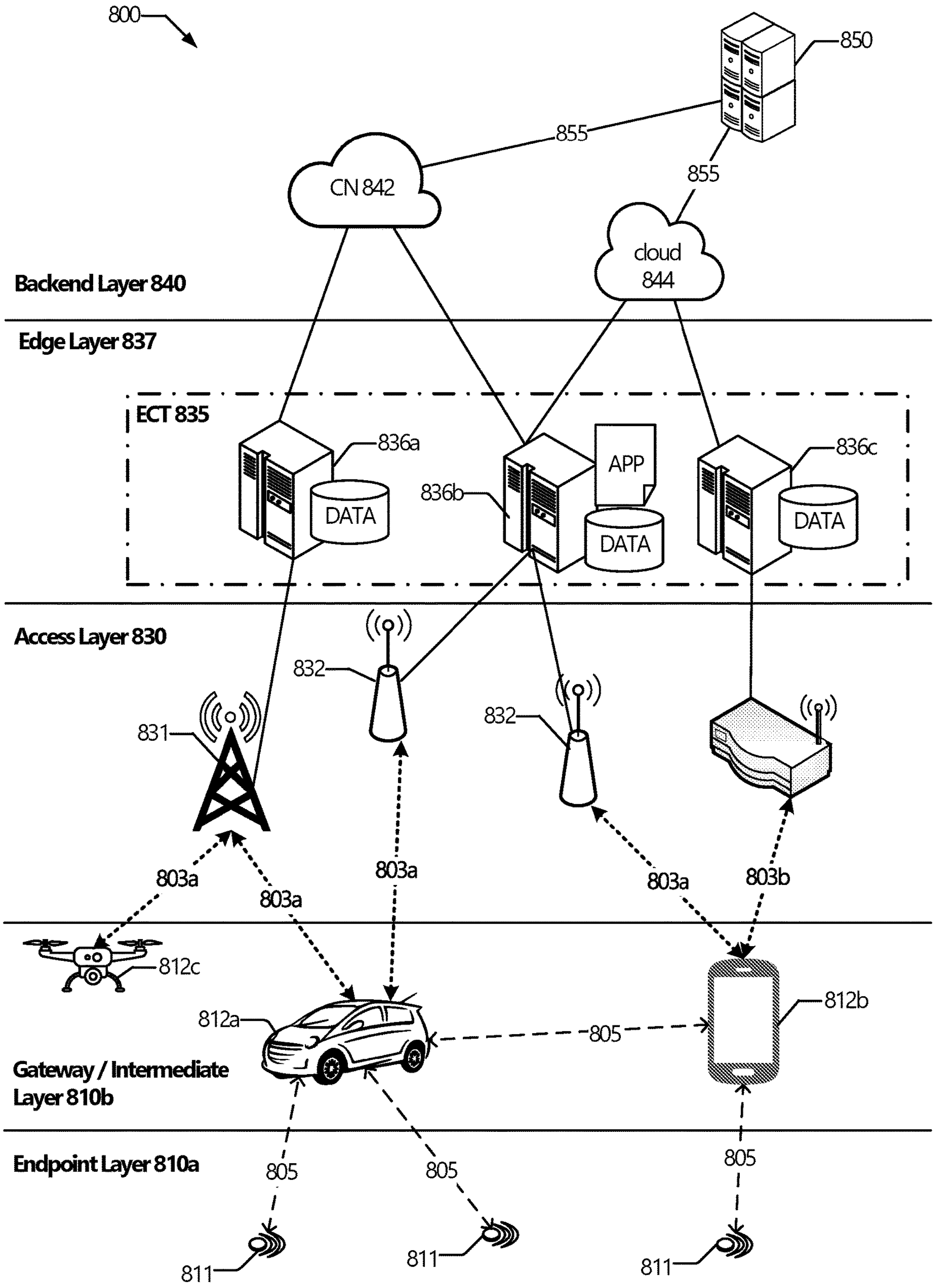
FIG. 8 illustrates an example edge computing environment.

The network slicing network architecture 100 also includes compute node 601 capable of accessing one or multiple (R)ANs 104, each of which may include one or more (R)AN nodes 130 (e.g., NANs 631-633, 831-833 discussed infra with respect to FIGS. 6 and 8). The compute node 601 may be the same or similar as UEs 821, 811 of FIG. 8. The (R)AN 104 is communicatively coupled with a compute node 640 that hosts a user plane function (UPF) 148 via a transport tunnel 133. The transport tunnel 133 may be embodied using any suitable tunneling protocol(s) and/or tunneling technology including, for example, an IP tunnel, an optical tunnel, and/or the like.

The network slicing network architecture 100 also includes a telecommunications compute cluster 142, which may be a core network (CN) (e.g., CN 842 of FIG. 8 discussed infra) and/or an edge cloud or edge network (e.g., edge computing framework 835 of FIG. 8 discussed infra), which includes various 5G NFs including Access and Mobility Management Function (AMF) 144, a Policy Control Function (PCF) 156, and a Session Management Function (SMF) 146, which is/are communicatively coupled with a UPF 148. Additional aspects of CN 142, 842 are discussed in more detail infra with respect to FIG. 8. The UPF 148 is communicatively coupled with a data network (DN) 140 and the (R)AN 104.

The AMF 144 allows other functions of the CN 142 to communicate with the user equipment (UE) 601 and the (R)AN 631-633 and to subscribe to notifications about mobility events with respect to the UE 601. The AMF 144 is also responsible for registration management (e.g., for registering UE 601), connection management, reachability management, mobility management, lawful interception of AMF-related events, and access authentication and authorization. The AMF 144 provides transport for SM messages between the UE 601 and the SMF 146, and acts as a transparent proxy for routing SM messages. AMF 144 also provides transport for SMS messages between UE 601 and an SMSF. AMF 144 interacts with the AUSF and the UE 601 to perform various security anchor and context management functions. Furthermore, AMF 144 is a termination point of a RAN-CP interface, which includes the N2 reference point between the (R)AN 104, 631-633 and the AMF 144. The AMF 144 is also a termination point of NAS (N1) signaling, and performs NAS ciphering and integrity protection.

AMF 144 also supports NAS signaling with the UE 601 over an N3IWF interface. The N3IWF provides access to untrusted entities. N3IWF may be a termination point for the N2 interface between the (R)AN 104 and the AMF 144 for the control plane, and may be a termination point for the N3 reference point between the (R)AN 104 and the UPF 148 for the user plane. As such, the AMF 144 handles N2 signaling from the SMF 146 and the AMF 144 for PDU sessions and QoS, encapsulate/de-encapsulate packets for IPSec and N3 tunneling, marks N3 user-plane packets in the uplink, and enforces QoS corresponding to N3 packet marking taking into account QoS requirements associated with such marking received over N2. N3IWF may also relay UL and DL control-plane NAS signaling between the UE 601 and AMF 144 via an N1 reference point between the UE 601 and the AMF 144, and relay uplink and downlink user-plane packets between the UE 601 and UPF 148. The N3IWF also provides mechanisms for IPsec tunnel establishment with the UE 601. The AMF 144 may exhibit an Namf service-based interface, and may be a termination point for an N14 reference point between two AMFs 144 and an N17 reference point between the AMF 144 and a 5G-EIR (not shown by FIG. 1).

The SMF 146 is responsible for session management (SM) (e.g., session establishment, tunnel management between UPF 148 and (R)AN 104); UE IP address allocation and management (including optional authorization); selection and control of UP function; configuring traffic steering at UPF 148 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 144 over N2 to (R)AN 104; and determining SSC mode of a session. SM refers to management of a PDU session, and a PDU session or “session” refers to a PDU connectivity service that provides or enables the exchange of PDUs between the UE 601 and the DN 140.

The PCF 156 provides policy rules to control plane functions to enforce them, and may also support unified policy framework to govern network behavior. The PCF 156 may also implement a front end to access subscription information relevant for policy decisions in a UDR of a UDM. In addition to communicating with functions over reference points as shown, the PCF 156 exhibit an Npcf service-based interface.

The CN 142 may enable edge computing by selecting operator/3rd party services to be geographically close to a point that the UE 601 is attached to the network. This may reduce latency and load on the network. In edge computing implementations, the CN 142 may select a UPF 148 close to the UE 601 and execute traffic steering from the UPF 148 to DN 140 via the N6 interface. This may be based on the UE subscription data, UE location, and information provided by an application function (AF), which allows the AF to influence UPF (re)selection and traffic routing.

The data network (DN) 140 may represent various network operator services, Internet access, or third party services that may be provided by one or more servers including, for example, application (app)/content servers. The DN 140 may be an operator external public, a private PDN, or an intra-operator packet data network, for example, for provision of IMS services. In this embodiment, the app server can be coupled to an IMS via an S-CSCF or the I-CSCF. In some implementations, the DN 140 may represent one or more local area DNs (LADNs), which are DNs 140 (or DN names (DNNs)) that is/are accessible by a UE 601 in one or more specific areas. Outside of these specific areas, the UE 601 is not able to access the LADN/DN 140.

The UPF 148 acts as an anchor point for intra-RAT and inter-RAT mobility, an external PDU session point of interconnect to data network 140, and a branching point to support multi-homed PDU session. The UPF 148 also performs packet routing and forwarding, packet inspection, enforces user plane part of policy rules, lawfully intercept packets (UP collection), performs traffic usage reporting, perform QoS handling for a user plane (e.g., packet filtering, gating. UL/DL rate enforcement), performs uplink traffic verification (e.g., SDF-to-QoS flow mapping), transport level packet marking in the uplink and downlink, and performs downlink packet buffering and downlink data notification triggering. UPF 148 may include an uplink classifier to support routing traffic flows to a data network. The UPF 148 also uses network instances and/or network slice instances for traffic detection and routing purposes, for example, for routing data flows/traffic between the DN 140 and the (R)AN 104 and/or UE 601.

Network slices may differ for supported features and network functions optimizations, in which case such Network Slices may have, for example, different Single Network Slice Selection Assistance Information (S-NSSAIs) with different Slice/Service Types (see e.g., clause 5.15.2.1 of [TS23501]). The operator can deploy multiple Network Slices delivering exactly the same features but for different groups of UEs, for example, as they deliver a different committed service and/or because they are dedicated to a customer, in which case such Network Slices may have e.g. different S-NSSAIs with the same Slice/Service Type but different Slice Differentiators (see e.g., clause 5.15.2.1 of [TS23501]). An S-NSSAI identifies a Network Slice. An S-NSSAI includes a Slice/Service type (SST) and a Slice Differentiator (SD). The SST refers to the expected Network Slice behavior in terms of features and services. The SD includes information that complements the Slice/Service type(s) to differentiate amongst multiple Network Slices of the same Slice/Service type. In some implementations, an S-NSSAI may not include an SD. Additionally, an S-NNSAI may be among a set of S-NSSAIs in a Network Slice Selection Assistance Information (NSSAI) data structure. Based on the operator’s operational or deployment needs, a Network Slice instance can be associated with one or more S-NSSAIs, and an S-NSSAI can be associated with one or more Network Slice instances. Additional information about S-NSSAIs are discussed in [TS23501].

The network slicing network architecture 100 includes core, transport, and (R)AN configuration options. The core configurations and/or slicing options include dedicated network functions (NFs), NF placement and/or deployment, and compute and/or memory resource reservation. The transport configurations and/or slicing options include route configuration, bandwidth reservation, hard and/or soft slicing, and tunneling configurations. The (R)AN configurations and/or slicing options include spectrum planning, (R)AN configuration, radio resource allocation and configurations, and the like Ultra-resiliency is an important requirement for networks such as next generation 6G network. Network operators can configure network resources to create network slices with ultra-resilient characteristics. Desired properties for (ultra-) resilient network slices include reliable data transmission (e.g., including transmission with very low packet drop rate and/or guarantee of timely packet delivery); high service availability (e.g., subscribed users can always connect to the network slice service in the slice coverage area); minimum or zero service interruption (e.g., subscribed users should not experience service interruption during handover (HO) or network component failure events); and relatively consistent quality of service (QoS) (e.g., ultra-resilient network slice can offer SLAs with more stringent QoS requirements. Some SLAs may even demand consistent e2e user experience such as, for example, consistent data rate, deterministic latency, and/or the like. In various embodiments, the INSM 150 addresses the following aspects of resilient network slice management problems: network configurations to provide resilient network slices.

1.1. Radio Resource Planning and Slice-Aware Scheduling for Intelligent Ran Slicing Provisioning for a network slice involves resource configuration for every part of the network to meet end-to-end (e2e) service requirements. FIG. 1 shows example configuration options for network slicing from core network, transport network, and radio access network (RAN) perspectives. From the RAN perspective, resource isolation and SLA assurance can be achieved via radio resource planning and RAN configuration. In the present disclosure, a hierarchical framework to control radio resource allocation for SLA assurance is provided.

1.2. Framework

Figure 2:
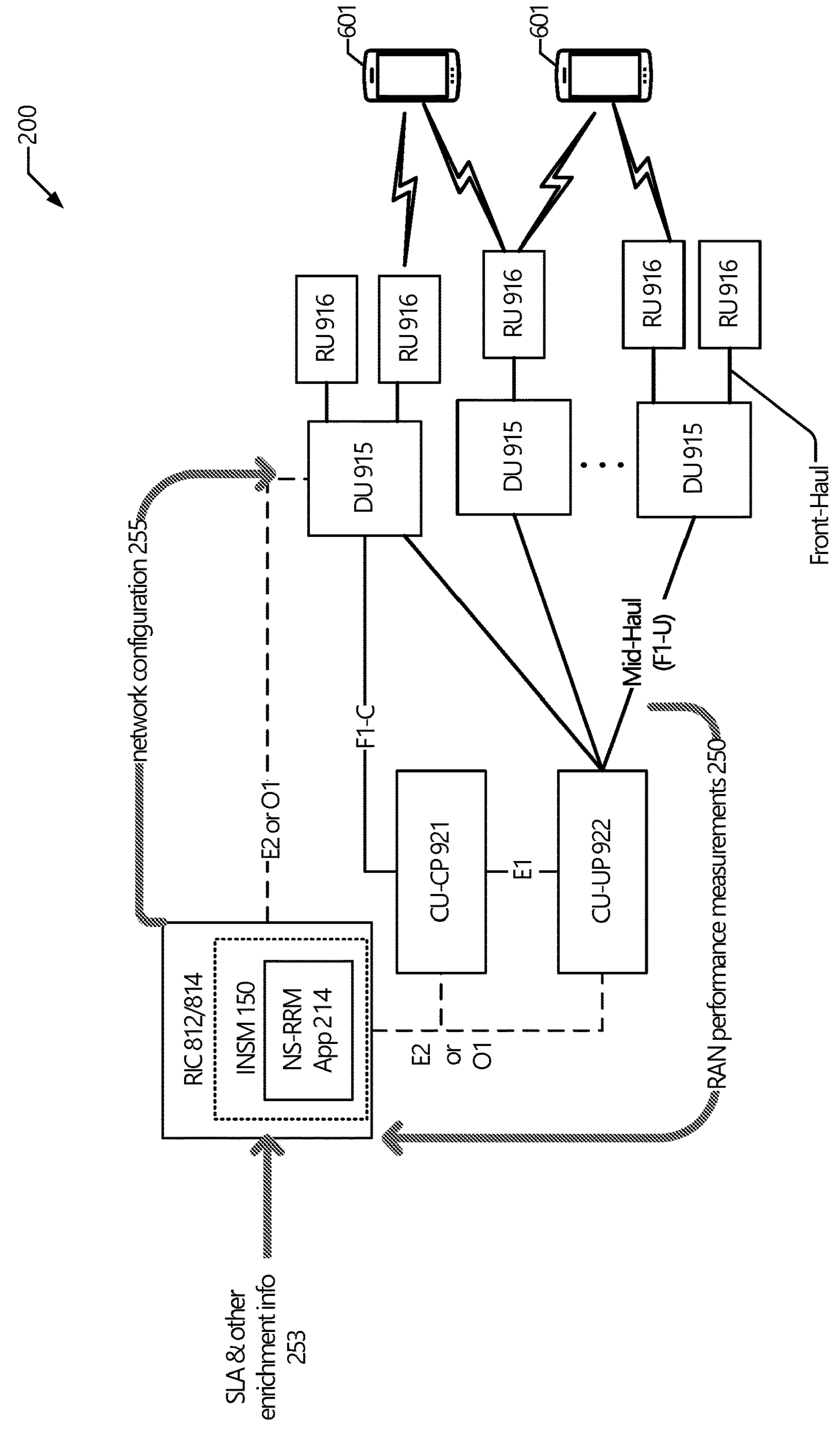
FIG. 2 depicts an Intelligent Network Slicing Framework based on O-RAN architecture.

FIG. 2 illustrates an example intelligent network slicing framework 200 using an O-RAN architecture. Various elements depicted by FIG. 2 are also discussed infra with respect to FIGS. 9-13. The framework 200 includes semi-static radio resource planning done by an INSM 150 and dynamic slice-aware scheduling performed at a medium access control (MAC) layer (e.g., MAC 315 of FIG. 3, discussed infra).

The INSM 150 is a logical network component that collects network performance measurements 250 and updates network configuration 255 (e.g., a per-DU per-Slice radio resource configuration) to one or more DUs 1015 according to service requirements for network slices (e.g., as indicated by SLAs and other enrichment information 253) and observation of network performance (e.g., as indicated by the RAN performance measurement information 250). The INSM 150 can be implemented as one or multiple xApps located at or on a Near-Real-Time (RT) RAN Intelligent Controller (RIC) 914 or rApps at or on a Non-RT RIC 912 in an O-RAN framework (see e.g., FIGS. 9-13 discussed infra). Additionally or alternatively, the INSM 150 can also be implemented as an edge application using a suitable ECT such as, for example, Multi-Access Edge Computing (MEC) framework (see e.g., [MEC]), as a RAN management function based on 3GPP specifications (e.g., [SA6Edge]), the ETSI ZSM architecture (see e.g., [ZSM]), and/or any other suitable ECT such as any of those discussed herein. The present disclosure uses the O-RAN framework as an example, however, other frameworks and implementations can be used.

In various implementations, a MAC scheduling functionality (see e.g., MAC 315 of FIG. 3, discussed infra) is a layer-2 RAN function located in gNB or the DU 1015 in centralized unit (CU)-DU split deployment. For the sake of brevity, the term "DU" covers both CU-DU split deployment and integrated gNB (e.g., CU-DU collocated) deployments. The MAC scheduler 317 dynamically determines which data flow packets should be sent over each physical radio resource block(s) (PRB) based on radio channel condition and QoS requirement for packet queues of different users.

As discussed in more detail infra, the INSM 150 carries out a signaling exchange with the DU 1015, including control actions and performance monitoring feedback. Additionally, a Network Slicing Radio Resource Management (NS-RRM) App 214 is introduced as part of the INSM 150, which calculates or otherwise determines radio allocation rules for each slice at different cells. Moreover, a scheduling algorithm for the MAC scheduler 317 at the DU 1015 incorporates the radio allocation rules for different slices while determining various scheduling decisions.

1.3. Signaling Between the Intelligent Network Slice Manager and DU

Figure 3:
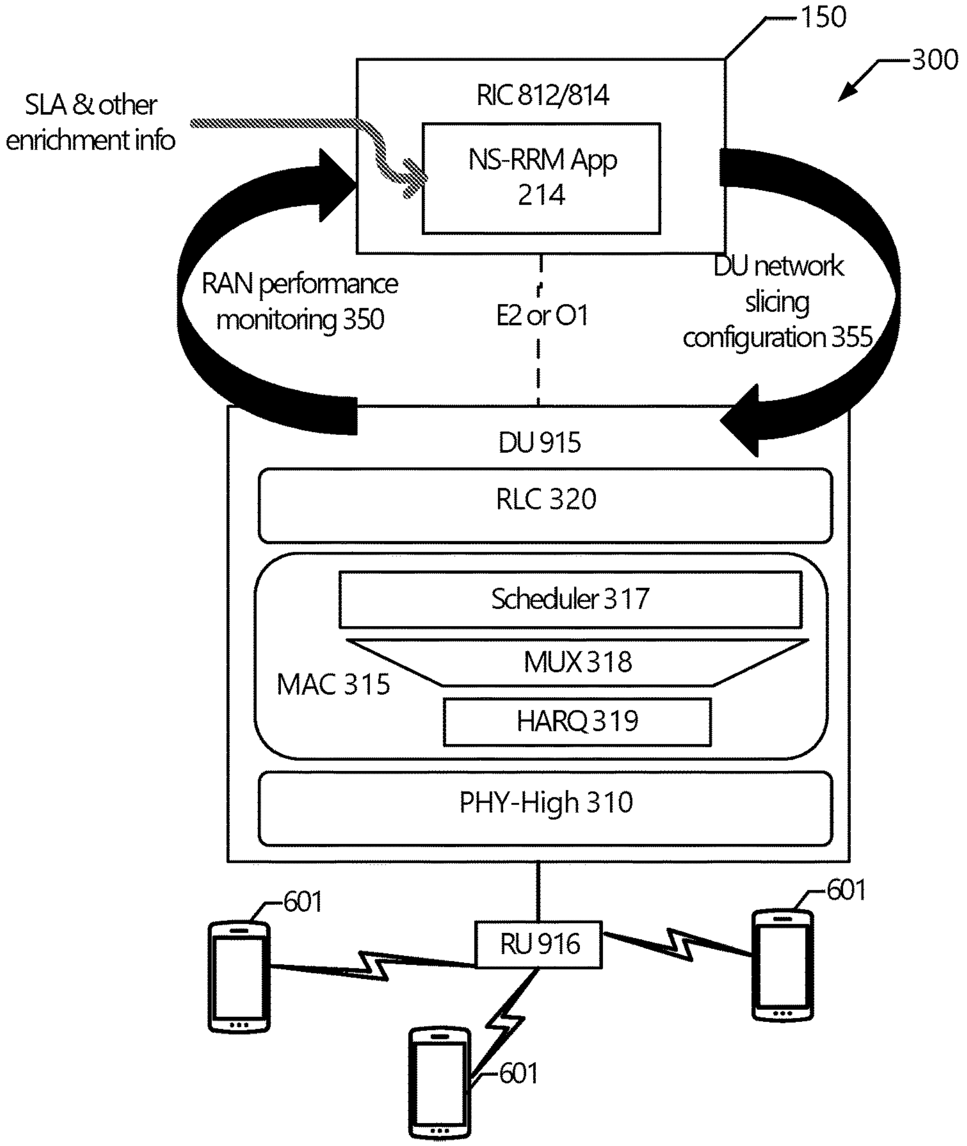
FIG. 3 depicts an example of signaling between RIC and DU.

FIG. 3 shows signaling 300 between the INSM 150 and a DU 1015. In this example, the INSM 150 is on a RIC platform 912/914. The INSM 150 receives RAN performance measurements 250 through RAN performance monitoring signaling 350. As examples, the candidate RAN measurements/metrics 250 include per-flow physical resource blocks (PRB) utilization level measurements, per-UE PHY rate measurements (e.g., CQI and/or the like), slice/DRB traffic volume, latency data (e.g., delay violation rate and/or the like, and throughput data may be conveyed as the performance monitoring data. Additionally or alternatively, any other suitable data may be included in or as the RAN metrics/performance measurements 250 such as any of the measurements/metrics discussed herein. The RAN metrics 250 can be reported via O1 or E2 interfaces defined in O-RAN. For example, the O1 interface can be used if the NS-RRM 214 is at the Non-RT RIC 912 and/or the E2 interface can be used if the NS-RRM 214 is at the Near-RT RIC 914. The RAN metrics 250 can also be reported via the performance monitoring signaling defined in [TS28552], which is hereby incorporated by reference in its entirety. For slice performance Monitoring, the measurements can be collected through polling (e.g., where the slice manager (INSM 150) actively polls for the slice measurement report and/or relevant data), periodic reporting, and/or event-trigger reporting (e.g., QoS/SLA performance falls below certain threshold or based on other criteria and/or conditions).

Once the INSM 150 determines how the RAN configuration should be updated to assure SLA based on RAN measurements, the INSM 150 sends control signaling to instruct DU 1015 to update its configuration. For example, the INSM 150 may send a network slicing configuration to the DU 1015. As examples, the network slicing configuration can include a per-slice radio resource configuration, a slice priority configuration, a slice SLA/QoS target configuration, a special DRB and/or QoS flow handling configuration. The DRB/QoS flow handling configuration may include, for example, packet duplication information, semi-persistent and/or grant free scheduling, and/or the other like information. Additionally or alternatively, the INSM 150 can provide a list of candidates of RAN control actions for SLA assurance in the network slice configuration and/or separately from the network slice configuration. The per-slice radio resource configuration specifies how many PRB can be reserved or prioritized to be used by a network slice for how many time slots. The per slice radio resource configuration can also specifies the maximum amount of PRB that can be utilized by a slice.

The DU slicing configuration 355 may be used to configure one or more protocol elements at the DU 1015, such as the RLC layer 320, the MAC 315, and/or the High-PHY 310 functions. Here, the MAC 315 includes an a scheduler (priority handling) function 317, a multiplexer (MUX) 318, and a hybrid automatic repeat request (HARQ) function 319. One example of the per slice radio resource configuration is the radio resource management (RRM) policy defined in 3GPP TS 28.541 v17.3.0 (2021-06-24) ("[TS28541]"), which is hereby incorporated by reference in its entirety.

Figure 4:
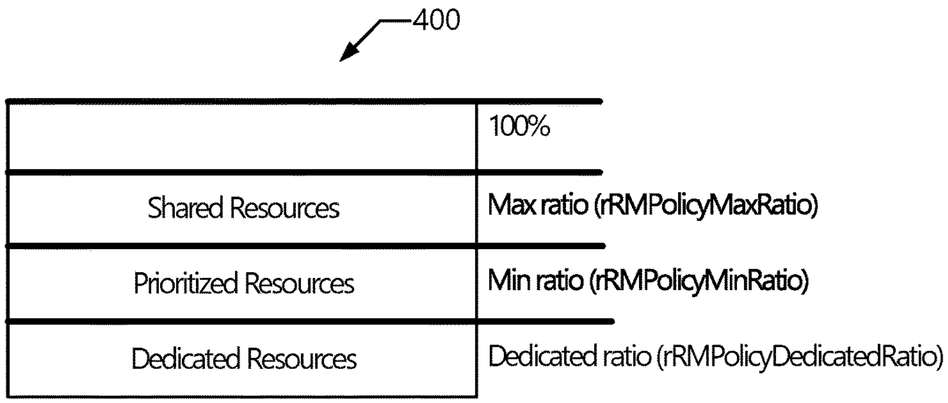
FIG. 4 depicts an example RRM policy.

FIG. 4 shows an example RRM policy 400, which specifies the dedicated ratio, minimum ratio of PRB, and maximum ratio of PRB that can be used by a network slice. The DU 1015 reserves the 'dedicated ratio' of a PRB to be exclusively used by the network slice. The network slice has top priority to utilize the 'prioritized resource' PRB, but those resource can be shared with other traffic flow when there is no more traffic from the network slice to be scheduled. The 'max ratio' specifies the maximum amount of PRB the slice can use.

The RRM policy ratio 400 is an Information Object Class (IOC) that represents the properties of RRMPolicyRatio. An IOC is the same or similar to a UML class except that it does not include/define methods or operations. A UML class represents a capability or concept within the system being modelled. Classes have data structure and behavior and relationships to other elements. Other aspects of IOCs and UML are discussed in 3GPP TS 32.156 v16.4.0 (2020-03-27) which is hereby incorporated by reference in its entirety.

RRMPolicyRatio is one realization of abstract RRMPolicy_IOC. RRMPolicyRatio has three attributes, apart from those inherited (DN, resourceType, rRMPolicyMemberList).

The attribute rRMPolicyMaxRatio defines the maximum resource usage quota for the associated rRMPolicyMemberList, including at least one of shared resources, prioritized resources and dedicated resources. The sum of the 'rRMPolicyMaxRatio' values assigned to all RRMPolicyRatio(s) name-contained by same MangedEntity can be greater than 100.

The attribute rRMPolicyMinRatio defines the minimum resource usage quota for the associated RRMPolicyMemberList, including at least one of prioritized resources and dedicated resources, which means the resources quota that need to be guaranteed for use by the associated rRMPolicyMemberList. The sum of the 'rRMPolicyMinRatio' values assigned to all RRMPolicyRatio(s) name-contained by same MangedEntity shall be less or equal 100.

The attribute rRMPolicyDedicatedRatio defines the dedicated resource usage quota for the RRMPolicyMemberList, including dedicated resources. The sum of the 'rRMPolicyDedicatedRatio' values assigned to all RRMPolicyRatio(s) name-contained by same MangedEntity shall be less or equal 100.

The aforementioned resource categories include the following definitional aspects: shared resources, prioritized resources, and dedicated resources. The shared resources means the resources that are shared with other rRMPolicyMemberList(s) (i.e. the rRMPolicyMemberList(s) defined in RRMPolicyRatio(s) name-contained by the same ManagedEntity). The shared resources are not guaranteed for use by the associated rRMPolicyMemberList. The shared resources quota is represented by [rRMPolicyMaxRatio-rRMPolicyMinRatio]. The prioritized resources means the resources are preferentially used by the associated RRMPolicyMemberList.

These resources are guaranteed for use by the associated RRMPolicyMemberList when it needs to use them. When not used, these resources may be used by other rRMPolicyMemberList(s) (i.e. the rRMPolicyMemberList(s) defined in RRMPolicyRatio(s) name-contained by the same ManagedEntity). The prioritized resources quota is represented by [rRMPolicyMinRatio-rRMPolicyDedicatedRatio]. The dedicated resources means the resources are dedicated for use by the associated RRMPolicyMemberList. These resources cannot be shared even if the associated RRMPolicyMember does not use them. The Dedicated resources quota is represented by [rRMPolicyDedicatedRatio]. Additionally or alternatively, the resources shown in FIG. 4 could be reserved or allocated for user and bearer related requests (e.g., a user connection, a PDU session, and/or the like), if the user is entitled to use the allocated resources according the ratios defined previously.

The RRMPolicyRatio IOC includes attributes inherited from RRMPolicy_IOC (see e.g., 3GPP TS 28.622 v17.2.0 (2022-06-16) ("[TS28622]")) and the attributes in Table 1.

TABLE 1

| Attribute name | Support Qualifier | isReadable | isWritable | isInvariant | isNotifyable |
|---|---|---|---|---|---|
| rRMPolicyMaxRatio | M | T | T | F | T |
| rRMPolicyMinRatio | M | T | T | F | T |
| rRMPolicyDedicatedRatio | O | T | T | F | T |

Additionally, the RRMPolicyMember «dataType» represents an RRM Policy member that will be part of a rRMPolicyMemberList. A RRMPolicyMember is defined by its pLMNId (PLMN ID) and sNSSAI (S-NSSAI). The members in a rRMPolicyMemberList is assigned a specific amount of RRM resources based on settings in RRMPolicy_. Attributes of the RRMPolicyMember «dataType» are shown by Table 2 and attribute constraints of the RRMPolicyMember «dataType» are shown by Table 3.

TABLE 2

| Attribute name | Support Qualifier | isReadable | isWritable | isInvariant | isNotifyable |
|---|---|---|---|---|---|
| pLMNId | M | T | T | F | T |
| sNSSAI | CM | T | T | F | T |

TABLE 3

| Name | Definition |
|---|---|
| sNSSAI Support Qualifier | Condition: Network slicing is supported |

The RRMPolicy_ is an IOC that represents the properties of an abstract RRMPolicy. The RRMPolicy_IOC is subclassed to be instantiated. The RRMPolicy_ defines two attributes apart from those inherited from TOP IOC, the resourceType attribute defines type of resource (PRB, PRB in uplink, PRB in downlink, RRC connected users, DRB usage and/or the like) and the rRMPolicyMemberList attribute defines the RRMPolicyMember (s) that is subject to this policy. An RRM resource (defined in resourceType attribute) is located in NRCellDU, NRCellCU, GNBDU-Function, GNBCUCPFunction or in GNBCUUPFunction. The RRMPolicyRatio IOC is one realization of a RRMPolicy_IOC (see e.g., the inheritance in FIG. 4.2.1.2-1 of [TS28541]). This RRM framework allows adding new policies, both standardized or as vendor specific, by inheriting from the abstract RRMPolicy_ IOG. The RRMPolicy_IOC can have the attributes shown in Table 4, apart from those inherited from TOP IOC (see e.g., [TS28622]).

TABLE 4

| Attribute name | Support Qualifier | isReadable | isWritable | isInvariant | isNotifyable |
|---|---|---|---|---|---|
| resourceType | M | T | T | F | T |
| rRMPolicyMemberList | M | T | T | F | T |

Additionally, the RRMPolicyManagedEntity «ProxyClass» represents an «IOC»NRCellCU, or an «IOC»NRCellDU or an «IOC»GNBCUUPFunction, or an «IOC»GNBCUCPFunction, or an «IOC»GNBDUFunction. If «IOC»NRCellCU is used, which means that a RRMPolicy shall be applied to an RRM resource in the NRCellCU. The possible RRM resource(s) owned by NRCellCU is defined in the resourceType attribute. If «IOC»NRCellDU is used, which means that a RRMPolicy shall be applied to an RRM resource in the NRCellDU. The possible RRM resource(s) owned by NRCellDU is defined in the resourceType attribute. If «IOC»GNBCUUPFunction is used, which means that a RRMPolicy shall be applied to an RRM resource in the GNBCUUPFunction. The possible RRM resource(s) owned by GNBCUUPFunction is defined in the resourceType attribute. If «IOC»GNBCUCPFunction is used, which means that a RRMPolicy shall be applied to an RRM resource in the GNBCUCPFunction. The possible RRM resource(s) owned by GNBCUCPFunction is defined in the resourceType attribute. If «IOC»GNBDUFunction is used, which means that a RRMPolicy shall be applied to an RRM resource in the GNBDUFunction. The possible RRM resource(s) owned by GNBDUFunction is defined in the resourceType attribute.

The GNBDUFunction IOC, together with GNBCUCPFunction IOC and GNBCUUPFunction IOC, provide the management of gNB defined in clause 6.1.1 in [TS38401] for non-split NG-RAN deployment scenarios. For 2-split and 3-split NG-RAN architecture, this IOC provides the management representation of gNB-DU defined in clause 6.1.1 in [TS38401]. The table in section 4.3.1.1 of [TS28541] identifies the necessary end points required for the representation of gNB and en-gNB, of all deployment scenarios, and the GNBDUFunction IOC includes attributes inherited from ManagedFunction IOC (see e.g., TS [TS28622]) and the attributes in section 4.3.1.2 of [TS28541]. Additional attributes of the GNBDUFunction IOC are discussed in section 4.4.1 of [TS28541].

The GNBCUCPFunction IOC, together with GNBCUUPFunction IOC and GNBDUFunction IOC, provide the management representation of gNB defined in clause 6.1.1 in [TS38401] for non-split NG-RAN deployment scenarios. For 2-split NG-RAN deployment scenario, the GNBCUCPFunction IOC together with the GNBCUUPFunction IOC provide management representation of the gNB-CU defined in clause 6.1.1 in [TS38401]. For 3-split NG-RAN deployment scenario, the GNBCUCPFunct ion IOC provides management representation of gNB-CU-CP defined in clause 6.1.2 in [TS38401]. The table in section 4.3.2.1 of [TS28541] identifies the necessary end points required for the representation of gNB and en-gNB, of all deployment scenarios, and the GNBCUCPFunction IOC includes attributes inherited from ManagedFunction IOC (see e.g., TS [TS28622]) and the attributes in section 4.3.2.2 of [TS28541] having attribute constraints in section 4.3.2.3 of [TS28541]. Additional attributes of the GNBCUCPFunction IOC are discussed in section 4.4.1 of [TS28541].

The GNBCUUPFunction IOC, together with GNBCUCPFunction IOC and GNBDUFunction IOC, provide the management representation of gNB defined in clause 6.1.1 in [TS38401] for non-split NG-RAN deployment scenarios. For 2-split NG-RAN deployment scenario, this IOC together with GNBCUCPFunction IOC provide management representation of gNB-CU defined in clause 6.1.1 in [TS38401]. For 3-split NG-RAN deployment scenario, this IOC provides management representation of gNB-CU-UP defined in clause 6.1.2 in [TS38401]. The table in section 4.3.3.1 of [TS28541] identifies the necessary end points required for the representation of gNB and en-gNB, of all deployment scenarios, and the GNBCUUPFunction IOC includes attributes inherited from ManagedFunction IOC (see e.g., TS [TS28622]) and the attributes in section 4.3.3.2 of [TS28541] having attribute constraints in section 4.3.3.3 of [TS28541]. Additional attributes of the GNBCUUPFunction IOC are discussed in section 4.4.1 of [TS28541].

The NRCellCU IOC represents the part of NR cell information that is responsible for the management of intercell mobility and neighbour relations via ANR The NRCellCU IOC includes attributes inherited from ManagedFunction IOC (see e.g., TS [TS28622]) and the attributes in section 4.3.4.2 of [TS28541]. Additional attributes of the NRCellCU IOC are discussed in section 4.4.1 of [TS28541].

The NRCellDU IOC represents the part of NR cell information that describes the specific resources instances. An NR cell transmits SS/PBCH block and always requires downlink transmission at a certain carrier frequency with a certain channel bandwidth. Transmission may be performed from multiple sector-carriers using different transmission points, and these may be configured with different carrier frequencies and channel bandwidths, as long as they are aligned to the cell's downlink resource grids as defined in subclause 4.4 in 3GPP TS 38.211 v17.2.0 (2022-06-23). The values of arfcnDL and bSChannelBwDL attributes define the resource grids which each sector-carrier needs to be aligned to (see e.g., subclauses 5.3 and 5.4.2 of 3GPP TS 38.104 v17.5.0 (2022-04-01) for definitions of BS channel bandwidth and NR-ARFCN, respectively). An NR cell requires an uplink in order to provide initial access. In case of TDD, the values of arfcnUL and bSChannelBwUL have to always be set to the same values as for the corresponding DL attributes. For both FDD and TDD, the arfcnUL and bSChannelBwUL define uplink resource grids to which each sector-carrier needs to align to. An NR cell can in addition be configured with a supplementary uplink, which has its own arfcnSUL and bSChannelBwSUL, which define resource grids for supplementary uplink sector-carriers. Each of downlink, uplink and supplementary uplink (if configured) need an initial bandwidth part (BWP), which defines resources to be used by UEs during and immediately after initial access. Additional BWPs can be either configured or calculated by gNB internally and be applied to UEs dynamically by gNB based on e.g. UE capability and bandwidth need of each UE. The NRCellDU IOC includes attributes inherited from ManagedFunction IOC (see e.g., TS [TS28622]) and the attributes in section 4.3.5.2 of [TS28541] having attribute constraints in section 4.3.5.3 of [TS28541]. Additional attributes of the NRCellDU IOC are discussed in section 4.4.1 of [TS28541].

Various properties of the attributes of the objects shown and discussed in Table 1, Table 2, Table 3, and Table 4 are shown by Table 5.

TABLE 5

| Attribute Properties | | |
|---|---|---|
| Attribute Name | Documentation and Allowed Values | Properties |
| rRMPolicyMemberList | It represents the list of RRMPolicyMember (s) that the managed object is supporting. A RRMPolicyMember <<dataType>> include the PLMNId <<dataType>> and S-NSSAI <<dataType>>. allowedValues: N/A | type: RRMPolicyMember multiplicity: 1 . . . * isOrdered: False isUnique: True defaultValue: None isNullable: False |
| resourceType | The resource type of interest for an RRM Policy. allowedValues: PRB, PRB UL, PRB DL (for NRCellDU, GNBDUFunction) RRC connected users (for NRCellCU, GNBCUCPFunction) DRB (for GNBCUUPFunction) See NOTE 2and NOTE 4 | type: ENUM multiplicity: 1 isOrdered: N/A isUnique: N/A defaultValue: None isNullable: False |
| sNSSAIList | It represents the list of S-NSSAI the managed object is supporting. The S-NSSAI is defined in 3GPP TS 23.003 v17.6.0 (2022 Jun. 23) ("[TS23003]"). allowedValues: see e.g., [TS23003]. | type: S-NSSAI multiplicity: * isOrdered: False isUnique: True defaultValue: None allowedValues: N/A isNullable: False |
| sST | This attribute specifies the Slice/Service type (SST) of the network slice (see e.g., clause 5.15.2 of [TS23501]). | type: Integer multiplicity: 1 isOrdered: N/A isUnique: N/A defaultValue: None allowedValues: N/A isNullable: False |
| sD | This attribute specifies the Slice Differentiator (SD), which is optional information that complements the slice/service type(s) to differentiate amongst multiple Network Slices (see e.g., clause 5.15.2 of [TS23501]). | type: String multiplicity: 1 isOrdered: N/A is Unique: N/A defaultValue: None allowedValues: N/A isNullable: False |
| rRMPolicyMax Ratio | This attribute specifies the maximum percentage of radio resources that can be used by the associated rRMPolicyMemberList. The maximum percentage of radio resources include at least one of the shared resources, prioritized resources and dedicated resources. The sum of the 'rRMPolicyMaxRatio' values assigned to all RRMPolicyRatio(s) name-contained by same MangedEntity can be greater than 100. Default value: 100 allowedValues: 0:100 | type: Integer multiplicity: 1 isOrdered: N/A isUnique: N/A defaultValue: True allowedValues: N/A isNullable: False |
| rRMPolicyMin Ratio | This attribute specifies the minimum percentage of radio resources that can be used by the associated rRMPolicyMemberList. The minimum percentage of radio resources including at least one of prioritized resources and dedicated resources. The sum of the'rRMPolicyMinRatio' values assigned to all RRMPolicyRatio(s) name-contained by same MangedEntity shall be less or equal 100. Default value: 0 allowedValues: 0:100 NOTE: Void. | type: Integer multiplicity: 1 isOrdered: N/A isUnique: N/A defaultValue: True allowedValues: N/A isNullable: False |

TABLE 5-continued

| Attribute Properties | | |
|---|---|---|
| Attribute Name | Documentation and Allowed Values | Properties |
| rRMPolicyDedicatedRatio | This attribute specifies the percentage of radio resource that dedicatedly used by the associated rRMPolicyMemberList. The sum of the 'rRMPolicyDedicatedRatio' values assigned to all RRMPolicyRatio(s) name-contained by same MangedEntity shall be less or equal 100. Default value: 0 allowed Values: 0:100 | type: Integer multiplicity: 1 isOrdered: N/A isUnique: N/A defaultValue: TRUE allowedValues: N/A isNullable: False |

NOTE 2:
The radio resource can be signaling resources (e.g. RRC connected users) or user plane resources (e.g., PRB, PRB UL, PRB DL, DRB). Different RRM Policy maybe applied for different types of radio resource. E.g., RRMPolicyRatio is used for PRB resource. When the resource type is PRB the policy applies for both uplink and downlink, and 'PRB UL' and 'PRB DL' are not used.
NOTE 4:
A RRM Policy can make use of the defined policy (e.g. RRMPolicyRatio) or a vendor specific RRM Policy.

The INSM 150 can also provide the priority level of a slice and the optimization objective/requirements (e.g., SLA/QoS-target and/or the like) to the DU 1015. For slices requiring ultra-low latency and/or high reliability (e.g., ultra-reliable low latency communications (URLLC)), special DRB handling (e.g., packet duplication and/or the like), semi-persistent scheduling, and/or grant-free scheduling, can be configured for traffic that belongs to those slices.

1.4. Network Slicing Radio Resource Management Aspects

Figure 5:
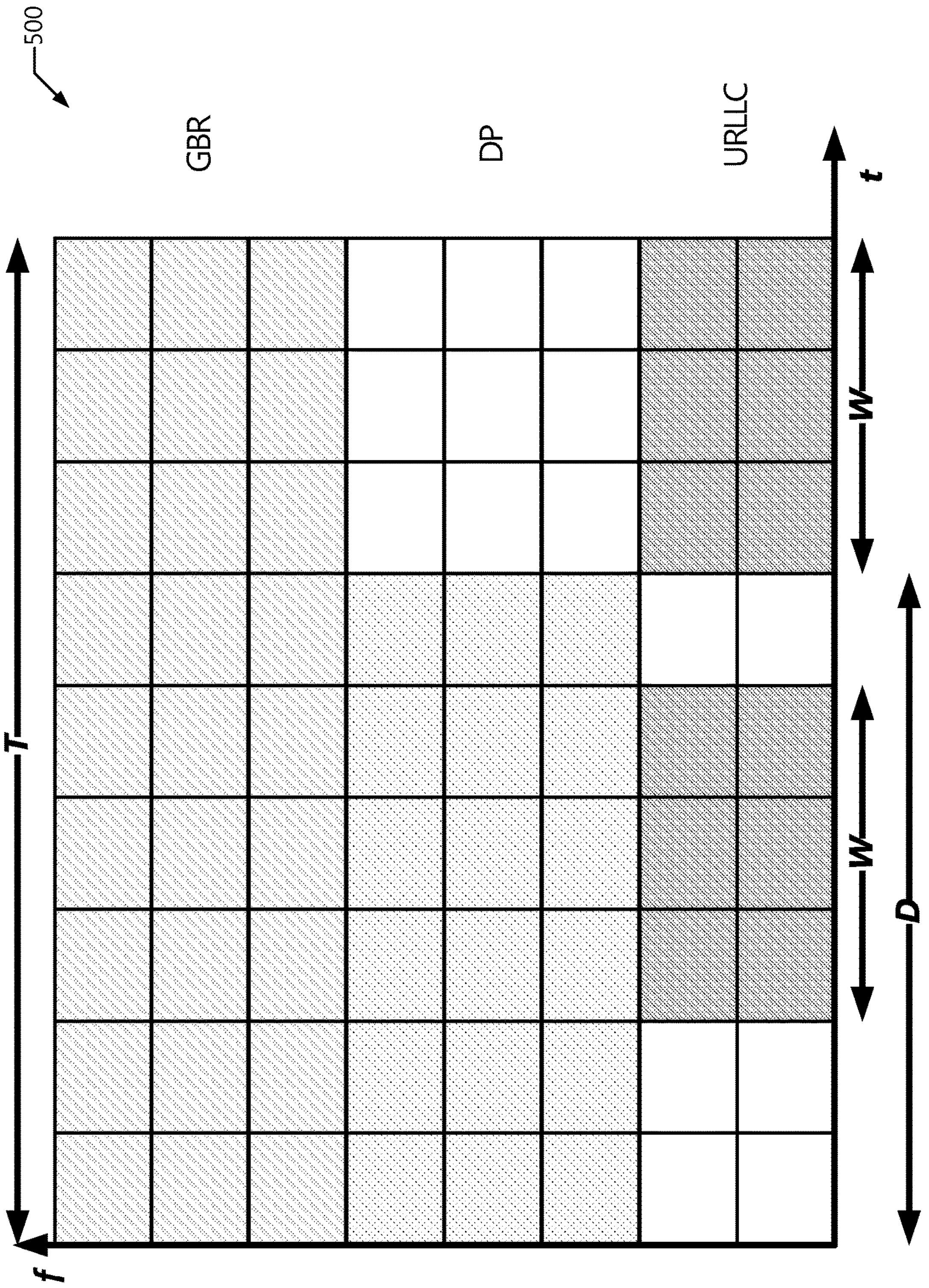
FIG. 5 depicts an example resource ratio and time window.

FIG. 5 shows an example prioritized RB and time window 500. Here, the NS-RRM 214 calculates or otherwise determines a per slice radio resource configuration. Based on the QoS/SLA requirements of each slice and the RAN measurements collected from DU 1015, NS-RRM App determines the amount of required spectrum resources in each slice and time window of each slice. Update and adjustment for resource assignment is done semi-statically to meet the QoS/SLA requirement for each slice.

The resource provisioning algorithms may be different for different types of slices. In various implementations, an action including provisioning of a portion of radio resource to be prioritized for a network slice. Additionally or alternatively, the intelligence includes deriving the required/relevant resource ratio and time window based on one or more of SLA and/or QoS target (e.g., latency bound, QoS class, QoS requirements, reliability target, and/or the like), traffic pattern and/or traffic load estimate, and/or RAN performance estimate (e.g., data rate estimation).

In some implementations, the average rate per resource block (RB) per scheduling unit, $R_{est,i}$, is estimated. In one example, the estimation is based or otherwise involves using a lookup table using metrics such as signal-to-interference-and-noise-ratio (SINR), block error rate (BLER), and/or modulation and coding scheme (MCS) (e.g., (SINR, BLER)→MCS), and then calculating or otherwise determining the rate. In another example, a data driven ML/AI approach is used to create neural network that directly maps (SINR, BLER) to a particular rate. As examples, the ML/AI approach can include the reinforcement learning approach discussed in U.S. application Ser. No. 17/561,948 filed on 25 Dec. 2021 ("['948]"), the contents of which is hereby incorporated by reference in its entirety, and/or any other suitable AI/ML technique, such as any of those discussed herein.

In some implementations, the resource ratio and time window is derived based on the estimated RB per scheduling unit. Examples of how the following different types of slices can be determined are described as follows and illustrated by FIG. 5.

In one example, deterministic periodic traffic (DP) is calculated based on a transmission period $T_p$, payload of P bits, and deadline D according to equation (1).

$$\text{prioritized } RB = \sum_i \text{ceil}\left(\frac{P/D}{R_{esi,i}}\right), \text{ time window} = D \tag{1}$$

In another example, deterministic aperiodic traffic (e.g., URLLC) is calculated based on a payload of P bits, and deadline W, as shown by equation (2).

$$\text{prioritized } RB = \sum_i \text{ceil}\left(\frac{P/W}{R_{esi,i}}\right), \text{ time window} = W \tag{2}$$

In one example, non-deterministic traffic (e.g., guaranteed bit rate (GBR) traffic) is calculated within an allocation period T and a guaranteed bit rate $R_{GBR}$, as shown by equation (3).

$$\text{prioritized } RB = \sum_i \text{ceil}\left(\frac{R_{GBR}}{R_{esi,i}}\right), \text{ time window} = T \tag{3}$$

In equations (1), (2), and (3), the "ceil(x)" is a ceiling function that maps x to the least integer greater than or equal to x. Additionally, the time window indicated by each of equations (1), (2), and (3) is shown in FIG. 5.

The resource provisioning configuration (e.g., prioritized RB and time window 500) can be further fine-tuned based on estimate of network resource utilization level. For example, the time window can be adjusted to compensate the expected queuing delay under certain resource utilization.

1.5. MAC Radio Resource Isolation for Network Slicing

The MAC scheduling 317 determines which data flow(s) to be transmitted over the air for each RB. This procedure dynamically adjusts radio resource allocation to each user to achieve the best performance based on channel condition and the QoS target for the flow. With network slicing, MAC scheduler 317 should be aware of slicing configuration and be able to enforce the slicing related configuration to assure SLA.

Given the prioritized slice resource configuration provided by the INSM 150, the DU 1015 implements slice-aware MAC scheduling 317, which can minimize resource usage while providing SLA guarantee for all the slices served by the network.

There are two approaches to ensure SLA at MAC layer 315. A first approach involves hard slicing wherein dedicated RBs (e.g., non-shareable) are assigned to each slice based on the aforementioned resource provisioning algorithm. A second approach involves RB prioritization and slice-aware scheduler 317 ("soft-slicing") assigning prioritized resources for difference slices (can be shared by others if not used) based on the aforementioned resource provisioning algorithm, and allocate shared resource(s) that can be assigned to all active users.

The detail of such slice-aware scheduler 317 may be as follows. First, the slice-aware scheduler 317 schedules slice-prioritized resources for flows belong to the network slice. Any suitable scheduling/scheduler technique, such as proportional-fair scheduling, can be used to determine which data flow belonging to the network slice should be selected for transmission for each RB within the slice-prioritized radio resources. Second, the slice-aware scheduler 317 schedules shared resource(s) and unused prioritized resource for all remaining flows. Any suitable scheduling technique/scheduler 317 can be used to determine which flow should be selected for transmission (e.g., round robin, first in first out (FIFO), and so forth). In addition, the following enhancement can be implemented: deprioritized GBR traffic, give higher priority to DP, URLLC, and/or BE traffic.

1.5.1. RAN Performance Monitoring

Existing 3GPP framework(s) for (R)AN metric collection, including performance management (see e.g., 3GPP TS 28.550 v17.1.0 (2022-06-16) ("[TS28550]"), 3GPP TS 28.530 v17.2.0 (2021-12-23)("[TS28530]"), and 3GPP TS 32.401 v17.0.0 (2022-04-01) ("[TS32401]"), the contents of each of which are hereby incorporated by reference in their entireties), tracing and UE measurements collected via minimization of drive test (see e.g., 3GPP TS 32.421 v17.3.0 (2021-12-23) ("[TS32421]"), 3GPP TS 37.320 v16.6.0 (2021-09-29) ("[TS37320]"). In addition, O-RAN E2 signaling (see e.g., [O-RAN]) and proprietary signaling can also be used to collect RAN measurements. Examples of the (R)AN measurements that can be collected for assessing SLA violation risk for an (ultra-)resilient network slices include data transmission reliability metrics, service continuity reliability metrics, network condition metrics, and UE condition metrics.

Data transmission reliability metrics include, for example, transport block error rate (e.g., physical layer transmission failure probability), packet loss rate (e.g., ratio of packets that are not successfully delivered), and/or packet drop rate (e.g., ratio of packets dropped due to traffic load, traffic management).

Service continuity reliability metrics include, for example, radio link failure (RLF) rate and/or HO failure (HOF) rate. Additionally or alternatively, the service continuity reliability metrics include traces of reference signal received power (RSRP), reference signal received quality (RSRQ), signal-to-interference-and-noise (SINR) level, and/or beam direction prior to RLF.

Additionally or alternatively, the service continuity reliability metrics include traces of RSRP, RSRQ, SINR and/or beam direction prior to HOF.

Network condition metrics include, for example, radio resource utilization level, number of radio resource control (RRC) connections, a number of RRC connection failures, number of protocol data unit (PDU) sessions, PDU session establishment failure rate, data volume (e.g., total, per slice and per QoS class traffic loading), and/or latency (e.g., average packet delay for all packets, per slice or per QoS class).

UE condition metrics include, for example, wireless channel quality (e.g., reference signal received power (RSRP), reference signal received quality (RSRQ), received signal strength indication (RSSI), channel quality indicator (CQI), and/or the like).

If UE location information is available, measurements from UE can further be correlated with location information to create traces that can be used to predict reliability performance based on UE moving trajectory.

1.6. Multi-Access Technology Aspects

FIG. 6 depicts an example multi-access (MX) network 600 with different convergence points. The MX network 600 includes compute nodes 601 (which may correspond to UEs 821, 811 of FIG. 8), which are computing systems/devices that are capable of obtaining services from the cloud system 644 (which may correspond to cloud 844 of FIG. 8), an edge computing service (which may correspond to edge network 835 of FIG. 8) including the edge compute node 636 (which may correspond to edge compute nodes 836 of FIG. 8), and/or a core network including core network (CN) server(s) 640 (which may correspond to CN 842 of FIG. 8, or individual NFs within the CN 842 of FIG. 8).

MX technology involves, for example, compute nodes 601 that have more than one radio interface that can access one or multiple (radio) access networks ((R)ANs) (e.g., including NANs 631, 632, 633) that may implement different (radio) access technologies ((R)ATs). The rise of ECTs inspires a new MX traffic convergence model (e.g., MX network 600) by placing a new MX convergence point at the edge, an INSM 150 can distribute packets across multiple paths to achieve better quality-of-service (QoS).

The compute nodes 601 are capable of accessing such services using one or more radio access technologies (RATs), which may be the same or different than one another. The network access may include licensed access or unlicensed access. The licensed access is represented by a series of connections/links 603L (e.g., making up respective paths 603L) and the unlicensed access is represented by a series of connections/links 603U (e.g., making up respective paths 603U). The connections 603U/L may be used for either licensed or unlicensed access.

The edge compute node 636 is disposed at an edge of a corresponding access network (e.g., networks provided by NANs 631, 632, 633). The edge compute node 636 is co-located with network access node (NAN) 633 in FIG. 6 (which may be the same or similar as any of NANs 831, 832, 833 of FIG. 8). The edge compute node 636 provides computing resources and/or various services (e.g., computational task and/or workload offloading, cloud-computing capabilities, IT services, and other like resources and/or services as discussed herein) in relatively close proximity to network subscribers (e.g., compute nodes 601 also referred to as "UEs," "edge users," and/or the like). The virtualization infrastructure (VI) of edge compute node 636 provides virtualized environments and virtualized resources for the edge compute node 636, and the edge computing applications may run as VMs and/or application containers on top of the VI. Additionally or alternatively, the edge compute node 636 may be part of an edge cloud and/or an edge computing framework, such as those described herein.

When a compute node 601 has multiple radio interfaces (or multiple communication chips/circuitries), the compute node 601 can transmit and/or receive data through multiple paths. This means that there can be different multi-radio or multi-path convergence points 612, 614, 616, 618 to aggregate and/or distribute traffic between e2e communication link(s). According to various embodiments, when a compute node 601 has multiple radio interfaces, a new multi-radio convergence point 614 can take place at the edge of the network (e.g., at edge server 636 in FIG. 6) to offer multi-path traffic management for low latency communication as envisioned for 3GPP 5G/NR networks (see e.g., ['834], ['969]). With new intelligence enabled by edge-computing, multi-RAT deployments can be utilized more efficiently by cleverly distributing traffic to multiple network paths based on edge measurements.

Algorithms and techniques to optimally leverage such multi-link aggregation may boost both the peak rates as well as the area spectral efficiency in 3GPP NR/5G wireless networks. Smart UE to AP association strategies in multi-RAT HetNets has attracted significant interest from both academia and industry. Most of the work in this area, however, does not leverage UE multi-link aggregation capabilities, and do not account for dynamic distribution of traffic and resource allocation across multiple RATs.

One or more multi-radio convergence technologies may be used. As shown in FIG. 6, the convergence point 616 can be at the NAN 633 in FIG. 6, which may involve a WLAN access point (AP) or a small cell base station. The NAN 633 may operate according to LTE-WiFi Aggregation (LWA) (see e.g., Sirotkin, "LTE-WLAN Aggregation (LWA): Benefits and Deployment Considerations," Intel® White Paper, available at: http://www.intel.com/content/www/us/en/wireless-network/Ite-wlan-aggregation-deplovmient-white-par.html ("[Sirotkin]"), 3GPP TS 36.465 v15.0.0 (2018-06-22), LTE-WLAN Radio Level Integration Using IPsec Tunnel (LWIP) (see e.g., 3GPP TS 36.361 v16.0.0 (2020-07-24) ("[TS36361]")), and Multi-Radio Dual Connectivity (MR-DC)(see e.g., 3GPPIS 37.340 v 16.7.0 (2021-09-27) ("[TS37340]")), at the TCP layer or application layer (see e.g., multi-path TCP (MPTCP) (see e.g., Ford et al, "TCP Extensions for Multipath Operation with Multiple Addresses", Internet Engineering Task Force (IETF) RFC 6824 (January 2013) and IETF Multipath TCP working group, available at: https://datatracker.ietf.org/wg/mptcp/documents/(collectively "[MPTCP]")) and/or Quick UDP (QUIC) (see e.g., Iyengar et al., "QUIC: A UDP-Based Multiplexed and Secure Transport", draft-ietf-quic-transport-27, Standards Track (21 Feb. 2020) ("[QUIC]"), and/or at arbitrary servers within the network via Generic MX (GMA) (see e.g., Zhu et al., "Generic Multi-Access (GMA) Convergence Encapsulation Protocols," IETF INTAREA/Network Working Group, version 12, draft-zhu-intarea-gma-12 (21 Oct. 2021) ("[GMA]"). 3GPP has also defined dual-connectivity solutions to support simultaneous connections to more than one cellular nodes such as LTE eNBs, NR gNBs, and the like (see e.g., [TS37340]).

2. Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes." "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, and/or the like) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, and/or the like) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, and/or the like). The orchestration functions may be used to deploy the isolated user-space instances, identifying and scheduling use of specific hardware, security related functions (e.g., key management, trust anchor management, and/or the like), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, and/or the like), gaming services (e.g., AR/VR, and/or the like), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network.

Examples of such edge computing/networking technologies include Multi-access Edge Computing (MEC); Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

FIG. 8 illustrates an example edge computing environment 800 including different layers of communication, starting from an endpoint layer 810*a* (also referred to as "sensor layer 810*a*", "things layer 810*a*", or the like) including one or more IoT devices 811 (also referred to as "endpoints 810*a*" or the like)(e.g., in an Internet of Things (IoT) network, wireless sensor network (WSN), fog, and/or mesh network topology); increasing in sophistication to intermediate layer 810*b* (also referred to as "client layer 810*b*", "gateway layer 810*b*", or the like) including various user equipment (UEs) 812*a*, 812*b*, and 812*c* (also referred to as "intermediate nodes 810*b*" or the like), which may facilitate the collection and processing of data from endpoints 810*a*; increasing in processing and connectivity sophistication to access layer 830 including a set of network access nodes (NANs) 831, 832, and 833 (collectively referred to as "NANs 830" or the like); increasing in processing and connectivity sophistication to edge layer 837 including a set of edge compute nodes 836*a-c* (collectively referred to as "edge compute nodes 836" or the like) within an edge computing framework 835 (also referred to as "edge computing technology 835", "ECT 835", and/or the like); and increasing in connectivity and processing sophistication to a backend layer 840 including core network (CN) 842, cloud 844, and server(s) 850. The processing at the backend layer 840 may be enhanced by network services as performed by one or more remote servers 850, which may be, or include, one or more CN functions, cloud compute nodes or clusters, application (app) servers, and/or other like systems and/or devices. Some or all of these elements may be equipped with or otherwise implement some or all features and/or functionality discussed herein.

The environment 800 is shown to include end-user devices such as intermediate nodes 810*b* and endpoint nodes 810*a* (collectively referred to as "nodes 810", "UEs 810", or the like), which are configured to connect to (or communicatively couple with) one or more communication networks (also referred to as "access networks," "radio access networks," or the like) based on different access technologies (or "radio access technologies") for accessing application, edge, and/or cloud services. These access networks may include one or more NANs 830, which are arranged to provide network connectivity to the UEs 810 via respective links 803*a* and/or 803*b* (collectively referred to as "channels 803", "links 803", "connections 803", and/or the like) between individual NANs 830 and respective UEs 810.

As examples, the communication networks and/or access technologies may include cellular technology such as LTE, MuLTEfire, and/or NR/5G (e.g., as provided by Radio Access Network (RAN) node 831 and/or RAN nodes 832), WiFi or wireless local area network (WLAN) technologies (e.g., as provided by access point (AP) 833 and/or RAN nodes 832), and/or the like. Different technologies exhibit benefits and limitations in different scenarios, and application performance in different scenarios becomes dependent on the choice of the access networks (e.g., WiFi, LTE, and the like) and the used network and transport protocols (e.g., Transfer Control Protocol (TCP), Virtual Private Network (VPN), Multi-Path TCP (MPTCP), Generic Routing Encapsulation (GRE), and the like).

The intermediate nodes 810*b* include UE 812*a*, UE 812*b*, and UE 812*c* (collectively referred to as "UE 812" or "UEs 812"). In this example, the UE 812*a* is illustrated as a vehicle system (also referred to as a vehicle UE or vehicle station), UE 812*b* is illustrated as a smartphone (e.g., handheld touchscreen mobile computing device connectable to one or more cellular networks), and UE 812*c* is illustrated as a flying drone or unmanned aerial vehicle (UAV). However, the UEs 812 may be any mobile or non-mobile computing device, such as desktop computers, workstations, laptop computers, tablets, wearable devices, PDAs, pagers, wireless handsets smart appliances, single-board computers (SBCs) (e.g., Raspberry Pi, Arduino, Intel Edison, and the like), plug computers, and/or any type of computing device such as any of those discussed herein.

The endpoints 810 include UEs 811, which may be IoT devices (also referred to as "IoT devices 811"), which are uniquely identifiable embedded computing devices (e.g., within the Internet infrastructure) that comprise a network access layer designed for low-power IoT applications utilizing short-lived UE connections. The IoT devices 811 are any physical or virtualized, devices, sensors, or "things" that are embedded with HW and/or SW components that enable the objects, devices, sensors, or "things" capable of capturing and/or recording data associated with an event, and capable of communicating such data with one or more other devices over a network with little or no user intervention. As examples, IoT devices 811 may be abiotic devices such as autonomous sensors, gauges, meters, image capture devices, microphones, light emitting devices, audio emitting devices, audio and/or video playback devices, electro-mechanical devices (e.g., switch, actuator, and the like), EEMS, ECUs, ECMs, embedded systems, microcontrollers, control modules, networked or "smart" appliances, MTC devices, M2M devices, and/or the like. The IoT devices 811 can utilize technologies such as M2M or MTC for exchanging data with an MTC server (e.g., a server 850), an edge server 836 and/or ECT 835, or device via a public land mobile network (PLMN), ProSe or D2D communication, sensor networks, or IoT networks. The M2M or MTC exchange of data may be a machine-initiated exchange of data.

The IoT devices 811 may execute background applications (e.g., keep-alive messages, status updates, and the like) to facilitate the connections of the IoT network. Where the IoT devices 811 are, or are embedded in, sensor devices, the IoT network may be a WSN. An IoT network describes an interconnecting IoT UEs, such as the IoT devices 811 being connected to one another over respective direct links 805. The IoT devices may include any number of different types of devices, grouped in various combinations (referred to as an "IoT group") that may include IoT devices that provide one or more services for a particular user, customer, organizations, and the like. A service provider (e.g., an owner/operator of server(s) 850, CN 842, and/or cloud 844) may deploy the IoT devices in the IoT group to a particular area (e.g., a geolocation, building, and the like) in order to provide the one or more services. In some implementations, the IoT network may be a mesh network of IoT devices 811, which may be termed a fog device, fog system, or fog, operating at the edge of the cloud 844. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 844 to Things (e.g., IoT devices 811). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 830) and/or a central cloud computing service (e.g., cloud 844) for performing heavy computations or computationally burdensome tasks. On the other hand, edge cloud computing consolidates human-operated, voluntary resources, as a cloud. These voluntary resource may include, inter-alia, intermediate nodes 820 and/or endpoints 810, desktop PCs, tablets, smartphones, nano data centers, and the like. In various implementations, resources in the edge cloud may be in one to two-hop proximity to the IoT devices 811, which may result in reducing overhead related to processing data and may reduce network delay.

Additionally or alternatively, the fog may be a consolidation of IoT devices 811 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 844. The fog operating at the edge of the cloud 844 may overlap or be subsumed into an edge network 830 of the cloud 844. The edge network of the cloud 844 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 836 or edge devices). The Fog layer resides on top of the edge layer and is a consolidation of networking devices such as the intermediate nodes 820 and/or endpoints 810 of FIG. 8.

Data may be captured, stored/recorded, and communicated among the IoT devices 811 or, for example, among the intermediate nodes 820 and/or endpoints 810 that have direct links 805 with one another as shown by FIG. 8. Analysis of the traffic flow and control schemes may be implemented by aggregators that are in communication with the IoT devices 811 and each other through a mesh network. The aggregators may be a type of IoT device 811 and/or network appliance. In the example of FIG. 8, the aggregators may be edge nodes 830, or one or more designated intermediate nodes 820 and/or endpoints 810. Data may be uploaded to the cloud 844 via the aggregator, and commands can be received from the cloud 844 through gateway devices that are in communication with the IoT devices 811 and the aggregators through the mesh network.

Unlike the traditional cloud computing model, in some implementations, the cloud 844 may have little or no computational capabilities and only serves as a repository for archiving data recorded and processed by the fog. In these implementations, the cloud 844 centralized data storage system and provides reliability and access to data by the computing resources in the fog and/or edge devices. Being at the core of the architecture, the Data Store of the cloud 844 is accessible by both Edge and Fog layers of the aforementioned edge-fog network.

As mentioned previously, the access networks provide network connectivity to the end-user devices 820, 810 via respective NANs 830. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 831, 832. This virtualized framework allows the freed-up processor cores of the NANs 831, 832 to perform other virtualized applications, such as virtualized applications for various elements discussed herein.

The UEs 810 may utilize respective connections (or channels) 803*a*, each of which comprises a physical communications interface or layer. The connections 803*a* are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 810 and the NANs 830 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 810 and NANs 830 may operate using LAA, enhanced LAA (eLAA), and/or further eLAA (feLAA) mechanisms. The UEs 810 may further directly exchange communication data via respective direct links 805, which may be LTE/NR Proximity Services (ProSe) link or PC5 interfaces/links, or WiFi based links or a personal area network (PAN) based links (e.g., [IEEE802154] based protocols including ZigBee, IPv6 over Low power Wireless Personal Area Networks (6LoWPAN), WirelessHART, MiWi, Thread, and the like; WiFi-direct; Bluetooth/Bluetooth Low Energy (BLE) protocols).

Additionally or alternatively, individual UEs 810 provide radio information to one or more NANs 830 and/or one or more edge compute nodes 836 (e.g., edge servers/hosts, and the like). The radio information may be in the form of one or more measurement reports, and/or may include, for example, signal strength measurements, signal quality measurements, and/or the like. Each measurement report is tagged with a timestamp and the location of the measurement (e.g., the UEs 810 current location). As examples, the measurements collected by the UEs 810 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noiseplus-distortion (SINAD) ratio, carrier-to-interference plus noise ratio (CINR), Additive White Gaussian Noise (AWGN), energy per bit to noise power density ratio (Eb/N0), energy per chip to interference power density ratio (Ec/I0), energy per chip to noise power density ratio (Ec/N0), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for WLAN/WiFi (e.g., [IEEE80211]) networks. Other measurements may be additionally or alternatively used, such as those discussed in 3GPP TS 36.214 v16.2.0 (2021-03-31) ("[TS36214]"), 3GPP TS 38.215 v16.4.0 (2021-01-08) ("[TS38215]"), 3GPP TS 38.314 v16.4.0 (2021-09-30) ("[TS38314]"), *IEEE Standard for Information Technology—Telecommunications and Information Exchange between Systems—Local and Metropolitan Area Networks—Specific Requirements—Part* 11*: Wireless LAN Medium Access Control* (*MAC*) *and Physical Layer* (*PHY*) *Specifications, IEEE Std* 802.11-2020, pp. 1-4379 (26 Feb. 2021) ("[IEEE80211]"), and/or the like. Additionally or alternatively, any of the aforementioned measurements (or combination of measurements) may be collected by one or more NANs 830 and provided to the edge compute node(s) 836.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, and the like); measurements related to Radio Resource Control (RRC)(e.g., mean number of RRC connections, maximum number of RRC connections, mean number of stored inactive RRC connections, maximum number of stored inactive RRC connections, number of attempted, successful, and/or failed RRC connection establishments, and the like); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, and the like); measurements related to Registration Management (RM); measurements related to Session Management (SM) (e.g., number of PDU sessions requested to setup; number of PDU sessions successfully setup; number of PDU sessions failed to setup, and the like); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, and the like); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 810, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, and the like); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (LIM); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v17.7.1 (2022-06-17) ("[TS28552]"), 3GPP TS 32.425 v17.1.0 (2021-06-24) ("[TS32425]"), and/or the like.

The radio information may be reported in response to a trigger event and/or on a periodic basis. Additionally or alternatively, individual UEs 810 report radio information either at a low periodicity or a high periodicity depending on a data transfer that is to take place, and/or other information about the data transfer. Additionally or alternatively, the edge compute node(s) 836 may request the measurements from the NANs 830 at low or high periodicity, or the NANs 830 may provide the measurements to the edge compute node(s) 836 at low or high periodicity. Additionally or alternatively, the edge compute node(s) 836 may obtain other relevant data from other edge compute node(s) 836, core network functions (NFs), application functions (AFs), and/or other UEs 810 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, and the like) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, and the like), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a HW configuration/implementation or non-HW-specific, or may be based on various software parameters (e.g., OS type and version, and the like). Various configurations may be used to define any of the aforementioned data collection parameters. Such configurations may be defined by suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [ISEO]), IETF (e.g., [MAMS]), IEEE/WiFi (e.g., [IEEE80211], [WiMAX], [IEEE16090], and the like), and/or any other like standards such as those discussed herein.

The UE 812*b* is shown as being capable of accessing access point (AP) 833 via a connection 803*b*. In this example, the AP 833 is shown to be connected to the Internet without connecting to the CN 842 of the wireless system. The connection 803*b* can comprise a local wireless connection, such as a connection consistent with any IEEE 802.11 protocol (e.g., [IEEE80211] and variants thereof), wherein the AP 833 would comprise a WiFi router. Additionally or alternatively, the UEs 810 can be configured to communicate using suitable communication signals with each other or with any of the AP 833 over a single or multicarrier communication channel in accordance with various communication techniques, such as, but not limited to, an OFDM communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), and the like; or Quadrature Amplitude Modulation (QAM) such as M-QAM; and/or the like.

The one or more NANs 831 and 832 that enable the connections 803*a* may be referred to as "RAN nodes" or the like. The RAN nodes 831, 832 may comprise ground stations (e.g., terrestrial access points) or satellite stations providing coverage within a geographic area (e.g., a cell). The RAN nodes 831, 832 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 831 is embodied as a NodeB, evolved NodeB (eNB), or a next generation NodeB (gNB), and the RAN nodes 832 are embodied as relay nodes, distributed units, or Road Side Unites (RSUs). Any other type of NANs can be used.

Any of the RAN nodes 831, 832 can terminate the air interface protocol and can be the first point of contact for the UEs 812 and IoT devices 811. Additionally or alternatively, any of the RAN nodes 831, 832 can fulfill various logical functions for the RAN including, but not limited to, RAN function(s) (e.g., radio network controller (RNC) functions and/or NG-RAN functions) for radio resource management, admission control, UL and DL dynamic resource allocation, radio bearer management, data packet scheduling, and the like Additionally or alternatively, the UEs 810 can be configured to communicate using OFDM communication signals with each other or with any of the NANs 831, 832 over a multicarrier communication channel in accordance with various communication techniques, such as, but not limited to, an OFDMA communication technique (e.g., for DL communications) and/or an SC-FDMA communication technique (e.g., for UL and ProSe or sidelink communications), although the scope of the present disclosure is not limited in this respect.

For most cellular communication systems, the RAN function(s) operated by a RAN or individual NANs 831-832 organize DL transmissions (e.g., from any of the RAN nodes 831, 832 to the UEs 810) and UL transmissions (e.g., from the UEs 810 to RAN nodes 831, 832) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 810 at each transmission time interval (TTI). A TTI is the duration of a transmission on a radio link 803*a*, 805, and is related to the size of the data blocks passed to the radio link layer from higher network layers.

The NANs 831, 832 may be configured to communicate with one another via respective interfaces or links (not shown), such as an X2 interface for LTE implementations (e.g., when CN 842 is an Evolved Packet Core (EPC)), an Xn interface for 5G or NR implementations (e.g., when CN 842 is an Fifth Generation Core (5GC)), or the like. The NANs 831 and 832 are also communicatively coupled to CN 842. Additionally or alternatively, the CN 842 may be an evolved packet core (EPC) network, a NextGen Packet Core (NPC) network, a 5G core (5GC), or some other type of CN. The CN 842 is a network of network elements and/or network functions (NFs) relating to a part of a communications network that is independent of the connection technology used by a terminal or user device. The CN 842 comprises a plurality of network elements/NFs configured to offer various data and telecommunications services to customers/subscribers (e.g., users of UEs 812 and IoT devices 811) who are connected to the CN 842 via a RAN. The components of the CN 842 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 842 may be referred to as a network slice, and a logical instantiation of a portion of the CN 842 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 842 components/functions.

The CN 842 is shown to be communicatively coupled to an application server 850 and a network 850 via an IP communications interface 855, the one or more server(s) 850 comprise one or more physical and/or virtualized systems for providing functionality (or services) to one or more clients (e.g., UEs 812 and IoT devices 811) over a network. The server(s) 850 may include various computer devices with rack computing architecture component(s), tower computing architecture component(s), blade computing architecture component(s), and/or the like. The server(s) 850 may represent a cluster of servers, a server farm, a cloud computing service, or other grouping or pool of servers, which may be located in one or more datacenters. The server(s) 850 may also be connected to, or otherwise associated with one or more data storage devices (not shown).

Moreover, the server(s) 850 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 850 offer applications or services that use IP/network resources. As examples, the server(s) 850 may provide traffic management services, cloud analytics, content streaming services, immersive gaming experiences, social networking and/or microblogging services, and/or other like services. In addition, the various services provided by the server(s) 850 may include initiating and controlling software and/or firmware updates for applications or individual components implemented by the UEs 812 and IoT devices 811. The server(s) 850 can also be configured to support one or more communication services (e.g., Voice-over-Internet Protocol (VoIP) sessions, PTT sessions, group communication sessions, social networking services, and the like) for the UEs 812 and IoT devices 811 via the CN 842.

The Radio Access Technologies (RATs) employed by the NANs 830, the UEs 810, and the other elements in FIG. 8 may include, for example, any of the communication protocols and/or RATs discussed herein. Different technologies exhibit benefits and limitations in different scenarios, and application performance in different scenarios becomes dependent on the choice of the access networks (e.g., WiFi, LTE, and the like) and the used network and transport protocols (e.g., Transfer Control Protocol (TCP), Virtual Private Network (VPN), Multi-Path TCP (MPTCP), Generic Routing Encapsulation (GRE), and the like). These RATs may include one or more V2X RATs, which allow these elements to communicate directly with one another, with infrastructure equipment (e.g., NANs 830), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, *IEEE Guide for Wireless Access in Vehicular Environments* (*WAVE*) *Architecture, IEEE S*TANDARDS ASSOCIATION, IEEE 1609.0-2019 (10 Apr. 2019) ("[IEEE16090]"), *V2X Communications Message Set Dictionary*, SAE INT'L (23 Jul. 2020) ("[J2735_202007]"), Intelligent Transport Systems in the 5 GHz frequency band (ITS-O5), the [IEEE80211p] (which is the layer 1 (L1) and layer 2 (L2) part of WAVE, DSRC, and ITS-G5), and/or *IEEE Standard for Air Interface for Broadband Wireless Access Systems, IEEE Std* 802.16-2017. pp. 1-2726 (2 Mar. 2018) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including [IEEE80211p] RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-GS interface is outlined in ETSI EN 302663 V1.3.1 (2020-01)(hereinafter "[EN302663]") and describes the access layer of the ITS-S reference architecture. The ITS-G5 access layer comprises [IEEE80211] (which now incorporates [IEEE80211p]), as well as features for Decentralized Congestion Control (DCC) methods discussed in ETSI TS 102 687 V1.2.1 (2018-04) ("[TS102687]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03).

The cloud 844 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, and the like), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 844 include application capabilities type, infrastructure capabilities type, and platform capabilities type. A cloud capabilities type is a classification of the functionality provided by a cloud service to a cloud service customer (e.g., a user of cloud 844), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 844 may provide include, for example, Communications as a Service (CaaS), which is a cloud service category involving real-time interaction and collaboration services; Compute as a Service (CompaaS), which is a cloud service category involving the provision and use of processing resources needed to deploy and run software; Database as a Service (DaaS), which is a cloud service category involving the provision and use of database system management services: Data Storage as a Service (DSaaS), which is a cloud service category involving the provision and use of data storage and related capabilities; Firewall as a Service (FaaS), which is a cloud service category involving providing firewall and network traffic management services: Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 844 may represent one or more cloud servers, application servers, web servers, and/or some other remote infrastructure. The remote/cloud servers may include any one of a number of services and capabilities such as, for example, any of those discussed herein. Additionally or alternatively, the cloud 844 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 844 may be a network that comprises computers, network connections among the computers, and software routines to enable communication between the computers over network connections. In this regard, the cloud 844 comprises one or more network elements that may include one or more processors, communications systems (e.g., including network interface controllers, one or more transmitters/receivers connected to one or more antennas, and the like), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 844 may be via a wired or a wireless connection using the various communication protocols discussed infra. More than one network may be involved in a communication session between the illustrated devices. Connection to the cloud 844 may require that the computers execute software routines which enable, for example, the seven layers of the OSI model of computer networking or equivalent in a wireless (cellular) phone network. Cloud 844 may be used to enable relatively long-range communication such as, for example, between the one or more server(s) 850 and one or more UEs 810. Additionally or alternatively, the cloud 844 may represent the Internet, one or more cellular networks, local area networks, or wide area networks including proprietary and/or enterprise networks, TCP/Internet Protocol (IP)-based network, or combinations thereof. In these implementations, the cloud 844 may be associated with network operator who owns or controls equipment and other elements necessary to provide network-related services, such as one or more base stations or access points, one or more servers for routing digital data or telephone calls (e.g., a core network or backbone network), and the like The backbone links 855 may include any number of wired or wireless technologies, and may be part of a LAN, a WAN, or the Internet. In one example, the backbone links 855 are fiber backbone links that couple lower levels of service providers to the Internet, such as the CN 812 and cloud 844.

As shown by FIG. 8, each of the NANs 831, 832, and 833 are co-located with edge compute nodes (or "edge servers") 836*a*, 836*b*, and 836*c*, respectively. These implementations may be small-cell clouds (SCCs) where an edge compute node 836 is co-located with a small cell (e.g., pico-cell, femto-cell, and the like), or may be mobile micro clouds (MCCs) where an edge compute node 836 is co-located with a macro-cell (e.g., an eNB, gNB, and the like). The edge compute node 836 may be deployed in a multitude of arrangements other than as shown by FIG. 8. In a first example, multiple NANs 830 are co-located or otherwise communicatively coupled with one edge compute node 836. In a second example, the edge servers 836 may be co-located or operated by RNCs, which may be the case for legacy network deployments, such as 3G networks. In a third example, the edge servers 836 may be deployed at cell aggregation sites or at multi-RAT aggregation points that can be located either within an enterprise or used in public coverage areas. In a fourth example, the edge servers 836 may be deployed at the edge of CN 842. These implementations may be used in follow-me clouds (FMC), where cloud services running at distributed data centers follow the UEs 810 as they roam throughout the network.

In any of the implementations discussed herein, the edge servers 836 provide a distributed computing environment for application and service hosting, and also provide storage and processing resources so that data and/or content can be processed in close proximity to subscribers (e.g., users of UEs 810) for faster response times The edge servers 836 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 836 from the UEs 810, CN 842, cloud 844, and/or server(s) 850, or vice versa. For example, a device application or client application operating in a UE 810 may offload application tasks or workloads to one or more edge servers 836. In another example, an edge server 836 may offload application tasks or workloads to one or more UE 810 (e.g., for distributed ML computation or the like).

The edge compute nodes 836 may include or be part of an edge system 835 that employs one or more ECTs 835. The edge compute nodes 836 may also be referred to as "edge hosts 836" or "edge servers 836." The edge system 835 includes a collection of edge servers 836 and edge management systems (not shown by FIG. 8) necessary to run edge computing applications within an operator network or a subset of an operator network. The edge servers 836 are physical computer systems that may include an edge platform and/or virtualization infrastructure, and provide compute, storage, and network resources to edge computing applications. Each of the edge servers 836 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 810. The VI of the edge servers 836 provide virtualized environments and virtualized resources for the edge hosts, and the edge computing applications may run as VMs and/or application containers on top of the VI.

The edge compute nodes may include or be part of an edge system (e.g., an edge cloud or the like) that employs one or more edge computing technologies (ECTs). The edge compute nodes may also be referred to as "edge hosts", "edge servers", and/or the like The edge system (edge cloud) can include a collection of edge compute nodes and edge management systems (not shown) necessary to run edge computing applications within an operator network or a subset of an operator network. The edge compute nodes are physical computer systems that may include an edge platform and/or virtualization infrastructure, and provide compute, storage, and network resources to edge computing applications. Each of the edge compute nodes are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to data source devices (e.g., UEs 810). The VI of the edge compute nodes provide virtualized environments and virtualized resources for the edge hosts, and the edge computing applications may run as VMs and/or application containers on top of the VI.

In one example implementation, the ECT 835 operates according to the MEC framework, as discussed in ETSI GS MEC 003 V3.1.1 (2022-03), ETSI GS MEC 009 V3.1.1 (2021-06), ETSI GS MEC 010-1 v1.1.1 (2017-10), ETSI GS MEC 010-2 v2.2.1 (2022-02), ETSI GS MEC 011 v2.2.1 (2020-12), ETSI GS MEC 012 V2.2.1 (2022-02), ETSI GS MEC 013 v2.2.1 (2022-01), ETSI GS MEC 014 V1.1.1 (2021-02), ETSI GS MEC 015 v2.1.1 (2020-06), ETSI GS MEC 016 v2.2.1 (2020-04), ETSI GS MEC 021 v2.2.1 (2022-02), ETSI GS MEC 028 v2.2.1 (2021-07), ETSI GS MEC 029 v2.2.1 (2022-01), ETSI MEC GS 030 v2.2.1 (2022-05), ETSI GS NFV-MAN 001 v1.1.1 (2014-12), U.S. Provisional App. No. 63/003,834 filed Apr. 1, 2020 ("['834]"), and Int'l App. No. PCT/US2020/066969 filed on Dec. 23, 2020 ("['996]") (collectively referred to herein as "[MEC]"), the contents of each of which are hereby incorporated by reference in their entireties.

In another example implementation, the ECT 835 operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and inter-operability at every level, several key players interested in the wireless domain (e.g., carriers, device manufacturers, academic institutions, and/or the like) formed the Open RAN alliance ("O-RAN") in 2018. The O-RAN network architecture is a building block for designing virtualized RAN on programmable hardware with radio access control powered by AI. Various aspects of the O-RAN architecture are described in *O-RAN Architecture Description* v06.00, 0-RAN Alliance WG1 (March 2022) ("[O-RAN.WG1.O-RAN-Architecture-Description-v06.00]"); *O-RAN Operations and Maintenance Architecture Specification* v04.00, O-RAN Alliance WG1 (February 2021) ("[O-RAN.WG1.OAM-Architecture-v04.00]"); *O-RAN Operations and Maintenance Interface Specification* v04.00, O-RAN Alliance WG1 (February 2021) ("[O-RAN.WG1.O1-Interface.0-v04.00]"); *O-RAN Information Model and Data Models Specification* v01.00, O-RAN Alliance WG1 (February 2021); O-RAN Working Group 1 Slicing Architecture v06.00, O-RAN Alliance WG1 (March 2022) ("[O-RAN.WG1.Slicing-Architecture]"); *O-RAN Working Group* 2 (*Non-RT RIC and A*1 *interface WG*) *A*1 *interface: Application Protocol* v03.01, O-RAN Alliance WG2 (June 2021); *O-RAN Working Group* 2 (*Non-RT RIC and A*1 *interface WG*) *A*1 *interface: Type Definitions* v02.03, O-RAN Alliance WG2 (October 2021) ("[O-RAN.WG2.A1GAP-v02.03]"); *O-RAN Working Group* 2 (Non-RT RIC and A1 interface WG) *A*1 *interface: Transport Protocol* v01.01, O-RAN Alliance WG2 (June 2021); *O-RAN Working Group* 2*A*1*/ML workflow description and requirements* v01.03 O-RAN Alliance WG2 (October 2021); *O-RAN Working Group* 2 *Non-RT RIC Architecture* v01.00 O-RAN Alliance WG2 (October 2021); *O-RAN Working Group* 2 *Non-RT RIC: Functional Architecture* v01.01, O-RAN Alliance WG2 (July 2021); *O-RAN Working Group* 2 (Non-RT RIC and A1 interface WG): *R*1 *Interface: General Aspects and Principles* v01.00, O-RAN Alliance WG2 (March 2022); *O-RAN Working Group* 3 *Near-Real-time Intelligent Controller Architecture & E*2 *General Aspects and Principles* v02.01, O-RAN Alliance WG3 (March 2022); *O-RAN Working Group* 3 *Near-Real-time Intelligent Controller E*2 *Service Model* (*E*2*SM*) v02.01, O-RAN Alliance WG3 (March 2022); *O-RAN Working Group* 3 *Near-Real-time Intelligent Controller E*2 *Service Model* (*E*2*SM*) *RAN Function Network Interface* (*NI*) v01.00, O-RAN Alliance WG3 (February 2020); *O-RAN Working Group* 3 *Near-Real-time Intelligent Controller E*2 *Service Model* (*E*2*SM*) KPM v02.01, O-RAN Alliance WG3 (March 2022); *O-RAN Working Group* 3 *Near-Real-time Intelligent Controller E*2 *Service Model* (*E*2*SM*) *RAN Control* v01.01, O-RAN Alliance WG3 (March 2022); *O-RAN Working Group* 3, *Near-Real-time Intelligent Controller, E*2 *Application Protocol* (*E*2*AP*) v02.01, O-RAN Alliance WG3 (March 2022) ("[O-RAN.WG3.E2AP-v02.01]"); *O-RAN Working Group* 3 *Near-Real-time Intelligent Controller Near-RT RIC Architecture* v02.01, O-RAN Alliance WG3 (March 2022); *O-RAN Working Group* 4 (*Open Fronthaul Interfaces WG*) *Control, User and Synchronization Plane Specification* v08.01, O-RAN Alliance WG4 (May 2022)("[ORAN-WG4.CUS.0-v08.01]"); and *O-RAN Working Group* 4 (*Open Fronthaul Interfaces WG*) *Control, User and Syn-*

*chronization Plane Specification* v07.02, O-RAN Alliance WG4 (May 2022) ("[ORAN-WG4.CUS.0-v07.02]"); *O-RAN Fronthaul Working Group* 4 *Cooperative Transport Interface Transport Control Plane Specification* v02.00, O-RAN Alliance WG4 (June 2021); *O-RAN Fronthaul Working Group* 4 *Cooperative Transport Interface Transport Management Plane Specification* v02.00, O-RAN Alliance WG4 (June 2021); *O-RAN Fronthaul Working Group* 4 *Management Plane Specification* v08.00, O-RAN Alliance WG4 (March 2022) ("[O-RAN.WG4.MP.0-v08.00]"); *O-RAN Fronthaul Working Group* 4*Management Plane Specification* v07.01, O-RAN Alliance WG4 (April 2022) ("[ORAN-WG4.MP.0-v07.01]"); *O-RAN Alliance Working Group* 5 *O*1 *Interface specification for O-DU* v03.00, O-RAN Alliance WG5 (March 2022); *O-RAN Open F*1/W1/E1/X2/*Xn Interfaces Working Group Transport Specification* v01.00, O-RAN Alliance WG5 (April 2020); *Cloud Architecture and Deployment Scenarios for O-RAN Virtualized RAN* v02.02, O-RAN Alliance WG6 (October 2021) ("[O-RAN.WG6.CAD-v02.02]"); *Cloud Platform Reference Designs* v02.00, O-RAN Alliance WG6 (February 2021); *O-RAN O*2 *Interface General Aspects and Principles* v01.02, O-RAN Alliance WG6 (March 2022); *O-RAN Acceleration Abstraction Layer General Aspects and Principles* v02.00, O-RAN Alliance WG6 (March 2022); *O-RAN White Box Hardware Working Group Hardware Reference Design Specification for Indoor Pico Cell with Fronthaul Split Option* 6v02.00, O-RAN Alliance WG7 (October 2021)("[O-RAN.WG7.IPC-HRD-Opt6]"); *O-RAN WG7 Hardware Reference Design Specification for Indoor Picocell* (*FR*)) *with Split Option* 7-2 v03.00, O-RAN Alliance WG7 (October 2021) ("[O-RAN.WG7.IPC-HRD-Opt7]"); *O-RAN White Box Hardware Working Group Hardware Reference Design Specification for Outdoor Micro Cell with Split Architecture Option* 7.2 v02.00, O-RAN Alliance WG7 (October 2021); *O-RAN WG7Hardware Reference Design Specification for Indoor Picocell* (*FRI*) *with Split Option* 8 v03.00, O-RAN Alliance WG7 (October 2021) ("[O-RAN.WG7.IPC-HRD-Opt8]"); *O-RAN Open X-haul Transport Working Group Management interfaces for Transport Network Elements v*03.00, O-RAN Alliance WG9 (March 2022) ("[ORAN-WG9.XTRP-MGT]"); *O-RAN Open X-haul Transport Working Group Synchronization Architecture and Solution Specification*, O-RAN Alliance WG9 (March 2022) ("[ORAN-WG9.XTRP-SYN]"); *O-RAN Open A haul Transport WG9 WDM-based Fronthaul Transport*, O-RAN Alliance WG9 (March 2022) ("[ORAN-WG9.WDM]"); *O-RAN Open Transport Working Group* 9 *Xhaul Packet Switched Architectures and Solutions* v02.00, O-RAN Alliance WG9 (October 2021) ("[ORAN-WG9.XPAAS]"); *O-RAN Operations and Maintenance Architecture* v06.00, O-RAN Alliance WG10 (March 2022) ("[O-RAN.WG10.OAM-Architecture-v06.00]"); *O-RAN Operations and Maintenance Interface Specification v*06.00, O-RAN Alliance WG10 (March 2022) ("[O-RAN.WG10.O1-Interface.0-v06.00]"); *O-RAN: Towards an Open and Smart RAN*, O-RAN Alliance, White Paper (October 2018)("[ORANWP]"); and U.S. application Ser. No. 17/484,743 filed on 24 Sep. 2021 (collectively referred to as "[O-RAN]") the contents of each of which are hereby incorporated by reference in their entireties.

In another example implementation, the ECT 835 operates according to the 3rd Generation Partnership Project (3GPP) System Aspects Working Group 6 (SA6) Architecture for enabling Edge Applications (referred to as "3GPP edge computing") as discussed in 3GPP TS 23.558 v17.1.0 (2021-09-24) ("[TS23558]"), 3GPP TS 23.501 v17.3.0 (2021-12-23) ("[TS23501]"), and U.S. application Ser. No. 17/484,719 filed on 24 Sep. 2021 ("['719]") (collectively referred to as "[SA6Edge]"), the contents of each of which is hereby incorporated by reference in their entireties.

In another example implementation, the ECT 835 operates according to the Intel® Smart Edge Open framework (formerly known as OpenNESS) as discussed in Intel® Smart Edge Open Developer Guide, version 21.09 (30 Sep. 2021), available at: <https://smart-edge-open.github.io/> ("[ISEO]"), the contents of which are hereby incorporated by reference in its entirety.

In another example implementation, the ECT 835 operates according to the Multi-Access Management Services (MAMS) framework as discussed in Kanugovi et al., *Multi-Access Management Services* (*MAMS*), Internet Engineering Task Force (IETF), Request for Comments (RFC) 8743 (March 2020) ("[RFC8743]"), Ford et al., *TCP Extensions for Multipath Operation with Multiple Addresses*, IETF RFC 8684, (March 2020), De Coninck et al., *Multipath Extensions for QUIC* (*MP-QUIC*), IETF *DRAFT-DECONINCK-QUIC-MULTIPATH*-07, IETA, QUIC Working Group (3 May 2021), Zhu et al., *User-Plane Protocols for Multiple Access Management Service*, IETF *DRAFT-ZHU-INTAREA-MAMS-USER-PROTOCOL*-09, IETA, INTAREA (4 Mar. 2020), and Zhu et al., *Generic Multi-Access* (*GMA*) *Convergence Encapsulation Protocols*, IETF *DRAFT-ZHU-INTAREA-GMA*-14, IETA, INTAREA/Network Working Group (24 Nov. 2021) (collectively referred to as "[MAMS]"), the contents of each of which are hereby incorporated by reference in their entireties. In these implementations, an edge compute node and/or one or more cloud computing nodes/clusters may be one or more MAMS servers that includes or operates a Network Connection Manager (NCM) for downstream/DL traffic, and the client include or operate a Client Connection Manager (CCM) for upstream/UL traffic. An NCM is a functional entity that handles MAMS control messages from clients (e.g., a client that configures the distribution of data packets over available access paths and (core) network paths, and manages user-plane treatment (e.g., tunneling, encryption, and/or the like) of the traffic flows (see e.g., [MAMS]). The CCM is the peer functional element in a client (e.g., a client that handles MAMS control-plane procedures, exchanges MAMS signaling messages with the NCM, and configures the network paths at the client for the transport of user data (e.g., network packets, and/or the like) (see e.g., [MAMS]).

It should be understood that the aforementioned edge computing frameworks and services deployment examples are only one illustrative example of edge computing systems/networks 835, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

It should be understood that the aforementioned edge computing frameworks/ECTs and services deployment examples are only illustrative examples of ECTs, and that the present disclosure may be applicable to many other or additional edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

2.1. Open RAN (O-RAN)

Figure 9:
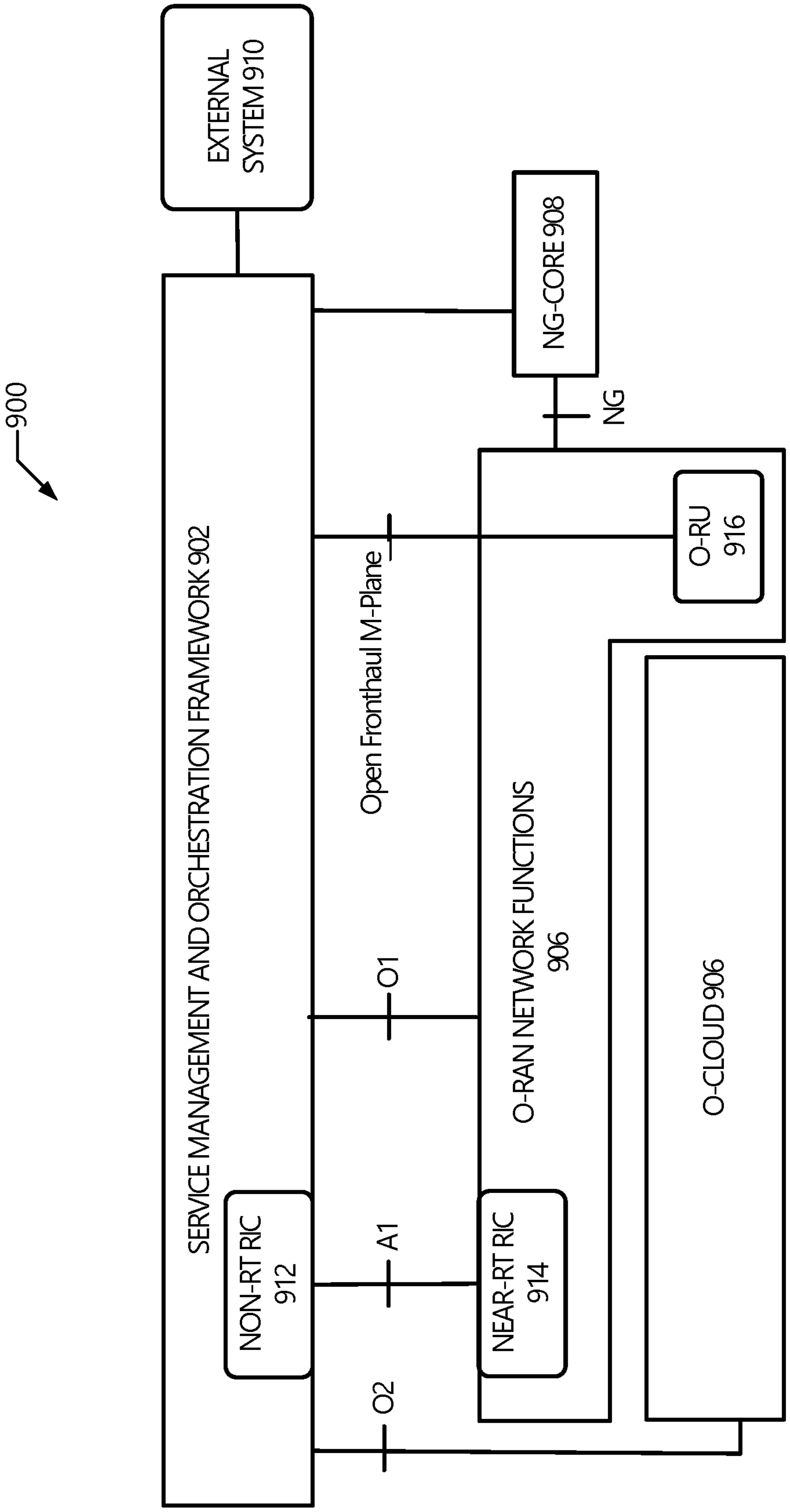
FIG. 9 depicts an Open RAN (O-RAN) system architecture.

FIG. 9 illustrates an example Open RAN (O-RAN) system architecture 900 according to various embodiments. The O-RAN architecture 900 includes four O-RAN defined interfaces—namely, the A1 interface, the O1 interface, the O2 interface, and the Open Fronthaul Management (M)-plane interface—which connect the Service Management and Orchestration framework (SMO) 902 to O-RAN network functions (NFs) 904 and the O-Cloud 906.

The O1 interface is an interface between orchestration & management entities (Orchestration/NMS) and O-RAN managed elements, for operation and management, by which FCAPS management, Software management, File management and other similar functions shall be achieved (see e.g., [O-RAN.WG1.O-RAN-Architecture-Description-v06.00]), [O-RAN.WG6.CAD-v02.02]). The O2 interface is an interface between the Service Management and Orchestration Framework and the O-Cloud (see e.g., [O-RAN.WG1.O-RAN-Architecture-Description-v06.00]), [O-RAN.WG6.CAD-v02.02]). The A1 interface is an interface between the O-RAN Non-Real Time (RT) RAN Intelligent Controller (RIC) 912 and the Near-RT RIC 914 to enable policy-driven guidance of Near-RT RIC applications/functions, and support A1/ML workflow The SMO 902 (see e.g., [O-RAN.WG1.O1-Interface.0-v04.00], [O-RAN.WG10.O1-Interface.0-v06.00]) also connects with an external system 910, which provides enrichment data to the SMO 902. FIG. 9 also illustrates that the A1 interface terminates at an O-RAN Non-Real Time (RT) RAN Intelligent Controller (RIC) 912 in or at the SMO 902 and at the O-RAN Near-RT RIC 914 in or at the O-RAN NFs 904. The O-RAN NFs 904 can be VNFs such as VMs or containers, sitting above the O-Cloud 906 and/or Physical Network Functions (PNFs) utilizing customized hardware. All O-RAN NFs 904 are expected to support the O1 interface when interfacing the SMO 902. The O-RAN NFs 904 connect to the NG-Core 908 via the NG interface (which is a 3GPP defined interface). The Open Fronthaul M-plane interface between the SMO 902 and the O-RAN Radio Unit (O-RU) 916 supports the O-RU 916 management in the O-RAN hybrid model as specified in [ORAN-WG4.MP.0-v07.01], [O-RAN.WG4.MP.0-v08.00]. The Open Fronthaul M-plane interface is an optional interface to the SMO 902 that is included for backward compatibility purposes as per [ORAN-WG4.MP.0-v07.01], [O-RAN.WG4.MP.0-v08.00], and is intended for management of the O-RU 916 in hybrid mode only. The management architecture of flat mode and its relation to the O1 interface for the O-RU 916 is discussed in [O-RAN.WG10.OAM-Architecture-v06.00], [O-RAN.WG1.OAM-Architecture-v04.00]. The O-RU 916 termination of the O1 interface towards the SMO 902 as specified in [ORAN-WG4.MP.0-v07.01], [O-RAN.WG4.MP.0-v08.00].

Figure 10:
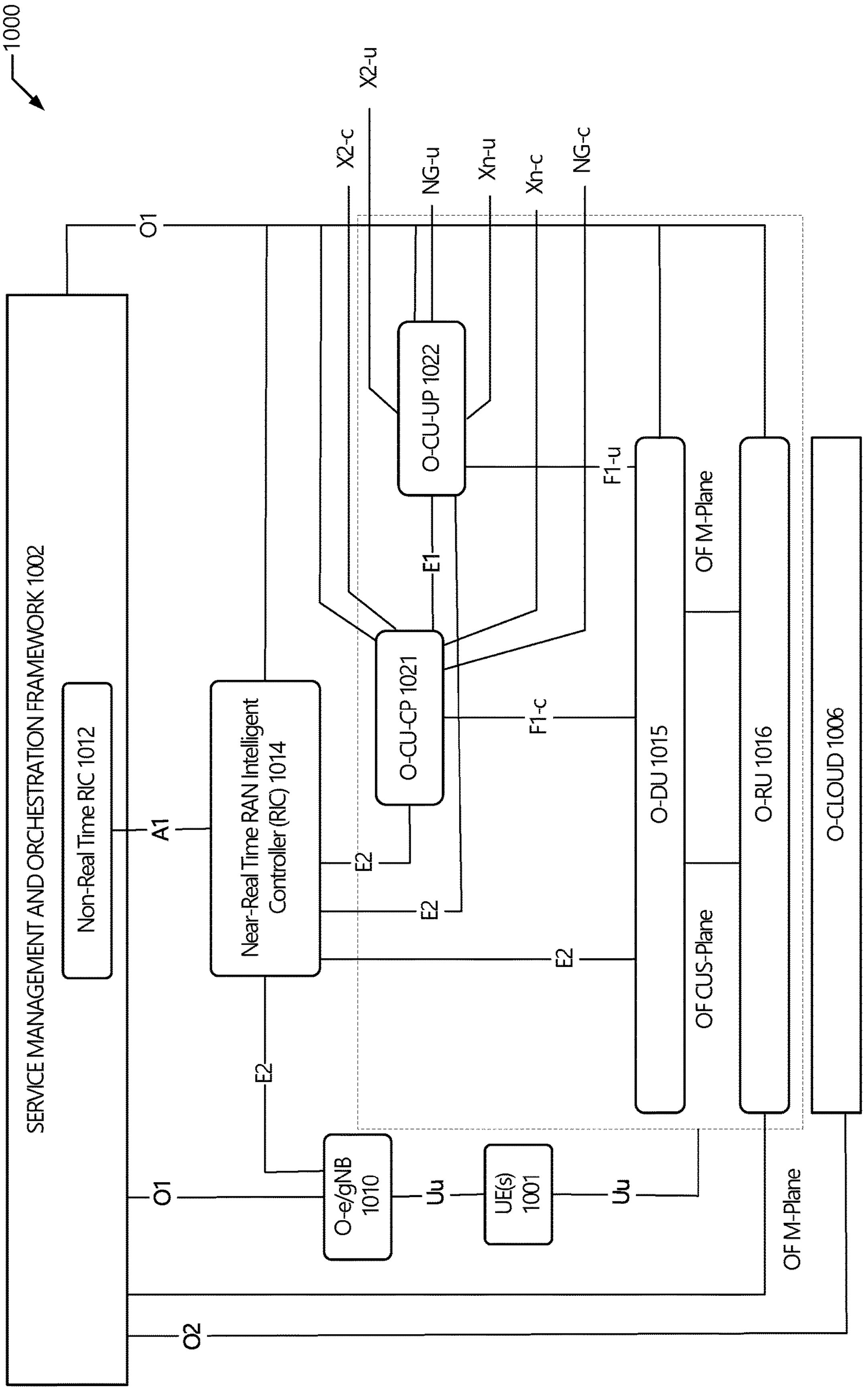
FIG. 10 depicts a logical architecture of the O-RAN system architecture of FIG. 9.

FIG. 10 illustrates a logical architecture 1000 of the O-RAN system architecture 900 of FIG. 9. In FIG. 10, the SMO 1002 corresponds to the SMO 902, O-Cloud 1006 corresponds to the O-Cloud 906, the non-RT RIC 1012 corresponds to the non-RT RIC 912, the near-RT RIC 1014 corresponds to the near-RT RIC 914, and the O-RU 1016 corresponds to the O-RU 916 of FIG. 10, respectively. The O-RAN logical architecture 1000 includes a radio portion and a management portion.

The management portion/side of the architectures 1000 includes the SMO 1002 containing the non-RT RIC 1012, and may include the O-Cloud 1006. The O-Cloud 1006 is a cloud computing platform including a collection of physical infrastructure nodes to host the relevant O-RAN functions (e.g., the near-RT RIC 1014, O-CU-CP 1021, O-CU-UP 1022, and the O-DU 1015), supporting software components (e.g., OSs, VMMs, container runtime engines, ML engines, and the like), and appropriate management and orchestration functions.

The radio portion/side of the logical architecture 1000 includes the near-RT RIC 1014, the O-RAN Distributed Unit (O-DU) 1015, the O-RU 1016, the O-RAN Central Unit—Control Plane (O-CU-CP) 1021, and the O-RAN Central Unit-User Plane (O-CU-UP) 1022 functions. The radio portion/side of the logical architecture 1000 may also include the O-e/gNB 1010.

The O-DU 1015 is a logical node hosting RLC, MAC, and higher PHY layer entities/elements (High-PHY layers) based on a lower layer functional split. The O-RU 1016 is a logical node hosting lower PHY layer entities/elements (Low-PHY layer) (e.g., FFT/iFFT, PRACH extraction, and the like) and RF processing elements based on a lower layer functional split. Virtualization of O-RU 1016 is FFS. The O-CU-CP 1021 is a logical node hosting the RRC and the control plane (CP) part of the PDCP protocol. The O-CU-UP 1022 is a logical node hosting the user plane part of the PDCP protocol and the SDAP protocol.

An E2 interface terminates at a plurality of E2 nodes. The E2 interface connects the near-RT RIC 1014 and one or more O-CU-CP 1021, one or more 0-CU-UP 1022, one or more 0-DU 1015, and one or more 0-e/gNB 1010. The E2 nodes are logical nodes/entities that terminate the E2 interface. For NR/5G access, the E2 nodes include the O-CU-CP 1021, O-CU-UP 1022, O-DU 1015, or any combination of elements as defined in [O-RAN.WG2.AlGAP-v02.03]. For E-UTRA access the E2 nodes include the O-e/gNB 1010. As shown in FIG. 10, the E2 interface also connects the O-e/gNB 1010 to the Near-RT RIC 1014. The protocols over E2 interface are based exclusively on Control Plane (CP) protocols. The E2 functions are grouped into the following categories: (a) near-RT RIC 1014 services (REPORT, INSERT, CONTROL and POLICY, as described in [O-RAN.WG2.AlGAP-v02.03]); and (b) near-RT RIC 1014 support functions, which include E2 Interface Management (E2 Setup, E2 Reset, Reporting of General Error Situations, and the like) and Near-RT RIC Service Update (e.g., capability exchange related to the list of E2 Node functions exposed over E2). A RIC Service is a Service provided on an E2 Node to provide access to messages and measurements and/or enable control of the E2 Node from the Near-RT RIC.

FIG. 10 shows the Uu interface between a UE 1001 and O-e/gNB 1010 as well as between the UE 1001 and O-RAN components. The Uu interface is a 3GPP defined interface (see e.g., sections 5.2 and 5.3 of 3GPP TS 38.401 v17.1.0 (2022-06-23)("[TS38401]")), which includes a complete protocol stack from L1 to L3 and terminates in the NG-RAN or E-UTRAN. The O-e/gNB 1010 is an LTE eNB (see e.g., 3GPP TS 36.401 v17.1.0 (2022-06-23)), a 5G gNB or ng-eNB (see e.g., [TS38300], [TS38401]) that supports the E2 interface.

The O-e/gNB 1010 may be the same or similar as NANs 831-833, and UE 1001 may be the same or similar as any of UEs 821, 811 discussed with respect to FIG. 8, and/or the like. There may be multiple UEs 1001 and/or multiple O-e/gNB 1010, each of which may be connected to one another the via respective Uu interfaces. Although not shown in FIG. 10, the O-e/gNB 1010 supports O-DU 1015 and O-RU 1016 functions with an Open Fronthaul interface between them.

The Open Fronthaul (OF) interface(s) is/are between 0-DU 1015 and O-RU 1016 functions (see e.g., [ORAN-WG4.MP.0-v07.01], [O-RAN.WG4.MP.0-v08.00], [ORAN-WG4.MP.0-v07.01], [ORAN-WG4.CUS.0-v08.01]). The OF interface(s) includes the Control User Synchronization (CUS) Plane and Management (M) Plane. FIGS. 9 and 10 also show that the O-RU 1016 terminates the OF M-Plane interface towards the O-DU 1015 and optionally towards the SMO 1002 as specified in [ORAN-WG4.MP.0-v07.01], [O-RAN.WG4.MP.0-v08.00]. The O-RU 1016 terminates the OF CUS-Plane interface towards the O-DU 1015 and the SMO 1002.

The F1-C interface connects the O-CU-CP 1021 with the O-DU 1015. As defined by 3GPP, the F1-c interface is between the gNB-CU-CP and gNB-DU nodes (see e.g., [TS38401]), 3GPP TS 38.470 v17.1.0 (2022-06-23) ("[TS38470]"). However, for purposes of O-RAN, the F1-c interface is adopted between the O-CU-CP 1021 with the O-DU 1015 functions while reusing the principles and protocol stack defined by 3GPP and the definition of interoperability profile specifications.

The F1-u interface connects the O-CU-UP 1022 with the O-DU 1015. As defined by 3GPP, the F1-u interface is between the gNB-CU-UP and gNB-DU nodes [TS38401], [TS38470]. However, for purposes of O-RAN, the F1-u interface is adopted between the O-CU-UP 1022 with the O-DU 1015 functions while reusing the principles and protocol stack defined by 3GPP and the definition of interoperability profile specifications.

The NG-C interface is defined by 3GPP as an interface between the gNB-CU-CP and the AMF in the 5GC, and the NG-C is also referred as the N2 interface (see e.g., [TS38300]). The NG-U interface is defined by 3GPP, as an interface between the gNB-CU-UP and the UPF in the 5GC, and the NG-u interface is referred as the N3 interface (see e.g., [TS38300]). In O-RAN, NG-C and NG-U protocol stacks defined by 3GPP are reused and may be adapted for O-RAN purposes.

The X2-C interface is defined in 3GPP for transmitting control plane information between eNBs or between eNB and en-gNB in EN-DC. The X2-U interface is defined in 3GPP for transmitting user plane information between eNBs or between eNB and en-gNB in EN-DC (see e.g., 3GPP TS 36.420 v17.0.0 (2022-04-06), [TS38300]). In O-RAN, X2-c and X2-u protocol stacks defined by 3GPP are reused and may be adapted for O-RAN purposes The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB (see e.g., 3GPP TS 38.420 v17.1.0 (2022-06-23), [TS38300]. In O-RAN, Xn-C and Xn-U protocol stacks defined by 3GPP are reused and may be adapted for O-RAN purposes The E1 interface is defined by 3GPP as being an interface between the gNB-CU-CP (e.g., gNB-CU-CP 3728) and gNB-CU-UP (see e.g., [TS38401], 3GPP TS 38.460 v16.1.0 (2020-07-17)). In O-RAN, E1 protocol stacks defined by 3GPP are reused and adapted as being an interface between the O-CU-CP 1021 and the O-CU-UP 1022 functions.

The O-RAN Non-Real Time (RT) RAN Intelligent Controller (RIC) 1012 is a logical function within the SMO 902, 1002 that enables non-real-time control and optimization of RAN elements and resources; A1/machine learning (ML) workflow(s) including model training, inferences, and updates; and policy-based guidance of applications/features in the Near-RT RIC 1014.

The O-RAN near-RT RIC 1014 is a logical function that enables near-real-time control and optimization of RAN elements and resources via fine-grained data collection and actions over the E2 interface. The near-RT RIC 1014 may include one or more A1/ML workflows including model training, inferences, and updates.

The non-RT RIC 1012 can be an ML training host to host the training of one or more ML models. ML training can be performed offline using data collected from the RIC, O-DU 1015 and O-RU 1016. For supervised learning, non-RT RIC 1012 is part of the SMO 1002, and the ML training host and/or ML model host/actor can be part of the non-RT RIC 1012 and/or the near-RT RIC 1014. For unsupervised learning, the ML training host and ML model host/actor can be part of the non-RT RIC 1012 and/or the near-RT RIC 1014. For reinforcement learning, the ML training host and ML model host/actor may be co-located as part of the non-RT RIC 1012 and/or the near-RT RIC 1014. In some implementations, the non-RT RIC 1012 may request or trigger ML model training in the training hosts regardless of where the model is deployed and executed. ML models may be trained and not currently deployed.

In some implementations, the non-RT RIC 1012 provides a query-able catalog for an ML designer/developer to publish/install trained ML models (e.g., executable software components). In these implementations, the non-RT RIC 1012 may provide discovery mechanism if a particular ML model can be executed in a target ML inference host (MF), and what number and type of ML models can be executed in the MF. For example, there may be three types of ML catalogs made discoverable by the non-RT RIC 1012: a design-time catalog (e.g., residing outside the non-RT RIC 1012 and hosted by some other ML platform(s)), a training/deployment-time catalog (e.g., residing inside the non-RT RIC 1012), and a run-time catalog (e.g., residing inside the non-RT RIC 1012). The non-RT RIC 1012 supports necessary capabilities for ML model inference in support of ML assisted solutions running in the non-RT RIC 1012 or some other ML inference host. These capabilities enable executable software to be installed such as VMs, containers, and the like. The non-RT RIC 1012 may also include and/or operate one or more ML engines, which are packaged software executable libraries that provide methods, routines, data types, and the like, used to run ML models. The non-RT RIC 1012 may also implement policies to switch and activate ML model instances under different operating conditions.

The non-RT RIC 1012 is be able to access feedback data (e.g., FM and PM statistics) over the O1 interface on ML model performance and perform necessary evaluations. If the ML model fails during runtime, an alarm can be generated as feedback to the non-RT RIC 1012. How well the ML model is performing in terms of prediction accuracy or other operating statistics it produces can also be sent to the non-RT RIC 1012 over O1. The non-RT RIC 1012 can also scale ML model instances running in a target MF over the O1 interface by observing resource utilization in MF. The environment where the ML model instance is running (e.g., the MF) monitors resource utilization of the running ML model. This can be done, for example, using an ORAN-SC component called ResourceMonitor in the near-RT RIC 1014 and/or in the non-RT RIC 1012, which continuously monitors resource utilization. If resources are low or fall below a certain threshold, the runtime environment in the near-RT RIC 1014 and/or the non-RT RIC 1012 provides a scaling mechanism to add more ML instances. The scaling mechanism may include a scaling factor such as an number, percentage, and/or other like data used to scale up/down the number of ML instances. ML model instances running in the target ML inference hosts may be automatically scaled by observing resource utilization in the MF. For example, the Kubemetes® (K8s) runtime environment typically provides an auto-scaling feature.

The A1 interface is between the non-RT RIC 1012 (within or outside the SMO 1002) and the near-RT RIC 1014. The A1 interface supports three types of services as defined in [O-RAN.WG2.A1GAP-v02.03], including a Policy Management Service, an Enrichment Information Service, and ML Model Management Service. A1 policies have the following characteristics compared to persistent configuration (see e.g., [O-RAN.WG2.AlGAP-v02.03]): A1 policies are not critical to traffic; A1 policies have temporary validity; A1 policies may handle individual UE or dynamically defined groups of UEs; A1 policies act within and take precedence over the configuration; and A1 policies are non-persistent (e.g., do not survive a restart of the near-RT RIC). O-RAN is currently developing a framework for adding 3rd party xApps to a Base Station product, which is assembled from components from different suppliers.

Figure 11:
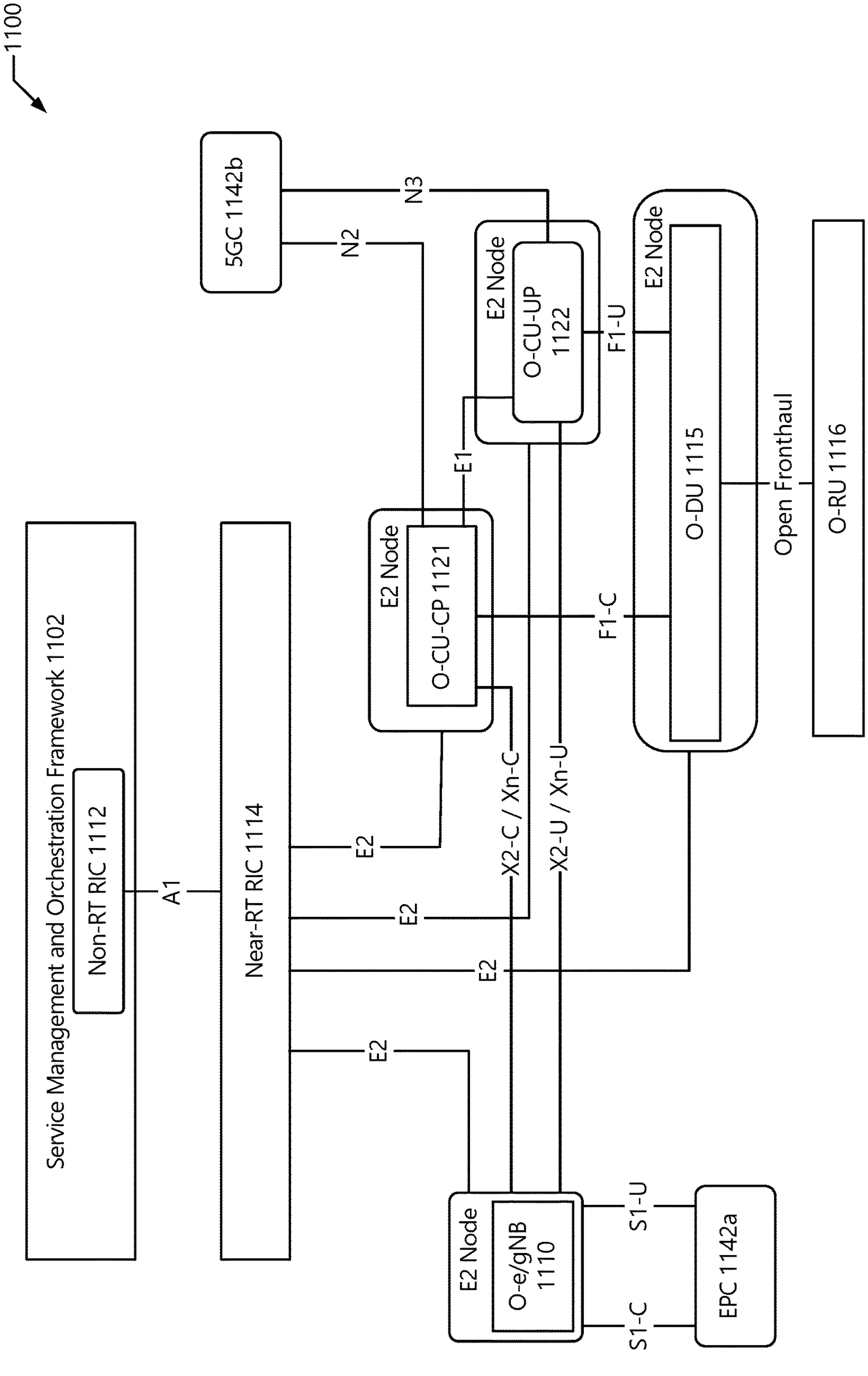
FIG. 11 illustrates an O-RAN Architecture including Near-RT RIC interfaces.

FIG. 11 illustrates an example O-RAN Architecture 1100 including Near-RT RIC interfaces. The Near-RT RIC 1114 is connected to the Non-RT RIC 1112 through the A1 interface (see e.g., [O-RAN.WG2.AlGAP-v02.03]). The Near-RT RIC 1114 is a logical network node placed between the E2 Nodes and the Service Management & Orchestration layer (SMO) 1102, which hosts the Non-RT RIC 1112. The Near-RT RIC 1114 may be the same or similar as the Near-RT RIC 914 and Near-RT RIC 1014 of FIGS. 9 and 10, and the Non-RT RIC 1112 may be the same or similar as the Non-RT RIC 912 and/or the Non-RT RIC 1012 of FIGS. 9 and 10. The SMO 1102 may be the same or similar to the SMO 902 and/or the SMO 1002 of FIGS. 9 and 10. A Near-RT RIC 1114 is connected to only one Non-RT RIC 1112.

As mentioned previously, E2 is a logical interface connecting the Near-RT RIC 1114 with an E2 Node. The Near-RT RIC 1114 is connected to the O-CU-CP 1121, the Near-RT RIC 1114 is connected to the O-CU-UP 1122, the Near-RT RIC 1114 is connected to the O-DU 1115, and the Near-RT RIC 1114 is connected to the O-e/gNB 1110. The O-DU 1115 is connected to the O-RU 1116. The O-CU-CP 1121, the O-CU-UP 1122, the O-DU 1115, and the O-e/gNB 1110 may be the same or similar to the O-CU-CP 1021, the O-DU 1015, and the O-e/gNB 1010 of FIG. 10. The O-RU 1116 may be the same or similar to the O-RU 916 and/or the O-RU 1016 of FIGS. 9 and 10.

An E2 Node is connected to only one Near-RT RIC 1114. A Near-RT RIC 1114 can be connected to multiple E2 Nodes (e.g., multiple O-CU-CPs 1121, O-CU-UPs 1122, O-DUs 1115, and O-e/gNBs 1110). F1 (e.g., F1 control plane (F1-C) and F1 user plane (F1-U)) and E1 are logical 3GPP interfaces, whose protocols, termination points and cardinalities are specified in [TS38401]. In addition, the Near-RT RIC 1114 and other RAN nodes have O1 interfaces as defined in [O-RAN.WG1.OAM-Architecture-v04.00], [O-RAN.WG10.OAM-Architecture-v06.00], and [O-RAN.WG1.O-RAN-Architecture-Description-v06.00]. Additionally, the O-CU-CP 1121 is connected to the 5G Core Network (5GC) 1142*b* via an N2 interface, the O-CU-UP 1122 is connected to the 5GC 1142*b* via an N3 interface, and the O-gNBs 1110 is connected to the O-CU-CP 1121 via an Xn control plane interface (Xn-C), and is connected to the O-CU-UP 1122 via an Xn user plane interface (Xn-U); these interfaces are defined in [TS23501], [TS38300], and other 3GPP standards. Furthermore, the O-eNBs 1110 are connected to an Evolved Packet Core (EPC) 1142*a* via S1 control place (S1-C) and S1 user plane (S1-U) interfaces, and the O-eNBs 1110 is connected to the O-CU-CP 1121 via an X2 control plane interface (X2-C) and/or an Xn control plane interface (Xn-C), and is connected to the O-CU-UP 1122 via an X2 user plane interface (X2-U) and/or an Xn user plane interface (Xn-U); these interfaces are discussed in 3GPP TS 36.300 v16.6.0 (2021-07-06)("[TS36300]") and/or other 3GPP standards.

The Near-RT RIC 1114 hosts one or more xApps that use the E2 interface to collect near real-time information (e.g., UE basis, Cell basis) and provide value added services. The Near-RT RIC 1114 may receive declarative Policies and obtain Data Enrichment information over the A1 interface (see e.g., [O-RAN.WG2.A1GAP-v02.03]).

The protocols over E2 interface are based on control plane protocols and are defined in [O-RAN.WG3.E2AP-v02.01]. On E2 or Near-RT RIC 1114 failure, the E2 Node will be able to provide services but there may be an outage for certain value-added services that may only be provided using the Near-RT RIC 1114.

The Near-RT RIC 1114 provides a database function that stores the configurations relating to E2 nodes, Cells, Bearers, Flows, UEs and the mappings between them. The Near-RT RIC 1114 provides ML tools that support data pipelining. The Near-RT RIC 1114 provides a messaging infrastructure. The Near-RT RIC 1114 provides logging, tracing and metrics collection from Near-RT RIC 1114 framework and xApps to SMO. The Near-RT RIC 1114 provides security functions. The Near-RT RIC 1114 supports conflict resolution to resolve the potential conflicts or overlaps which may be caused by the requests from xApps.

The Near-RT RIC 1114 also provides an open API enabling the hosting of 3rd party xApps and xApps from the Near-RT RIC 1114 platform vendor. Near-RT RIC 1114 also provides an open API decoupled from specific implementation solutions, including a Shared Data Layer (SDL) that works as an overlay for underlying databases and enables simplified data access.

An xApp is an application designed to run on the Near-RT RIC 1114. Such an application is likely to include or provide one or more microservices and at the point of on-boarding will identify which data it consumes and which data it provides. An xApp is independent of the Near-RT RIC 1114 and may be provided by any third party. The E2 enables a direct association between the xApp and the RAN functionality. A RAN Function is a specific Function in an E2 Node; examples include X2AP, F1AP, E1AP, S1AP, NGAP interfaces and RAN internal functions handling UEs, Cells, and the like.

The architecture of an xApp comprises the code implementing the xApp's logic and the RIC libraries that allow the xApp to: send and receive messages; read from, write to, and get notifications from the SDL layer; and write log messages. Additional libraries will be available in future versions including libraries for setting and resetting alarms and sending statistics. Furthermore, xApps can use access libraries to access specific name-spaces in the SDL layer. For example, the R-NIB that provides information about which E2 nodes (e.g., CU/DU) the RIC is connected to and which SMs are supported by each E2 node, can be read by using the R-NIB access library.

The O-RAN standard interfaces (e.g., O1, A1, and E2) are exposed to the xApps as follows: xApp will receive its configuration via K8s ConfigMap—the configuration can be updated while the xApp is running and the xApp can be notified of this modification by using inotify( ); xApp can send statistics (PM) either by (a) sending it directly to VES collector in VES format, (b) by exposing statistics via a REST interface for Prometheus to collect; xApp will receive A1 policy guidance via an RMR message of a specific kind (policy instance creation and deletion operations); and xApp can subscribe to E2 events by constructing the E2 subscription ASN.1 payload and sending it as a message (RMR), xApp will receive E2 messages (e.g., E2 INDICATION) as RMR messages with the ASN.1 payload. Similarly xApp can issue E2 control messages.

In addition to A1 and E2 related messages, xApps can send messages that are processes by other xApps and can receive messages produced by other xApps. Communication inside the RIC is policy driven, that is, an xApp cannot specify the target of a message. It simply sends a message of a specific type and the routing policies specified for the RIC instance will determine to which destinations this message will be delivered (logical pub/sub).

Logically, an xApp is an entity that implements a well-defined function. Mechanically, an xApp is a K8s pod that includes one or multiple containers. In order for an xApp to be deployable, it needs to have an xApp descriptor (e.g., JSON) that describes the xApp's configuration parameters and information the RIC platform needs to configure the RIC platform for the xApp. The xApp developer will also need to provide a JSON schema for the descriptor.

In addition to these basic requirements, an xApp may do any of the following: read initial configuration parameters (passed in the xApp descriptor); receive updated configuration parameters; send and receive messages; read and write into a persistent shared data storage (key-value store); receive A1-P policy guidance messages—specifically operations to create or delete a policy instance (JSON payload on an RMR message) related to a given policy type; define a new A1 policy type; make subscriptions via E2 interface to the RAN, receive E2 INDICATION messages from the RAN, and issue E2 POLICY and CONTROL messages to the RAN; and report metrics related to its own execution or observed RAN events.

The lifecycle of xApp development and deployment consists of the following states: Development (design, implementation, local testing); Released (the xApp code and xApp descriptor are committed to LF Gerrit repo and included in an O-RAN release. The xApp is packaged as Docker container and its image released to LF Release registry); On-boarded/Distributed (the xApp descriptor (and potentially helm chart) is customized for a given RIC environment and the resulting customized helm chart is stored in a local helm chart repo used by the RIC environment's xApp Manager); Run-time Parameters Configuration (before the xApp can be deployed, run-time helm chart parameters will be provided by the operator to customized the xApp Kubemetes deployment instance. This procedure is mainly used to configure run-time unique helm chart parameters such as instance UUID, liveness check, east-bound and north-bound service endpoints (e.g., DBAAS entry, VES collector endpoint) and so on); and deployed (the xApp has been deployed via the xApp Manager and the xApp pod is running on a RIC instance. For xApps where it makes sense, the deployed status may be further divided into additional states controlled via xApp configuration updates. For example, Running, Stopped).

The general principles guiding the definition of Near-RT RIC architecture as well as the interfaces between Near-RT RIC 1114, E2 Nodes and Service Management & Orchestration are the following: Near-RT RIC 1114 and E2 Node functions are fully separated from transport functions. Addressing scheme used in Near-RT RIC 1114 and the E2 Nodes shall not be tied to the addressing schemes of transport functions; the E2 Nodes support all protocol layers and interfaces defined within 3GPP radio access networks that include eNB for E-UTRAN and gNB/ng-eNB for NG-RAN; Near-RT RIC 1114 and hosted "xApp" applications shall use a set of services exposed by an E2 Node that is described by a series of RAN function and Radio Access Technology (RAT) dependent E2 Service Models; and the Near-RT RIC 1114 interfaces are defined along the following principles: the functional division across the interfaces have as few options as possible; interfaces are based on a logical model of the entity controlled through this interface; and one physical network element can implement multiple logical nodes.

xApps may enhance the RRM capabilities of the Near-RT RIC 1114. xApps provide logging, tracing and metrics collection to the Near-RT RIC 1114. xApps include an xApp descriptor and xApp image. The xApp image is the software package. The xApp image contains all the files needed to deploy an xApp. An xApp can have multiple versions of xApp image, which are tagged by the xApp image version number.

The xApp descriptor describes the packaging format of xApp image. The xApp descriptor also provides the necessary data to enable their management and orchestration. The xApp descriptor provides xApp management services with necessary information for the LCM of xApps, such as deployment, deletion, upgrade and the like. The xApp descriptor also provides extra parameters related to the health management of the xApps, such as auto scaling when the load of xApp is too heavy and auto healing when xApp becomes unhealthy. The xApp descriptor provides FCAPS and control parameters to xApps when xApp is launched.

The definition of xApp descriptor includes: xApp basic information, FCAPS management specifications, and control specifications. The basic information of xApp, including name, version, provider, URL of xApp image, virtual resource requirements (e.g., CPU), and the like. The basic information of xApp is used to support LCM of xApps. Additionally or alternatively, the basic information of xApp includes or indicates configuration, metrics, and control data about an xApp. The FCAPS management specifications that specify the options of configuration, performance metrics collection, and the like, for the xApp. The control specifications that specify the data types consumed and provided by the xApp for control capabilities (e.g., Performance Management (PM) data that the xApp subscribes, the message type of control messages).

Additionally or alternatively, the xApp descriptor components include xApp configuration, xApp controls specification, and xApp metrics. The xApp configuration specification includes a data dictionary for the configuration data (e.g., metadata such as a yang definition or a list of configuration parameters and their semantics). Additionally, the xApp configuration may include an initial configuration of xApps. The xApp controls specification includes the types of data it consumes and provides that enable control capabilities (e.g., xApp URL, parameters, input/output type). The xApp metrics specification shall include a list of metrics (e.g., metric name, type, unit and semantics) provided by the xApp.

Figure 12:
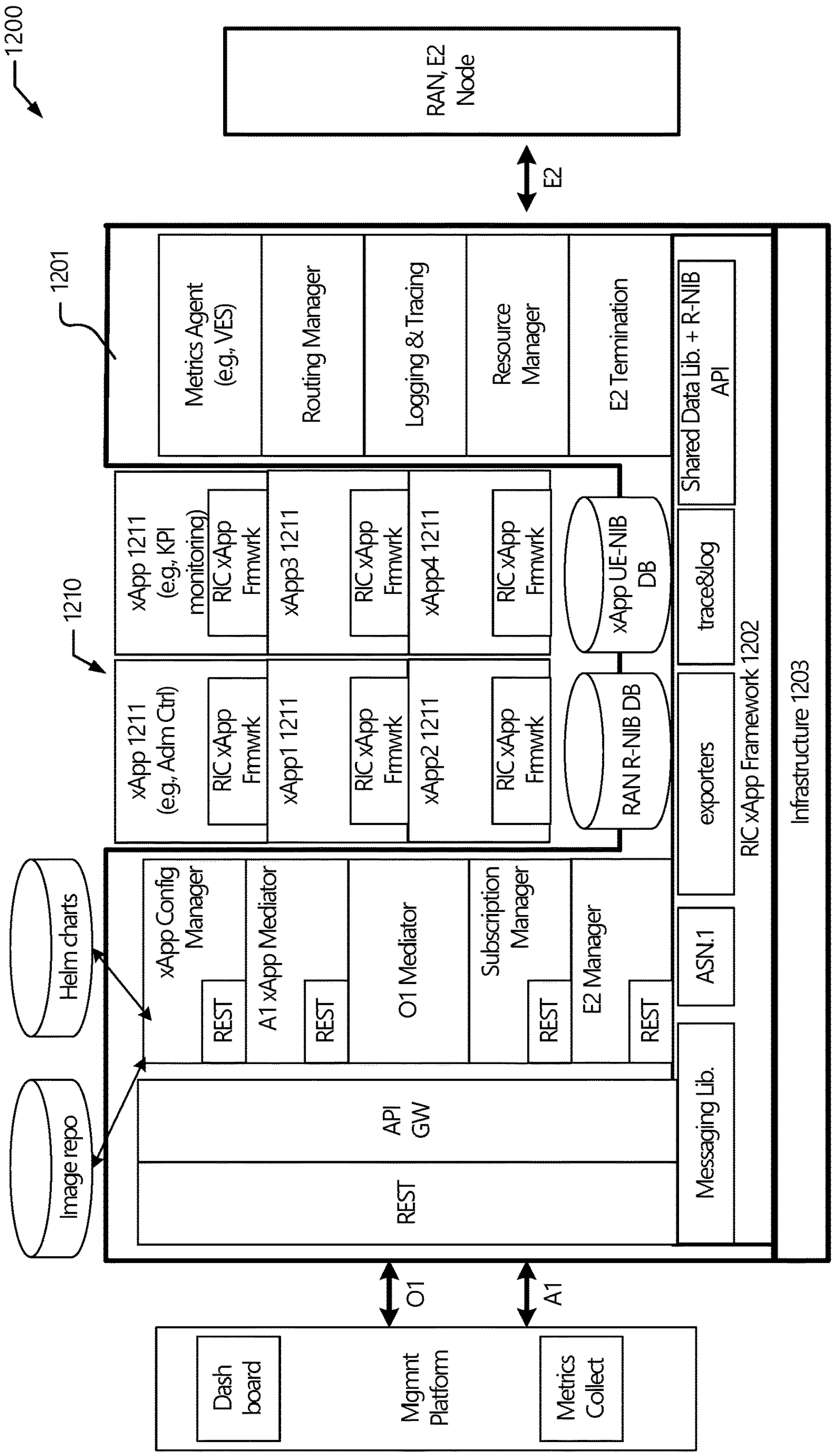
FIG. 12 depicts an O-RAN architectures/frameworks for adding 3rd party xApps.
Figure 13:
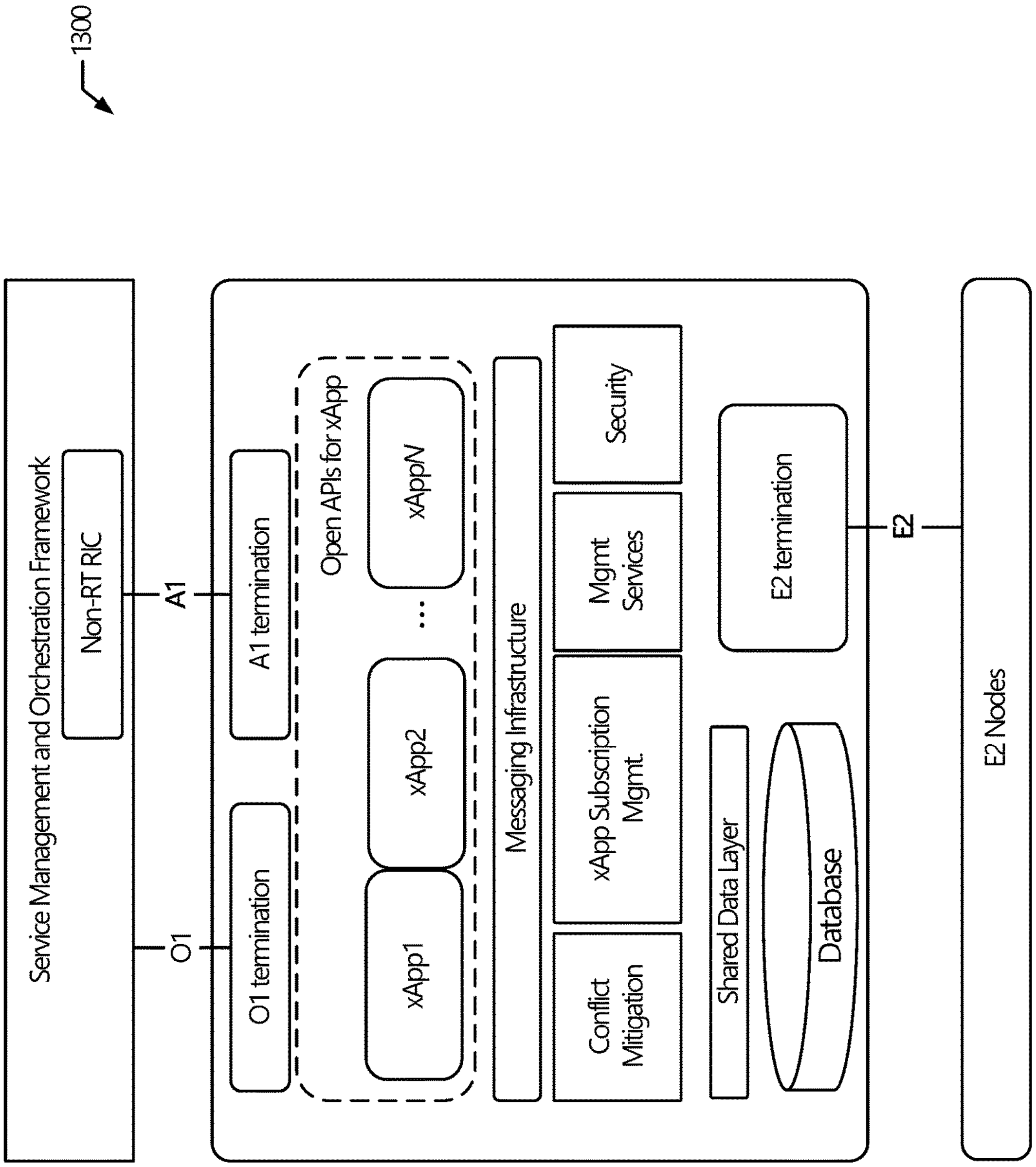
FIG. 13 depicts a Near-RT RIC Internal Architecture.

FIG. 12 depicts an example O-RAN architectures/frameworks 1200 for adding 3rd party xApps. FIG. 13 depicts an example Near-RT RIC Internal Architecture 1300. In FIG. 12, the O-RAN architecture/framework 1200 includes a RIC platform 1201 on top of infrastructure 1203. The RIC platform 1201 includes a RIC xApp framework 1202, a Radio-Network Information Base (R-NIB) database (DB), an xApp UE Network Information Base (UE-NIB) DB, a metrics agent (e.g., a VNF Event Stream (VES) agent, VES Prometheus Adapter (VESPA), and the like), a routing manager (e.g., Prometheus event monitoring and alerting system, and the like), a logger/tracer (e.g., OpenTracing, and the like), a resource manager, an E2 termination, an xApp configuration manager, an A1 xApp mediator, an O1 mediator, a subscription manager, a E2 manager, and API gateway (GW) (e.g., Kong, and the like), and a REST element. The xApp configuration manager communicates with an image repository and a Helm charts repository using, for example, REST APIs and/or the like.

The RIC xApp framework 1202 includes a messaging library (lib.), and ASN.1 module, one or more exporters (e.g., Prometheus exporters, and the like), a trace and log element, and a shared library with R-NIB APIs and/or the like. The RIC platform 1201 communicates with a management platform over the O1 interface and/or the A1 interface, and also communicates with a RAN and/or E2 nodes over the E2 interface. The management platform may include dashboards and/or metrics collectors. Furthermore, various xApps operate on top of the RIC xApp framework 1202, such as, for example an administration control xApp, a KPI monitor xApp, as well as other xApps. One or more of the xApps may implement aspects of the cybersecurity and/or interface testing embodiments discussed herein.

In the examples of FIGS. 12 and 13, the Near-RT RIC hosts the following functions: Database functionality, which allows reading and writing of RAN/UE information; xApp subscription management, which merges subscriptions from different xApps and provides unified data distribution to xApps; Conflict mitigation, which resolves potentially overlapping or conflicting requests from multiple xApps; Messaging infrastructure, which enables message interaction amongst Near-RT RIC internal functions; Security, which provides the security scheme for the xApps; and Management services including: fault management, configuration management, and performance management as a service producer to SMO; life-cycle management of xApps; and logging, tracing and metrics collection, which capture, monitor and collect the status of Near-RT RIC internals and can be transferred to external system for further evaluation; and Interface Termination including: E2 termination, which terminates the E2 interface from an E2 Node; A1 termination, which terminates the A1 interface from the non-RT RIC; and O1 termination, which terminates the O1 interface from SMO; and Functions hosted by xApps, which allow services to be executed at the Near-RT RIC and the outcomes sent to the E2 Nodes via E2 interface. xApps may provide UE related information to be stored in the UE-NIB (UE-Network Information Base) database. UE-NIB maintains a list of UEs and associated data. The UE-NIB maintains tracking and correlation of the UE identities associated with the connected E2 nodes. xApps may provide radio access network related information to be stored in the R-NIB (Radio-Network Information Base) database. The R-NIB stores the configurations and near real-time information relating to connected E2 Nodes and the mappings between them. xApp subscription management manages subscriptions from the xApps to the E2 Nodes. xApp subscription management enforces authorization of policies controlling xApp access to messages. xApp subscription management enables merging of identical subscriptions from different xApps into a single subscription to the E2 Node.

3. Hardware Component, Configurations, and Arrangements

Figure 14:
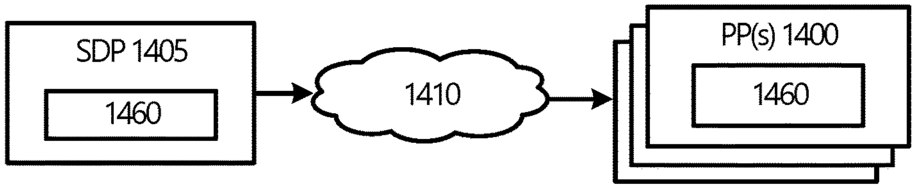
FIG. 14 illustrates an example software distribution platform.
Figure 15:
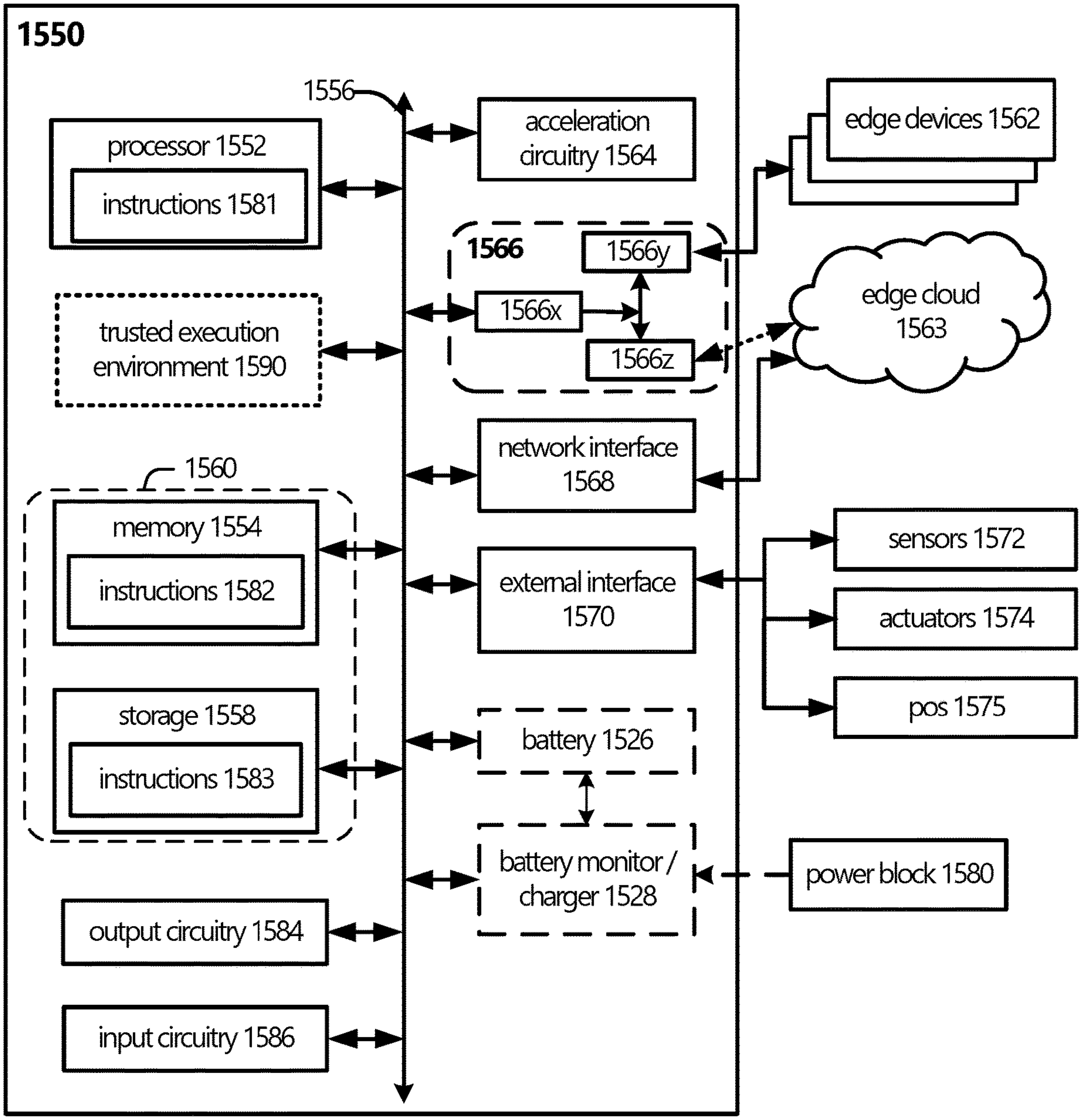
FIG. 15 depicts example components a compute node.

FIG. 14 illustrates an example software (SW) distribution platform (SDP) 1405 to distribute software 1460, such as the example computer readable instructions 1581, 1582, 1583 of FIG. 15, to one or more devices, such as example processor platform(s) (pp) 1400, connected edge devices 1562 (see e.g., FIG. 15), and/or any of the other computing systems/devices discussed herein. The SDP 1405 (or components thereof) may be implemented by any computer server, data facility, cloud service, CDN, edge computing framework, and/or the like, capable of storing and transmitting software (e.g., code, scripts, executable binaries, containers, packages, compressed files, and/or derivatives thereof) to other computing devices (e.g., third parties, the example connected edge devices 1562 of FIG. 15). The SDP 1405 (or components thereof) may be located in a cloud (e.g., data center, and/or the like), a local area network, an edge network, a wide area network, on the Internet, and/or any other location communicatively coupled with the pp 1400.

The pp 1400 and/or connected edge devices 1562 connected edge devices 1562 may include customers, clients, managing devices (e.g., servers), third parties (e.g., customers of an entity owning and/or operating the SDP 1405), IoT devices, and the like. The pp 1400/connected edge devices 1562 may operate in commercial and/or home automation environments. In some examples, a third party is a developer, a seller, and/or a licensor of software such as the example computer readable media 1581, 1582, 1583 of FIG. 15. The third parties may be consumers, users, retailers, OEMs, and/or the like that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), and/or the like). In some examples, the pp 1400/connected edge devices 1562 can be physically located in different geographic locations, legal jurisdictions, and/or the like.

In FIG. 14, the SDP 1405 includes one or more servers (referred to as "servers 1405") and one or more storage devices (referred to as "storage 1405"). The storage 1405 store the computer readable instructions 1460, which may correspond to the instructions 1581, 1582, 1583 of FIG. 15. The servers 1405 are in communication with a network 1410, which may correspond to any one or more of the Internet and/or any of the example networks as described herein. The servers 1405 are responsive to requests to transmit the software to a requesting party as part of a commercial transaction. Payment for the delivery, sale and/or license of the software may be handled by the servers 1405 and/or via a third-party payment entity. The servers 1405 enable purchasers and/or licensors to download the computer readable instructions 1460 from the SDP 1405.

The servers 1405 are communicatively connected to one or more security domains and/or security devices through which requests and transmissions of the example computer readable instructions 1460 must pass. Additionally or alternatively, the servers 1405 periodically offer, transmit, and/or force updates to the software 1460 to ensure improvements, patches, updates, and/or the like are distributed and applied to the software at the end user devices. The computer readable instructions 1460 are stored on storage 1405 in a particular format. A format of computer readable instructions includes, but is not limited to a particular code language (e.g., Java, JavaScript, Python, C, C #, SQL, HTML, and/or the like), and/or a particular code state (e.g., uncompiled code (e.g., ASCII), interpreted code, linked code, executable code (e.g., a binary), and/or the like), and/or any other format such as those discussed herein. In some examples, the computer readable instructions 1460 stored in the SDP 1405 are in a first format when transmitted to the pp 1400. Additionally or alternatively, the first format is an executable binary in which particular types of the pp 1400 can execute. Additionally or alternatively, the first format is uncompiled code that requires one or more preparation tasks to transform the first format to a second format to enable execution on the pp 1400. For example, the receiving pp 1400 may need to compile the computer readable instructions 1460 in the first format to generate executable code in a second format that is capable of being executed on the pp 1400. Additionally or alternatively, the first format is interpreted code that, upon reaching the pp 1400, is interpreted by an interpreter to facilitate execution of instructions. Additionally or alternatively, different components of the computer readable instructions 1582 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

The various devices and/or systems discussed herein may be servers, appliances, network infrastructure, machines, robots, drones, and/or any other type of computing devices. For example, the edge cloud may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, and/or the like) and/or racks (e.g., server racks, blade mounts, and/or the like). Example housings and/or surfaces thereof may support one or more sensors (e.g., temperature sensors, vibration sensors, light sensors, acoustic sensors, capacitive sensors, proximity sensors, and/or the like). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, and/or the like) and/or articulating hardware (e.g., robot arms, pivotable appendages, and/or the like). In some circumstances, the sensors may include any type of input devices such as user interface hardware (e.g., buttons, switches, dials, sliders, and/or the like). In some circumstances, example housings include output devices contained in, carried by, embedded therein and/or attached thereto. Output devices may include displays, touchscreens, lights, LEDs, speakers, I/O ports (e.g., USB), and/or the like In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, and/or the like. Example hardware for implementing an appliance computing device is described in conjunction with FIG. 15. The edge cloud may also include one or more servers and/or one or more multi-tenant servers. Such a server may include an operating system and implement a virtual computing environment. A virtual computing environment may include a hypervisor managing (e.g., spawning, deploying, destroying, and/or the like) one or more virtual machines, one or more containers, and/or the like. Such virtual computing environments provide an execution environment in which one or more applications and/or other software, code or scripts may execute while being isolated from one or more other applications, software, code or scripts.

FIG. 15 illustrates an example of components that may be present in a computing node 1550 for implementing the techniques (e.g., operations, processes, methods, and methodologies) described herein. The compute node 1550 provides a closer view of the respective components of node 1500 when implemented as or as part of a computing device (e.g., as a mobile device, a base station, server, gateway, and/or the like). The compute node 1550 may include any combinations of the hardware or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, hardware, hardware accelerators, software, firmware, or a combination thereof adapted in the compute node 1550, or as components otherwise incorporated within a chassis of a larger system.

As examples, the compute node 1550 may correspond to the (R)AN 104, NAN 130, slice manager 150, telco compute cluster 142 (or compute nodes therein), PCF 156, AMF 144, SMF 146, DN 140, UEs 601, NANs 631-633, and edge compute node 636, UEs 811, 821*a*, NANs 831-833, edge compute node(s) 836, CN 842 (or compute node(s) therein), and/or cloud 844 (or compute node(s) therein), UEs 1001, e/gNBs 1010, DUs 1015, RUs 1016, CPs 1021, 1022, Non-RT RIC 1012, Near-RT RIC 1014, and/or any other element of FIGS. 1-10; software distribution platform 1405 and/or processor platform(s) 1400 of FIG. 14; CUs, DUs, and/or remote units (RUs) of a 3GPP-based CU/DU split RAN architecture; MEC hosts/servers and/or MEC platforms in ETSI MEC implementations; 3GPP edge computing; EAS, EES, and/or ECS of a 3GPP edge computing architecture; Non-RT RIC, Near-RT RIC, and/or E2 nodes in O-RAN implementations; and/or any other component, device, and/or system discussed herein. The compute node 1550 may be embodied as a type of device, appliance, computer, or other "thing" capable of communicating with other edge, networking, or endpoint components. For example, compute node 1550 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 1550 includes processing circuitry in the form of one or more processors 1552. The processor circuitry 1552 includes circuitry such as, but not limited to one or more processor cores and one or more of cache memory, low drop-out voltage regulators (LDOs), interrupt controllers, serial interfaces such as SPI, $I^2C$ or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1552 may include one or more hardware accelerators (e.g., same or similar to acceleration circuitry 1564), which may be microprocessors, programmable processing devices (e.g., FPGA, ASIC, and/or the like), or the like. The one or more accelerators may include, for example, computer vision and/or deep learning accelerators. In some implementations, the processor circuitry 1552 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1552 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special purpose processing unit and/or specialized processing unit, or any other known processing elements, or any suitable combination thereof. In some implementations, the processor circuitry 1552 may be embodied as a specialized x-processing unit (xPU) also known as a data processing unit (DPU), infrastructure processing unit (IPU), or network processing unit (NPU). An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or A1 hardware (e.g., GPUs or programmed FPGAs). The xPU may be designed to receive programming to process one or more data streams and perform specific tasks and actions for the data streams (e.g., hosting microservices, performing service management or orchestration, organizing or managing server or data center hardware, managing service meshes, or collecting and distributing telemetry), outside of a CPU or general purpose processing hardware. However, an xPU, a SoC, a CPU, and other variations of the processor circuitry 1552 may work in coordination with each other to execute many types of operations and instructions within and on behalf of the compute node 1550.

The processors (or cores) 1552 may be coupled with or may include memory/storage and may be configured to execute instructions stored in the memory/storage to enable various applications or operating systems to run on the platform 1550. The processors (or cores) 1552 is configured to operate application software to provide a specific service to a user of the platform 1550. Additionally or alternatively, the processor(s) 1552 may be a special-purpose processor(s)/controller(s) configured (or configurable) to operate according to the elements, features, and implementations discussed herein.

As examples, the processor(s) 1552 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1552 may be a part of a system on a chip (SoC), System-in-Package (SiP), a multi-chip package (MCP), and/or the like, in which the processor(s) 1552 and other components are formed into a single integrated circuit, or a single package, such as the Edison™ or Galileo™ SoC boards from Intel® Corporation. Other examples of the processor(s) 1552 are mentioned elsewhere in the present disclosure.

The processor(s) 1552 may communicate with system memory 1554 over an interconnect (IX) 1556. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1558 may also couple to the processor 1552 via the IX 1556. In an example, the storage 1558 may be implemented via a solid-state disk drive (SSDD) and/or high-speed electrically erasable memory (commonly referred to as “flash memory”). Other devices that may be used for the storage 1558 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1554 and/or storage circuitry 1558 may also incorporate three-dimensional (3D) cross-point (XPOINT) memories from Intel® and Micron®.

In low power implementations, the storage 1558 may be on-die memory or registers associated with the processor 1552. However, in some examples, the storage 1558 may be implemented using a micro hard disk drive (HDD). Further, any number of new technologies may be used for the storage 1558 in addition to, or instead of, the technologies described, such resistance change memories, phase change memories, holographic memories, or chemical memories, among others.

The components of edge computing device 1550 may communicate over an interconnect (IX) 1556. The IX 1556 may represent any suitable type of connection or interface such as, for example, metal or metal alloys (e.g., copper, aluminum, and/or the like), fiber, and/or the like. The IX 1556 may include any number of IX, fabric, and/or interface technologies, including instruction set architecture (ISA), extended ISA (eISA), Inter-Integrated Circuit ($I^2C$), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, HyperTransport IXs, NVLink provided by NVIDIA®, a Time-Trigger Protocol (TTP) system, a FlexRay system, PROFIBUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 1556 may be a proprietary bus, for example, used in a SoC based system.

The IX 1556 couples the processor 1552 to communication circuitry 1566 for communications with other devices, such as a remote server (not shown) and/or the connected edge devices 1562. The communication circuitry 1566 is a hardware element, or collection of hardware elements, used to communicate over one or more networks (e.g., cloud 1563) and/or with other devices (e.g., edge devices 1562).

The transceiver 1566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1566 (or multiple transceivers) may communicate using multiple standards or radios for communications at a different range. For example, the compute node 1550 may communicate with close devices, e.g., within about 10 meters, using a local transceiver based on BLE, or another low power radio, to save power. More distant connected edge devices 1562, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1566 (e.g., a radio transceiver) may be included to communicate with devices or services in the edge cloud 1563 via local or wide area network protocols. The wireless network transceiver 1566 may be an LPWA transceiver that follows the IEEE 802.15.4, or IEEE 802.15.4g standards, among others. The compute node 1563 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1566, as described herein. For example, the transceiver 1566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1566 may include radios that are compatible with any number of 3GPP specifications, such as LTE and 5G/NR communication systems, discussed in further detail at the end of the present disclosure. A network interface controller (NIC) 1568 may be included to provide a wired communication to nodes of the edge cloud 1563 or to other devices, such as the connected edge devices 1562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 1568 may be included to enable connecting to a second network, for example, a first NIC 1568 providing communications to the cloud over Ethernet. and a second NIC 1568 providing communications to other devices over another type of network.

Given the variety of types of applicable communications from the device to another component or network, applicable communications circuitry used by the device may include or be embodied by any one or more of components 1564, 1566, 1568, or 1570. Accordingly, in various examples, applicable means for communicating (e.g., receiving, transmitting, and/or the like) may be embodied by such communications circuitry.

The compute node 1550 may include or be coupled to acceleration circuitry 1564, which may be embodied by one or more A1 accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include A1 processing (including machine learning, training, inferencing, and classification operations), visual data processing, network data processing, object detection, rule analysis, or the like. In FPGA-based implementations, the acceleration circuitry 1564 may comprise logic blocks or logic fabric and other interconnected resources that may be programmed (configured) to perform various functions, such as the procedures, methods, functions, and/or the like discussed herein. In such implementations, the acceleration circuitry 1564 may also include memory cells (e.g., EPROM, EEPROM, flash memory, static memory (e.g., SRAM, anti-fuses, and/or the like) used to store logic blocks, logic fabric, data, and/or the like in LUTs and the like.

The IX 1556 also couples the processor 1552 to a sensor hub or external interface 1570 that is used to connect additional devices or subsystems. The additional/external devices may include sensors 1572, actuators 1574, and positioning circuitry 1575.

The sensor circuitry 1572 includes devices, modules, or subsystems whose purpose is to detect events or changes in its environment and send the information (sensor data) about the detected events to some other a device, module, subsystem, and/or the like. Examples of such sensors 1572 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1550); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1574, allow platform 1550 to change its state, position, and/or orientation, or move or control a mechanism or system. The actuators 1574 comprise electrical and/or mechanical devices for moving or controlling a mechanism or system, and converts energy (e.g., electric current or moving air and/or liquid) into some kind of motion. The actuators 1574 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1574 may include one or more electromechanical devices such as pneumatic actuators, hydraulic actuators, electromechanical switches including electromechanical relays (EMRs), motors (e.g., DC motors, stepper motors, servomechanisms, and/or the like), power switches, valve actuators, wheels, thrusters, propellers, claws, clamps, hooks, audible sound generators, visual warning devices, and/or other like electromechanical components. The platform 1550 may be configured to operate one or more actuators 1574 based on one or more captured events and/or instructions or control signals received from a service provider and/or various client systems.

The positioning circuitry 1575 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and/or the like), or the like. The positioning circuitry 1575 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1575 may include a Micro-Technology for Positioning, Navigation, and Timing (Micro-PNT) IC that uses a primary timing clock to perform position tracking/estimation without GNSS assistance. The positioning circuitry 1575 may also be part of, or interact with, the communication circuitry 1566 to communicate with the nodes and components of the positioning network. The positioning circuitry 1575 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1575 is, or includes an INS, which is a system or device that uses sensor circuitry 1572 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 1550 without the need for external references.

In some optional examples, various input/output (UO) devices may be present within or connected to, the compute node 1550, which are referred to as input circuitry 1586 and output circuitry 1584 in FIG. 15. The input circuitry 1586 and output circuitry 1584 include one or more user interfaces designed to enable user interaction with the platform 1550 and/or peripheral component interfaces designed to enable peripheral component interaction with the platform 1550. Input circuitry 1586 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1584 may be included to show information or otherwise convey information, such as sensor readings, actuator position(s), or other like information. Data and/or graphics may be displayed on one or more user interface components of the output circuitry 1584. Output circuitry 1584 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, and/or the like), with the output of characters, graphics, multimedia objects, and the like being generated or produced from the operation of the platform 1550. The output circuitry 1584 may also include speakers or other audio emitting devices, printer(s), and/or the like. Additionally or alternatively, the sensor circuitry 1572 may be used as the input circuitry 1584 (e.g., an image capture device, motion capture device, or the like) and one or more actuators 1574 may be used as the output device circuitry 1584 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and/or the like. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1576 may power the compute node 1550, although, in examples in which the compute node 1550 is mounted in a fixed location, it may have a power supply coupled to an electrical grid, or the battery may be used as a backup or for temporary capabilities. The battery 1576 may be a lithium ion battery, or a metal-air battery, such as a zinc-air battery, an aluminum-air battery, a lithium-air battery, and the like.

A battery monitor/charger 1578 may be included in the compute node 1550 to track the state of charge (SoCh) of the battery 1576, if included. The battery monitor/charger 1578 may be used to monitor other parameters of the battery 1576 to provide failure predictions, such as the state of health (SoH) and the state of function (SoF) of the battery 1576. The battery monitor/charger 1578 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1578 may communicate the information on the battery 1576 to the processor 1552 over the IX 1556. The battery monitor/charger 1578 may also include an analog-to-digital (ADC) converter that enables the processor 1552 to directly monitor the voltage of the battery 1576 or the current flow from the battery 1576. The battery parameters may be used to determine actions that the compute node 1550 may perform, such as transmission frequency, mesh network operation, sensing frequency, and the like.

A power block 1580, or other power supply coupled to a grid, may be coupled with the battery monitor/charger 1578 to charge the battery 1576. In some examples, the power block 1580 may be replaced with a wireless power receiver to obtain the power wirelessly, for example, through a loop antenna in the compute node 1550. A wireless battery charging circuit, such as an LTC4020 chip from Linear Technologies of Milpitas, California, among others, may be included in the battery monitor/charger 1578. The specific charging circuits may be selected based on the size of the battery 1576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1558 may include instructions 1583 in the form of software, firmware, or hardware commands to implement the techniques described herein. Although such instructions 1582, 1583 are shown as code blocks included in the memory 1554 and the storage 1558, any of the code blocks 1582, 1583 may be replaced with hardwired circuits, for example, built into an application specific integrated circuit (ASIC) or programmed into an FPGA, or the like.

In an example, the instructions 1581, 1582, 1583 provided via the memory 1554, the storage 1558, or the processor 1552 may be embodied as a non-transitory machine-readable medium (NTMRM) 1560 including code to direct the processor 1552 to perform electronic operations in the compute node 1550. The processor 1552 may access the NTMRM 1560 over the IX 1556. For instance, the NTMRM 1560 may be embodied by devices described for the storage 1558 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTMRM 1560 may include instructions to direct the processor 1552 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Computer program code for carrying out operations of the present disclosure (e.g., computational logic and/or instructions 1581, 1582, 1583) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 1581, 1582, 1583 for carrying out operations of the present disclosure may also be written in any combination of the programming languages discussed herein. The program code may execute entirely on the system 1550, partly on the system 1550, as a stand-alone software package, partly on the system 1550 and partly on a remote computer or entirely on the remote computer or server. In the latter scenario, the remote computer may be connected to the system 1550 through any type of network, including a LAN or WAN, or the connection may be made to an external computer (e.g., through the Internet using an Internet Service Provider (ISP)).

In an example, the instructions 1581, 1582, 1583 on the processor circuitry 1552 (separately, or in combination with the instructions 1581, 1582, 1583) may configure execution or operation of a trusted execution environment (TEE) 1590. The TEE 1590 operates as a protected area accessible to the processor circuitry 1502 to enable secure access to data and secure execution of instructions. In some embodiments, the TEE 1590 may be a physical hardware device that is separate from other components of the system 1550 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1590 may be implemented as secure enclaves, which are isolated regions of code and/or data within the processor and/or memory/storage circuitry of the system 1550. Only code executed within a secure enclave may access data within the same secure enclave, and the secure enclave may only be accessible using the secure application (which may be implemented by an application processor or a tamper-resistant microcontroller). Various implementations of the TEE 1590, and an accompanying secure area in the processor circuitry 1552 or the memory circuitry 1554 and/or storage circuitry 1558 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations ma be implemented in the device 1500 through the TEE 1590 and the processor circuitry 1552. Additionally or alternatively, the memory circuitry 1554 and/or storage circuitry 1558 may be divided into isolated user-space instances such as containers, partitions, virtual environments (VEs), and/or the like. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1504 and/or storage circuitry 1508 may be divided into one or more trusted memory regions for storing applications or software modules of the TEE 1590.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, and/or the like), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, and/or the like) on one or several remote servers. The source code packages may be encrypted when in transit over a network and decrypted, uncompressed, assembled (e.g., linked) if necessary, and compiled or interpreted (e.g., into a library, stand-alone executable, and/or the like) at a local machine, and executed by the local machine.

FIG. 15 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

4. Example Implementations

Figure 7:
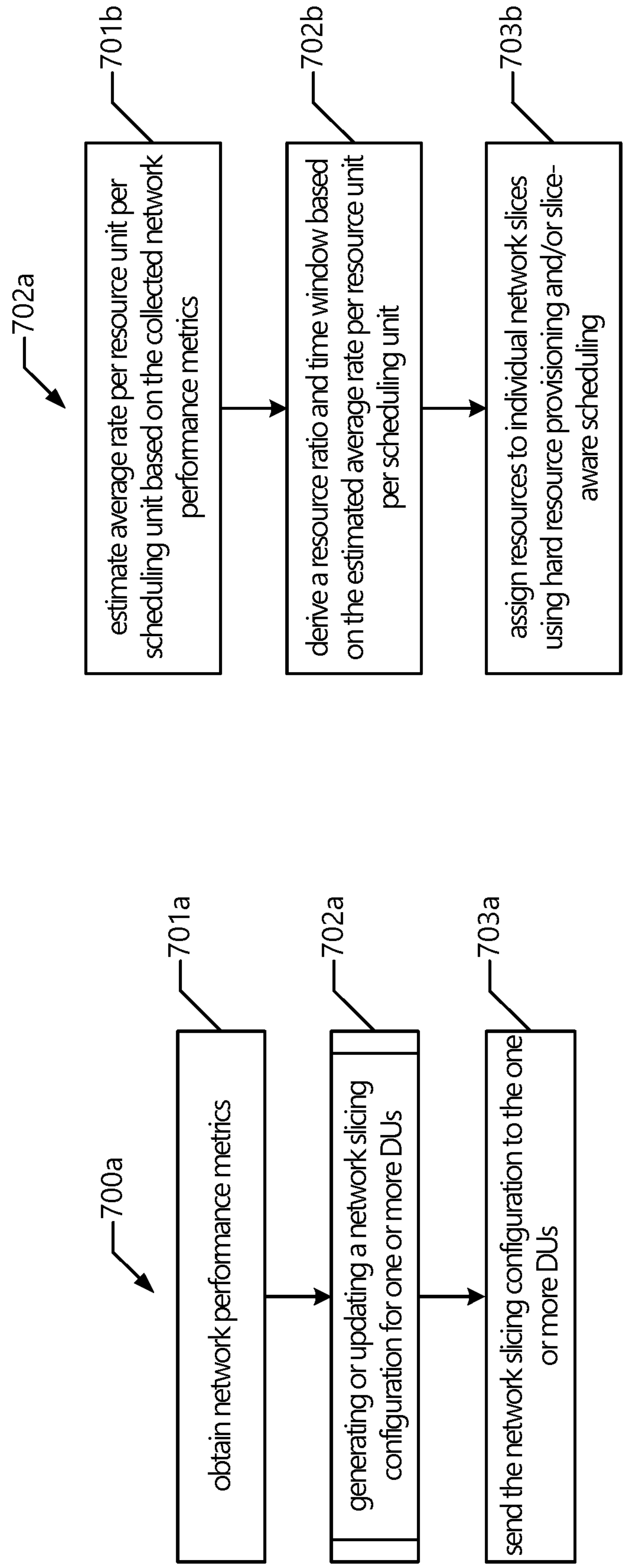
FIG. 7 depicts examples processes for practicing the network slicing aspects discussed herein.

FIG. 7 shows examples processes for practicing the various network slicing aspects discussed herein. In particular, Figure m shows a process 700*a* for operating an INSM 150. Process 700*a* begins at operation 701*a* where the INSM 150 collects network performance measurements. At operation 702*a*, the INSM 150 generates or updates a network slicing configuration for one or more DUs 1015 based on service level agreements (SLAs) for network slices and the collected network performance measurements. In this example, the network slicing configuration includes one or more parameters defining how a portion of radio resources are to be prioritized for a network slice. At operation 703*a*, the INSM 150 sends or provisions the one or more DUs 1015 with the generated/updated network slicing configurations.

Additionally, generating or updating the network slicing configuration at operation 702*a* also includes the following operations: At operation 701*b*, the INSM 150 estimates an average rate per resource unit (e.g., RBs) per scheduling unit based on the collected network performance metrics (e.g., SLA/QoS targets, traffic pattern, traffic load estimates, RAN performance metrics, and/or the like). At operation 702*b*, the INSM 150 derives a resource ratio and time window based on the estimated average rate per resource unit per scheduling unit. At operation 703*b*, the INSM 150 assigns resources to individual network slices using hard resource provisioning and/or slice-aware scheduling.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 includes a method of operating an intelligent network slice manager, comprising: collecting network performance measurements from one or more data sources; and generating or updating a network slice configuration based on service level agreements (SLAs) for a network slice and the collected network performance measurements, wherein the network slice configuration includes a set of network slice parameters that define how a portion of allocated radio resources are to be prioritized for the network slice; and sending the network slice configuration to a distributed unit (DU), wherein the network slice configuration instructs the DU to provide the network slice according to the set of network slice parameters.

Example 2 includes the method of example 1 and/or some other example(s) herein, wherein the network performance measurements include radio access network (RAN) performance metrics, and the method includes: receiving RAN performance measurements over a RAN performance monitoring interface.

Example 3 includes the method of example 2 and/or some other example(s) herein, wherein the RAN performance monitoring interface is an E2 interface or an O1 interface in an Open RAN (O-RAN) architecture.

Example 4 includes the method of examples 2-3 and/or some other example(s) herein, wherein the RAN performance measurements include one or more of per flow physical resource block (PRB) utilization level measurements, per UE physical layer (PHY) rate (e.q. from channel quality information (CQI)), slice traffic volume, data radio bearers (DRB) traffic volume, latency measurements, delay violation rate, and throughput measurements.

Example 5 includes the method of examples 1-4 and/or some other example(s) herein, wherein the network slice configuration includes a data flow handling configuration, and the data flow handling configuration includes one or more of parameters for performing packet duplication, parameters for performing semi-persistent scheduling, and parameters for performing grant-free scheduling.

Example 6 includes the method of examples 1-5 and/or some other example(s) herein, wherein the network slice configuration includes a per-slice resource configuration.

Example 7 includes the method of example 6 and/or some other example(s) herein, wherein the per-slice radio resource configuration is a radio resource management (RRM) policy information object class (IOC).

Example 8 includes the method of example 7 and/or some other example(s) herein, wherein the RRM policy IOC includes an RRM policy, wherein the RRM policy IOC includes a resource type attribute and an RRM policy member list attribute, wherein the resource type attribute includes a type of resources to be used for the network slice and the RRM policy member list attribute includes a set of RRM policy members that are subject to the per-slice radio resource configuration.

Example 9 includes the method of example 8 and/or some other example(s) herein, wherein the RRM policy IOC includes a shared resources attribute, and the shared resources attribute includes resources that can be shared with network slices or other users outside of the set of RRM policy members in the RRM policy member list attribute.

Example 10 includes the method of examples 8-9 and/or some other example(s) herein, wherein the RRM policy IOC includes a prioritized resources attribute, and the prioritized resources attribute includes resources that are preferentially used by members of the set of RRM policy members in the RRM policy member list attribute.

Example 11 includes the method of examples 8-10 and/or some other example(s) herein, wherein the RRM policy IOC includes a dedicated resources attribute, and the dedicated resources attribute includes resources that are dedicated for use by members of the set of RRM policy members in the RRM policy member list attribute.

Example 12 includes the method of example 11 and/or some other example(s) herein, wherein the RRM policy IOC includes a maximum ratio attribute that defines a maximum resource usage quota for the members of the set of RRM policy members, a minimum ratio attribute that defines a minimum resource usage quota for the members of the set of RRM policy members, and a dedicated ratio attribute that defines dedicated resource usage quota for the members of the set of RRM policy members.

Example 13 includes the method of examples 6-12 and/or some other example(s) herein, wherein the network slice configuration includes one or more of a slice priority configuration, an SLA or quality of service (QoS) target, and a data flow handling configuration.

Example 14 includes the method of examples 1-13 and/or some other example(s) herein, wherein the SLAs are based on one or more of a latency bound, a reliability target, and a set of QoS parameters.

Example 15 includes the method of examples 1-14 and/or some other example(s) herein, wherein the method includes: estimating an average rate per resource unit per scheduling unit ("R") based on the collected network performance measurements.

Example 16 includes the method of example 15 and/or some other example(s) herein, wherein the estimating the R includes: performing a lookup operation on a lookup table, wherein the lookup table maps one or more network performance measurements to respective modulation and coding schemes (MCSs).

Example 17 includes the method of example 16 and/or some other example(s) herein, wherein the one or more network performance measurements in the lookup table include signal-to-interference-and-noise-ratio (SINR) and block error rate (BLER) such that a set of an SINR and a BLER corresponds to at least one MCS in the lookup table Example 18 includes the method of examples 16-17 and/or some other example(s) herein, wherein the lookup table is generated using one or more machine learning models.

Example 19 includes the method of examples 15-18 and/or some other example(s) herein, wherein the method includes: determining a resource ratio and time window based on the estimated R.

Example 20 includes the method of example 19 and/or some other example(s) herein, wherein, when the network slice is a deterministic traffic network slice, the method includes: determining the resource ratio based on the time window, a payload size, and the estimated R.

Example 21 includes the method of example 20-21 and/or some other example(s) herein, wherein, when the network slice is a non-deterministic traffic network slice, the method includes: determining the resource ratio based on a guaranteed bit rate and the estimated R.

Example 22 includes a method of operating an medium access control (MAC) scheduler, the method comprising: receiving a network slice configuration from an intelligent network slice manager; and dynamically determining, based on parameters included in the network slice configuration, a set of packets of a data flow to be sent over individual air interfaces for one or more resource blocks (RB) to achieve an optimal performance based on radio channel conditions and quality of service (QoS) targets for a data flow of the data flow packets.

Example 23 includes the method of example 22 and/or some other example(s) herein, wherein the method includes: determining a subset of packets among the set of packets to be sent over the individual air interfaces using dedicated RBs of the one or more RBs, wherein the dedicated RBs are indicated by a per-slice radio resource configuration included in the network slice configuration.

Example 24 includes the method of examples 22-23 and/or some other example(s) herein, wherein the method includes: determining a subset of packets among the set of packets to be sent over the individual air interfaces using shared RBs indicated by the network slice configuration using one or both of proportional-fair scheduling, round robin scheduling, or first-in first-out scheduling.

Example 25 includes the method of examples 22-24 and/or some other example(s) herein, wherein the method includes: receiving updates to the network slice configuration from the intelligent network slice manager.

Example 26 includes the method of examples 22-25 and/or some other example(s) herein, wherein the determining comprises: determining the packet(s) to be sent over physical radio resource block(s) (PRB) based on radio channel conditions and quality of service (QoS) requirements for packet queues of different users.

Example 27 includes the method of examples 22-26 and/or some other example(s) herein, wherein the network slice configuration includes one or more of a slice priority configuration, an SLA or QoS target, and a data flow handling configuration.

Example 28 includes the method of examples 22-27 and/or some other example(s) herein, wherein the Intelligent Network Slice Manager is the Intelligent Network Slice Manager of any one or more of examples 1-21 and/or some other example(s) herein.

Example 29 includes the method of examples 1-28 and/or some other example(s) herein, wherein the Intelligent Network Slice Manager is implemented as one or multiple xApps located in or at a Near-Real-Time (RT) RAN Intelligent Controller (RIC) in an O-RAN framework or as one or more rApps at a Non-RT RIC in an O-RAN framework.

Example 30 includes the method of examples 1-28 and/or some other example(s) herein, wherein the Intelligent Network Slice Manager is implemented as a Multi-Access Edge Computing (MEC) application in a MEC framework Example 31 includes the method of examples 1-28, wherein the Intelligent Network Slice Manager is implemented as a RAN management function in a 3GPP network.

Example 32 includes the method of examples 1-28 and/or some other example(s) herein, wherein the Intelligent Network Slice Manager is implemented as an xApps operated by a Near-Real-Time (RT) RAN Intelligent Controller (RIC).

Example 33 includes the method of examples 1-28 and/or some other example(s) herein, wherein the Intelligent Network Slice Manager is implemented as an rApp operated by a Non-RT RIC.

The method of examples 1-28 and/or some other example(s) herein, wherein the Intelligent Network Slice Manager is implemented as an edge application in a Zero-touch System Management (ZSM) architecture.

Example 34 includes the method of examples 22-34 and/or some other example(s) herein, wherein the MAC scheduler is a layer-2 RAN function located in gNodeB (gNB).

Example 35 includes the method of examples 22-34 and/or some other example(s) herein, wherein the MAC scheduler is a layer-2 RAN function located in one or more distributed units (DUs) in centralized unit (CU)-DU split deployment.

Example 37 includes the method of examples 22-34 and/or some other example(s) herein, wherein the MAC scheduler is a layer-2 RAN function located in one or more DUs in an integrated or collocated CU-DU deployment.

Example 38 includes the method of examples 1-37 and/or some other example(s) herein, wherein the method is performed by a compute node, and the compute node is one of an network access node, a network element, a network appliance, an edge compute node in an edge computing network, a cloud compute node part of a cloud computing service, or an application server.

Example 39 includes one or more computer readable media comprising instructions, wherein execution of the instructions by processor circuitry is to cause the processor circuitry to perform the method of examples 1-38 and/or some other example(s) herein.

Example 40 includes a computer program comprising the instructions of example 39 and/or some other example(s) herein.

Example 41 includes an Application Programming Interface defining functions, methods, variables, data structures, and/or protocols for the computer program of example 40 and/or some other example(s) herein.

Example 42 includes an apparatus comprising circuitry loaded with the instructions of example 39 and/or some other example(s) herein.

Example 43 includes an apparatus comprising circuitry operable to run the instructions of example 39 and/or some other example(s) herein.

Example 44 includes an integrated circuit comprising one or more of the processor circuitry and the one or more computer readable media of example 39 and/or some other example(s) herein.

Example 45 includes a computing system comprising the one or more computer readable media and the processor circuitry of example 39 and/or some other example(s) herein.

Example 46 includes an apparatus comprising means for executing the instructions of example 39 and/or some other example(s) herein.

Example 47 includes a signal generated as a result of executing the instructions of example 39 and/or some other example(s) herein.

Example 48 includes a data unit generated as a result of executing the instructions of example 39 and/or some other example(s) herein.

Example 49 includes the data unit of example 48 and/or some other example(s) herein, the data unit is a datagram, network packet, data frame, data segment, a Protocol Data Unit (PDU), a Service Data Unit (SDU), a message, or a database object.

Example 50 includes a signal encoded with the data unit of examples 48-49 and/or some other example(s) herein.

Example 51 includes an electromagnetic signal carrying the instructions of example 39 and/or some other example(s) herein.

Example 52 includes an apparatus comprising means for performing the method of examples 1-38 and/or some other example(s) herein.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some examples refers to (partial or in full) acts, tasks, operations, and the like, related to bringing or the readying the bringing of something into existence either actively or passively (e.g., exposing a device identity or entity identity). Additionally or alternatively, the term "establish" or "establishment" at least in some examples refers to (partial or in full) acts, tasks, operations, and the like, related to initiating, starting, or warming communication or initiating, starting, or warming a relationship between two entities or elements (e.g., establish a session, establish a session, and the like). Additionally or alternatively, the term "establish" or "establishment" at least in some examples refers to initiating something to a state of working readiness. The term "established" at least in some examples refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some examples refers to (partial or in full) acts, tasks, operations, and the like, of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "receipt" at least in some examples refers to any action (or set of actions) involved with receiving or obtaining an object, data, data unit, and the like, and/or the fact of the object, data, data unit, and the like being received. The term "receipt" at least in some examples refers to an object, data, data unit, and the like, being pushed to a device, system, element, and the like (e.g., often referred to as a push model), pulled by a device, system, element, and the like (e.g., often referred to as a pull model), and/or the like.

The term "element" at least in some examples refers to a unit that is indivisible at a given level of abstraction and has a clearly defined boundary, wherein an element may be any type of entity including, for example, one or more devices, systems, controllers, network elements, modules, and so forth, or combinations thereof.

The term "measurement" at least in some examples refers to the observation and/or quantification of attributes of an object, event, or phenomenon. Additionally or alternatively, the term "measurement" at least in some examples refers to a set of operations having the object of determining a measured value or measurement result, and/or the actual instance or execution of operations leading to a measured value.

The term "metric" at least in some examples refers to a standard definition of a quantity, produced in an assessment of performance and/or reliability of the network, which has an intended utility and is carefully specified to convey the exact meaning of a measured value.

The term "signal" at least in some examples refers to an observable change in a quality and/or quantity. Additionally or alternatively, the term "signal" at least in some examples refers to a function that conveys information about of an object, event, or phenomenon. Additionally or alternatively, the term "signal" at least in some examples refers to any time varying voltage, current, or electromagnetic wave that may or may not carry information. The term "digital signal" at least in some examples refers to a signal that is constructed from a discrete set of waveforms of a physical quantity so as to represent a sequence of discrete values.

The terms "ego" (as in, e.g., "ego device") and "subject" (as in, e.g., "data subject") at least in some examples refers to an entity, element, device, system, and the like, that is under consideration or being considered. The terms "neighbor" and "proximate" (as in, e.g., "proximate device") at least in some examples refers to an entity, element, device, system, and the like, other than an ego device or subject device.

The term "identifier" at least in some examples refers to a value, or a set of values, that uniquely identify an identity in a certain scope. Additionally or alternatively, the term "identifier" at least in some examples refers to a sequence of characters that identifies or otherwise indicates the identity of a unique object, element, or entity, or a unique class of objects, elements, or entities. Additionally or alternatively, the term "identifier" at least in some examples refers to a sequence of characters used to identify or refer to an application, program, session, object, element, entity, variable, set of data, and/or the like. The "sequence of characters" mentioned previously at least in some examples refers to one or more names, labels, words, numbers, letters, symbols, and/or any combination thereof. Additionally or alternatively, the term "identifier" at least in some examples refers to a name, address, label, distinguishing index, and/or attribute. Additionally or alternatively, the term "identifier" at least in some examples refers to an instance of identification. The term "persistent identifier" at least in some examples refers to an identifier that is reused by a device or by another device associated with the same person or group of persons for an indefinite period.

The term "identification" at least in some examples refers to a process of recognizing an identity as distinct from other identities in a particular scope or context, which may involve processing identifiers to reference an identity in an identity database.

The term "lightweight" or "lite" at least in some examples refers to an application or computer program designed to use a relatively small amount of resources such as having a relatively small memory footprint, low processor usage, and/or overall low usage of system resources. The term "lightweight protocol" at least in some examples refers to a communication protocol that is characterized by a relatively small overhead. Additionally or alternatively, the term "lightweight protocol" at least in some examples refers to a protocol that provides the same or enhanced services as a standard protocol, but performs faster than standard protocols, has lesser overall size in terms of memory footprint, uses data compression techniques for processing and/or transferring data, drops or eliminates data deemed to be nonessential or unnecessary, and/or uses other mechanisms to reduce overall overheard and/or footprint.

The term "circuitry" at least in some examples refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), and the like, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some examples refers to, is part of, or includes circuitry capable of sequentially and automatically carrying out a sequence of arithmetic or logical operations, or recording, storing, and/or transferring digital data. The term "processor circuitry" at least in some examples refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some examples refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some examples refers to, is part of, or includes circuitry that enables the exchange of information between two or more components or devices.

The term "interface circuitry" at least in some examples refers to one or more hardware interfaces, for example, buses, I/O interfaces, peripheral component interfaces, network interface cards, and/or the like.

The term "device" at least in some examples refers to a physical entity embedded inside, or attached to, another physical entity in its vicinity, with capabilities to convey digital information from or to that physical entity.

The term "entity" at least in some examples refers to a distinct component of an architecture or device, or information transferred as a payload.

The term "controller" at least in some examples refers to an element or entity that has the capability to affect a physical entity, such as by changing its state or causing the physical entity to move.

The term "network scheduler" or "scheduler" at least in some examples refers to a node, element, or entity that manages network packets in transmit and/or receive queues of one or more protocol stacks of network access circuitry (e.g., a network interface controller (NIC), baseband processor, and/or the like). Additionally or alternatively, the term "network scheduler" at least in some examples can be used interchangeably with the terms "packet scheduler", "queueing discipline" or "qdisc", or "queueing algorithm".

The term "terminal" at least in some examples refers to point at which a conductor from a component, device, or network comes to an end. Additionally or alternatively, the term "terminal" at least in some examples refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some examples refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some examples refers to any type interconnected electronic devices, computer devices, or components thereof. Additionally, the terms "computer system" and/or "system" at least in some examples refer to various components of a computer that are communicatively coupled with one another. Furthermore, the term "computer system" and/or "system" at least in some examples refer to multiple computer devices and/or multiple computing systems that are communicatively coupled with one another and configured to share computing and/or networking resources.

The term "server" at least in some examples refers to a computing device or system, including processing hardware and/or process space(s), an associated storage medium such as a memory device or database, and, in some instances, suitable application(s) as is known in the art. The terms "server system" and "server" may be used interchangeably herein, and these terms at least in some examples refers to one or more computing system(s) that provide access to a pool of physical and/or virtual resources. The various servers discussed herein include computer devices with rack computing architecture component(s), tower computing architecture component(s), blade computing architecture component(s), and/or the like. The servers may represent a cluster of servers, a server farm, a cloud computing service, or other grouping or pool of servers, which may be located in one or more datacenters. The servers may also be connected to, or otherwise associated with, one or more data storage devices (not shown). Moreover, the servers may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

The term "platform" at least in some examples refers to an environment in which instructions, program code, software elements, and the like can be executed or otherwise operate, and examples of such an environment include an architecture (e.g., a motherboard, a computing system, and/or the like), one or more hardware elements (e.g., embedded systems, and the like), a cluster of compute nodes, a set of distributed compute nodes or network, an operating system, a virtual machine (VM), a virtualization container, a software framework, a client application (e.g., web browser or the like) and associated application programming interfaces, a cloud computing service (e.g., platform as a service (PaaS)), or other underlying software executed with instructions, program code, software elements, and the like.

The term "architecture" at least in some examples refers to a computer architecture or a network architecture. The term "computer architecture" at least in some examples refers to a physical and logical design or arrangement of software and/or hardware elements in a computing system or platform including technology standards for interacts therebetween. The term "network architecture" at least in some examples refers to a physical and logical design or arrangement of software and/or hardware elements in a network including communication protocols, interfaces, and media transmission.

The term "appliance," "computer appliance," and the like, at least in some examples refers to a computer device or computer system with program code (e.g., software or firmware) that is specifically designed to provide a specific computing resource. The term "virtual appliance" at least in some examples refers to a virtual machine image to be implemented by a hypervisor-equipped device that virtualizes or emulates a computer appliance or otherwise is dedicated to provide a specific computing resource. The term "security appliance", "firewall", and the like at least in some examples refers to a computer appliance designed to protect computer networks from unwanted traffic and/or malicious attacks. The term "policy appliance" at least in some examples refers to technical control and logging mechanisms to enforce or reconcile policy rules (information use rules) and to ensure accountability in information systems.

The term "gateway" at least in some examples refers to a network appliance that allows data to flow from one network to another network, or a computing system or application configured to perform such tasks. Examples of gateways include IP gateways, Internet-to-Orbit (I2O) gateways, IoT gateways, cloud storage gateways, and/or the like.

The term "user equipment" or "UE" at least in some examples refers to a device with radio communication capabilities and may describe a remote user of network resources in a communications network. The term"user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and the like. Furthermore, the term "user equipment" or "UE" may include any type of wireless/wired device or any computing device including a wireless communications interface. Examples of UEs, client devices, and the like, include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "station" or "STA" at least in some examples refers to a logical entity that is a singly addressable instance of a medium access control (MAC) and physical layer (PHY) interface to the wireless medium (WM). The term "wireless medium" or WM" at least in some examples refers to the medium used to implement the transfer of protocol data units (PDUs) between peer physical layer (PHY) entities of a wireless local area network (LAN).

The term "network element" at least in some examples refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and the like), network appliance, and/or some other network access hardware.

The term "cell" at least in some examples refers to a radio network object that can be uniquely identified by a UE from an identifier (e.g., cell ID) that is broadcasted over a geographical area from a network access node (NAN). Additionally or alternatively, the term "cell" at least in some examples refers to a geographic area covered by a NAN.

The term "access point" or "AP" at least in some examples refers to an entity that contains one station (STA) and provides access to the distribution services, via the wireless medium (WM) for associated STAs. An AP comprises a STA and a distribution system access function (DSAF).

The term "E-UTEAN NodeB", "eNodeB", or "eNB" at least in some examples refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface.

The term "next generation eNB" or "ng-eNB" at least in some examples refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some examples refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some examples refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v17.0.0 (2022-04-15) ("[TS37340]")). Two or more en-gNBs are interconnected with each other (and/or with one or more eNBs) by means of an X2 interface.

The term "Next Generation RAN node" or "NG-RAN node" at least in some examples refers to either a gNB or an ng-eNB.

The term "IAB-node" at least in some examples refers to a RAN node that supports new radio (NR) access links to user equipment (UEs) and NR backhaul links to parent nodes and child nodes. The term "IAB-donor" at least in some examples refers to a RAN node (e.g., a gNB) that provides network access to UEs via a network of backhaul and access links.

The term "Transmission Reception Point" or "TRxP" at least in some examples refers to an antenna array with one or more antenna elements available to a network located at a specific geographical location for a specific area.

The term "Central Unit" or "CU" at least in some examples refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs.

The term "Distributed Unit" or "DU" at least in some examples refers to a logical node hosting Backhaul Adaptation Protocol (BAP), F1 application protocol (F1AP), radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU.

The term "Radio Unit" or "RU" at least in some examples refers to a logical node hosting PHY layer or Low-PHY layer and radiofrequency (RF) processing based on a lower layer functional split.

The term "split architecture" at least in some examples refers to an architecture in which an RU and DU are physically separated from one another, and/or an architecture in which a DU and a CU are physically separated from one another. The term "integrated architecture at least in some examples refers to an architecture in which an RU and DU are implemented on one platform, and/or an architecture in which a DU and a CU are implemented on one platform.

The term "Residential Gateway" or "RG" at least in some examples refers to a device providing, for example, voice, data, broadcast video, video on demand, to other devices in customer premises. The term "Wireline 5G Access Network" or "W-5GAN" at least in some examples refers to a wireline AN that connects to a 5GC via N2 and N3 reference points. The W-5GAN can be either a W-5GBAN or W-5GCAN. The term "Wireline 5G Cable Access Network" or "W-5GCAN" at least in some examples refers to an Access Network defined in/by CableLabs. The term "Wireline BBF Access Network" or "W-5GBAN" at least in some examples refers to an Access Network defined in/by the Broadband Forum (BBF). The term "Wireline Access Gateway Function" or "W-AGF" at least in some examples refers to a Network function in W-5GAN that provides connectivity to a 3GPP 5G Core network (5GC) to 5G-RG and/or FN-RG. The term "5G-RG" at least in some examples refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, and the like). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "central office" or "CO" at least in some examples refers to an aggregation point for telecommunications infrastructure within an accessible or defined geographical area, often where telecommunication service providers have traditionally located switching equipment for one or multiple types of access networks. In some examples, a CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "compute resource" or simply "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and the like), operating systems, virtual machines (VMs), software/applications, computer files, and/or the like. A "hardware resource" at least in some examples refers to compute, storage, and/or network resources provided by physical hardware element(s). A "virtualized resource" at least in some examples refers to compute, storage, and/or network resources provided by virtualization infrastructure to an application, device, system, and the like. The term "network resource" or "communication resource" at least in some examples refers to resources that are accessible by computer devices/systems via a communications network. The term "system resources" at least in some examples refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some examples refers to an amount of work performed by a computing system, device, entity, and the like, during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, and the like), and/or the like. Various algorithms may be used to determine a workload and/or workload characteristics, which may be based on any of the aforementioned workload types.

The term "cloud service provider" or "CSP" at least in some examples refers to an organization which operates typically large-scale "cloud" resources comprised of centralized, regional, and Edge data centers (e.g., as used in the context of the public cloud). In other examples, a CSP may also be referred to as a "Cloud Service Operator" or "CSO". References to "cloud computing" generally refer to computing resources and services offered by a CSP or a CSO, at remote locations with at least some increased latency, distance, or constraints relative to edge computing.

The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "access edge layer" indicates the sub-layer of infrastructure edge closest to the end user or device. For example, such layer may be fulfilled by an edge data center deployed at a cellular network site. The access edge layer functions as the front line of the infrastructure Edge and may connect to an aggregation Edge layer higher in the hierarchy.

The term "aggregation edge layer" indicates the layer of infrastructure edge one hop away from the access edge layer. This layer can exist as either a medium-scale data center in a single location or may be formed from multiple interconnected micro data centers to form a hierarchical topology with the access Edge to allow for greater collaboration, workload failover, and scalability than access Edge alone.

The term "network function" or "NF" at least in some examples refers to a functional block within a network infrastructure that has one or more external interfaces and a defined functional behavior. The term "network service" or "NS" at least in some examples refers to a composition of Network Function(s) and/or Network Service(s), defined by its functional and behavioral specification(s). The term "network function virtualization" or "NFV" at least in some examples refers to the principle of separating network functions from the hardware they run on by using virtualization techniques and/or virtualization technologies. The term "virtualized network function" or "VNF" at least in some examples refers to an implementation of an NF that can be deployed on a Network Function Virtualization Infrastructure (NFVI). The term "Network Functions Virtualization Infrastructure Manager" or "NFVI" at least in some examples refers to a totality of all hardware and software components that build up the environment in which VNFs are deployed. The term "management function" at least in some examples refers to a logical entity playing the roles of a service consumer and/or a service producer. The term "management service" at least in some examples refers to a set of offered management capabilities.

The term "RAN function" at least in some examples refers to a functional block within a radio access network (RAN) architecture that has one or more external interfaces and a defined behavior related to the operation of a RAN or RAN node. Additionally or alternatively, the term "RAN function" at least in some examples refers to a set of functions and/or NFs that are part of a RAN. The term "Application Function" or "AF" at least in some examples refers to an element or entity that interacts with a network function, a RAN function, a core network, and/or other elements in order to provide services. Additionally or alternatively, the term "Application Function" or "AF" at least in some examples refers to an edge compute node or ECT framework from the perspective of a core network (e.g., a 3GPP 5G core network). The term "edge compute function" or "ECF" at least in some embodiments refers to an element or entity that performs an aspect of an edge computing technology (ECT), an aspect of edge networking technology (ENT), or performs an aspect of one or more edge computing services running over the ECT or ENT. The term "management function" at least in some examples refers to a logical entity playing the roles of a service consumer and/or a service producer. The term "management service" at least in some examples refers to a set of offered management capabilities.

The term "slice" at least in some examples refers to a set of characteristics and behaviors that separate one instance, traffic, data flow, application, application instance, link or connection, RAT, device, system, entity, element, and the like from another instance, traffic, data flow, application, application instance, link or connection, RAT, device, system, entity, element, and the like, or separate one type of instance, and the like, from another instance, and the like. The term "network slice" at least in some examples refers to a logical network that provides specific network capabilities and network characteristics and/or supports various service properties for network slice service consumers. Additionally or alternatively, the term "network slice" at least in some examples refers to a logical network topology connecting a number of endpoints using a set of shared or dedicated network resources that are used to satisfy specific service level objectives (SLOs) and/or service level agreements (SLAs). The term "network slicing" at least in some examples refers to methods, processes, techniques, and technologies used to create one or multiple unique logical and virtualized networks over a common multi-domain infrastructure. The term "access network slice", "radio access network slice", or "RAN slice" at least in some examples refers to a part of a network slice that provides resources in a RAN to fulfill one or more application and/or service requirements (e.g., SLAs, and the like). The term "network slice instance" at least in some examples refers to a set of Network Function instances and the required resources (e.g. compute, storage and networking resources) which form a deployed network slice. Additionally or alternatively, the term "network slice instance" at least in some examples refers to a representation of a service view of a network slice. The term "network instance" at least in some examples refers to information identifying a domain. The term "service consumer" at least in some examples refers to an entity that consumes one or more services.

The term "service producer" at least in some examples refers to an entity that offers, serves, or otherwise provides one or more services. The term "service provider" at least in some examples refers to an organization or entity that provides one or more services to at least one service consumer. For purposes of the present disclosure, the terms "service provider" and "service producer" may be used interchangeably even though these terms may refer to difference concepts. Examples of service providers include cloud service provider (CSP), network service provider (NSP), application service provider (ASP) (e.g., Application software service provider in a service-oriented architecture (ASSP)), internet service provider (ISP), telecommunications service provider (TSP), online service provider (OSP), payment service provider (PSP), managed service provider (MSP), storage service providers (SSPs), SAML service provider, and/or the like. At least in some examples, SLAs may specify, for example, particular aspects of the service to be provided including quality, availability, responsibilities, metrics by which service is measured, as well as remedies or penalties should agreed-on service levels not be achieved. The term "SAML service provider" at least in some examples refers to a system and/or entity that receives and accepts authentication assertions in conjunction with a single sign-on (SSO) profile of the Security Assertion Markup Language (SAML) and/or some other security mechanism(s).

The term "Virtualized Infrastructure Manager" or "VIM" at least in some examples refers to a functional block that is responsible for controlling and managing the NFVI compute, storage and network resources, usually within one operator's infrastructure domain.

The term "virtualization container", "execution container", or "container" at least in some examples refers to a partition of a compute node that provides an isolated virtualized computation environment. The term "OS container" at least in some examples refers to a virtualization container utilizing a shared Operating System (OS) kernel of its host, where the host providing the shared OS kernel can be a physical compute node or another virtualization container. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings.

The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a compute node, creates VMs, manages resources for VMs, and isolates individual VMs from each other.

The term "edge compute node" or "edge compute device" at least in some examples refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some examples refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some examples refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Data Network" or "DN" at least in some examples refers to a network hosting data-centric services such as, for example, operator services, the internet, third-party services, or enterprise networks. Additionally or alternatively, a DN at least in some examples refers to service networks that belong to an operator or third party, which are offered as a service to a client or user equipment (UE). DNs are sometimes referred to as "Packet Data Networks" or "PDNs". The term "Local Area Data Network" or "LADN" at least in some examples refers to a DN that is accessible by the UE only in specific locations, that provides connectivity to a specific DNN, and whose availability is provided to the UE.

The term "Internet of Things" or "IoT" at least in some examples refers to a system of interrelated computing devices, mechanical and digital machines capable of transferring data with little or no human interaction, and may involve technologies such as real-time analytics, machine learning and/or A1, embedded systems, wireless sensor networks, control systems, automation (e.g., smarthome, smart building and/or smart city technologies), and the like. IoT devices are usually low-power devices without heavy compute or storage capabilities. The term "Edge IoT devices" at least in some examples refers to any kind of IoT devices deployed at a network's edge.

The term "protocol" at least in some examples refers to a predefined procedure or method of performing one or more operations. Additionally or alternatively, the term "protocol" at least in some examples refers to a common means for unrelated objects to communicate with each other (sometimes also called interfaces).

The term "communication protocol" at least in some examples refers to a set of standardized rules or instructions implemented by a communication device and/or system to communicate with other devices and/or systems, including instructions for packetizing/depacketizing data, modulating/demodulating signals, implementation of protocols stacks, and/or the like. In various implementations, a "protocol" and/or a "communication protocol" may be represented using a protocol stack, a finite state machine (FSM), and/or any other suitable data structure.

The term "standard protocol" at least in some examples refers to a protocol whose specification is published and known to the public and is controlled by a standards body.

The term "protocol stack" or "network stack" at least in some examples refers to an implementation of a protocol suite or protocol family. In various implementations, a protocol stack includes a set of protocol layers, where the lowest protocol deals with low-level interaction with hardware and/or communications interfaces and each higher layer adds additional capabilities.

The term "application layer" at least in some examples refers to an abstraction layer that specifies shared communications protocols and interfaces used by hosts in a communications network. Additionally or alternatively, the term "application layer" at least in some examples refers to an abstraction layer that interacts with software applications that implement a communicating component, and may include identifying communication partners, determining resource availability, and synchronizing communication. Examples of application layer protocols include HTTP, HTTPs, File Transfer Protocol (FTP), Dynamic Host Configuration Protocol (DHCP), Internet Message Access Protocol (IMAP), Lightweight Directory Access Protocol (LDAP), MQTT, Remote Authentication Dial-In User Service (RADIUS), Diameter protocol, Extensible Authentication Protocol (EAP), RDMA over Converged Ethernet version 2 (RoCEv2), Real-time Transport Protocol (RTP), RTP Control Protocol (RTCP), Real Time Streaming Protocol (RTSP), Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Small Computer System Interface (SCSI), Internet SCSI (iSCSI), iSCSI Extensions for RDMA (iSER), Transport Layer Security (TLS), voice over IP (VoIP). Virtual Private Network (VPN), Extensible Messaging and Presence Protocol (XMPP), and/or the like.

The term "session layer" at least in some examples refers to an abstraction layer that controls dialogues and/or connections between entities or elements, and may include establishing, managing and terminating the connections between the entities or elements.

The term "transport layer" at least in some examples refers to a protocol layer that provides end-to-end (e2e) communication services such as, for example, connection-oriented communication, reliability, flow control, and multiplexing. Examples of transport layer protocols include datagram congestion control protocol (DCCP), fibre channel protocol (FBC), Generic Routing Encapsulation (GRE), GPRS Tunneling (GTP), Micro Transport Protocol (pTP), Multipath TCP (MPTCP), MultiPath QUIC (MPQUIC), Multipath UDP (MPUDP), Quick UDP Internet Connections (QUIC), Remote Direct Memory Access (RDMA), Resource Reservation Protocol (RSVP), Stream Control Transmission Protocol (SCTP), transmission control protocol (TCP), user datagram protocol (UDP), and/or the like.

The term "network layer" at least in some examples refers to a protocol layer that includes means for transferring network packets from a source to a destination via one or more networks. Additionally or alternatively, the term "network layer" at least in some examples refers to a protocol layer that is responsible for packet forwarding and/or routing through intermediary nodes. Additionally or alternatively, the term "network layer" or "internet layer" at least in some examples refers to a protocol layer that includes interworking methods, protocols, and specifications that are used to transport network packets across a network. As examples, the network layer protocols include internet protocol (IP), IP security (IPsec), Internet Control Message Protocol (ICMP), Internet Group Management Protocol (IGMP), Open Shortest Path First protocol (OSPF), Routing Information Protocol (RIP), RDMA over Converged Ethernet version 2 (RoCEv2), Subnetwork Access Protocol (SNAP), and/or some other internet or network protocol layer.

The term "link layer" or "data link layer" at least in some examples refers to a protocol layer that transfers data between nodes on a network segment across a physical layer. Examples of link layer protocols include logical link control (LLC), medium access control (MAC), Ethernet, RDMA over Converged Ethernet version 1 (RoCEv1), and/or the like.

The term "radio resource control", "RRC layer", or "RRC" at least in some examples refers to a protocol layer or sublayer that performs system information handling; paging; establishment, maintenance, and release of RRC connections; security functions; establishment, configuration, maintenance and release of Signaling Radio Bearers (SRBs) and Data Radio Bearers (DRBs); mobility functions/services; QoS management; and some sidelink specific services and functions over the Uu interface (see e.g., 3GPP TS 36.331 v17.0.0 (2022-04-13) and/or 3GPP TS 38.331 v17.0.0 (2022-04-19) ("[TS38331]")).

The term "Service Data Adaptation Protocol", "SDAP layer", or "SDAP" at least in some examples refers to a protocol layer or sublayer that performs mapping between QoS flows and a data radio bearers (DRBs) and marking QoS flow IDs (QFI) in both DL and UL packets (see e.g., 3GPP TS 37.324 v17.0.0 (2022-04-13)).

The term "Packet Data Convergence Protocol", "PDCP layer", or "PDCP" at least in some examples refers to a protocol layer or sublayer that performs transfer user plane or control plane data; maintains PDCP sequence numbers (SNs); header compression and decompression using the Robust Header Compression (ROHC) and/or Ethernet Header Compression (EHC) protocols; ciphering and deciphering; integrity protection and integrity verification; provides timer based SDU discard; routing for split bearers; duplication and duplicate discarding; reordering and inorder delivery; and/or out-of-order delivery (see e.g., 3GPP TS 36.323 v17.0.0 (2022-04-15) and/or 3GPP TS 38.323 v17.0.0 (2022-04-14)).

The term "radio link control layer", "RLC layer", or "RLC" at least in some examples refers to a protocol layer or sublayer that performs transfer of upper layer PDUs; sequence numbering independent of the one in PDCP; error Correction through ARQ; segmentation and/or re-segmentation of RLC SDUs; reassembly of SDUs; duplicate detection; RLC SDU discarding; RLC re-establishment; and/or protocol error detection (see e.g., 3GPP TS 38.322 v17.0.0 (2022-04-15) and 3GPP TS 36.322 v17.0.0 (2022-04-15)).

The term "medium access control protocol", "MAC protocol", or "MAC" at least in some examples refers to a protocol that governs access to the transmission medium in a network, to enable the exchange of data between stations in a network. Additionally or alternatively, the term "medium access control layer". "MAC layer", or "MAC" at least in some examples refers to a protocol layer or sublayer that performs functions to provide frame-based, connectionless-mode (e.g., datagram style) data transfer between stations or devices. Additionally or alternatively, the term "medium access control layer", "MAC layer", or "MAC" at least in some examples refers to a protocol layer or sublayer that performs mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of CA); priority handling between UEs by means of dynamic scheduling; priority handling between logical channels of one UE by means of logical channel prioritization; priority handling between overlapping resources of one UE; and/or padding (see e.g., [IEEE802], 3GPP TS 38.321 v17.0.0 (2022-04-14) and 3GPP TS 36.321 v17.0.0 (2022-04-19) (collectively referred to as "[TSMAC]")).

The term "physical layer", "PHY layer", or "PHY" at least in some examples refers to a protocol layer or sublayer that includes capabilities to transmit and receive modulated signals for communicating in a communications network (see e.g., [IEEE802], 3GPP TS 38.201 v17.0.0 (2022-01-05) and 3GPP TS 36.201 v17.0.0 (2022-03-31)).

The term "radio technology" at least in some examples refers to technology for wireless transmission and/or reception of electromagnetic radiation for information transfer.

The term "radio access technology" or "RAT" at least in some examples refers to the technology used for the underlying physical connection to a radio based communication network.

The term "RAT type" at least in some examples may identify a transmission technology and/or communication protocol used in an access network, for example, new radio (NR), Long Term Evolution (LTE), narrowband IoT (NB-IoT), untrusted non-3GPP, trusted non-3GPP, trusted Institute of Electrical and Electronics Engineers (IEEE) 802 (e.g., [IEEE80211]; see also *IEEE Standard for Local and Metropolitan Area Networks: Overview and Architecture*, IEEE Std 802-2014, pp. 1-74 (30 Jun. 2014)("[IEEE802]"), the contents of which is hereby incorporated by reference in its entirety), non-3GPP access, MuLTEfire, WiMAX, wireline, wireline-cable, wireline broadband forum (wireline-BBF), and the like. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), and the like); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), and the like), Generic Access Network (GAN)/Unlicensed Mobile Access (UMA), High Speed Packet Access (HSPA) (and variants thereof such as HSPA Plus (HSPA+), and the like), Long Term Evolution (LTE) (and variants thereof such as LTE-Advanced (LTE-A), Evolved UTRA (E-UTRA), LTE Extra, LTE-A Pro, LTE LAA, MuLTEfire, and the like), Fifth Generation (5G) or New Radio (NR), and the like; ETSI technologies such as High Performance Radio Metropolitan Area Network (HiperMAN) and the like; IEEE technologies such as [IEEE802] and/or WiFi (e.g., [IEEE80211] and variants thereof), Worldwide Interoperability for Microwave Access (WiMAX) (e.g., [WiMAX] and variants thereof), Mobile Broadband Wireless Access (MBWA)/iBurst (e.g., IEEE 802.20 and variants thereof), and the like; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (e.g., IEEE 802.11ad, IEEE 802.11ay, and the like); short-range and/or wireless personal area network (WPAN) technologies/standards such as Bluetooth (and variants thereof such as Bluetooth 5.3, Bluetooth Low Energy (BLE), and the like), IEEE 802.15 technologies/standards (e.g., IEEE Standard for Low-Rate Wireless Networks, IEEE Std 802.15.4-2020, pp. 1-800 (23 Jul. 2020) ("[IEEE802154]"), ZigBee, Thread, IPv6 over Low power WPAN (6LoWPAN), WirelessHART, MiWi, ISA100.11a, IEEE Standard for Local and metropolitan area networks—Part 15.6: Wireless Body Area Networks, IEEE Std 802.15.6-2012, pp. 1-271 (29 Feb. 2012), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as IEEE Standard for Local and metropolitan area networks—Part 15.7: Short-Range Optical Wireless Communications, IEEE Std 802.15.7-2018, pp. 1-407 (23 Apr. 2019), and the like; V2X communication including 3GPP cellular V2X (C-V2X), Wireless Access in Vehicular Environments (WAVE) (IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments, IEEE Std 802.11p-2010, pp. 1-51 (15 Jul. 2010) ("[IEEE80211p]"), which is now part of [IEEE80211]), IEEE 802.11bd (e.g., for vehicular ad-hoc environments), Dedicated Short Range Communications (DSRC), Intelligent-Transport-Systems (ITS) (including the European ITS-G5, ITS-G5B, ITS-G5C, and the like); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), and the like); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, and the like); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "V2X" at least in some examples refers to vehicle to vehicle (V2V), vehicle to infrastructure (V21), infrastructure to vehicle (I2V), vehicle to network (V2N), and/or network to vehicle (N2V) communications and associated radio access technologies.

The term "channel" at least in some examples refers to any transmission medium, either tangible or intangible, which is used to communicate data or a data stream. The term "channel" i5 may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information.

The term "subframe" at least in some examples at least in some examples refers to a time interval during which a signal is signaled. In some implementations, a subframe is equal to 1 millisecond (ms). The term "time slot" at least in some examples at least in some examples refers to an integer multiple of consecutive subframes. The term "superframe" at least in some examples at least in some examples refers to a time interval comprising two time slots.

The term "interoperability" at least in some examples refers to the ability of STAs utilizing one communication system or RAT to communicate with other STAs utilizing another communication system or RAT. The term "Coexistence" at least in some examples refers to sharing or allocating radiofrequency resources among STAs using either communication system or RAT.

The term "reliability" at least in some examples refers to the ability of a computer-related component (e.g., software, hardware, or network element/entity) to consistently perform a desired function and/or operate according to a specification. Additionally or alternatively, the term "reliability" at least in some examples refers to the probability that a product, system, or service will perform its intended function adequately for a specified period of time, or will operate in a defined environment with a low probability of failure. Additionally or alternatively, the term "reliability" in the context of network communications (e.g., "network reliability") at least in some examples refers to the ability of a network to carry out communication. The term "network reliability" at least in some examples refers to a probability or measure of delivering a specified amount of data from a source to a destination (or sink).

The term "redundancy" at least in some examples refers to duplication of components or functions of a system, device, entity, or element to increase the reliability of the system, device, entity, or element. Additionally or alternatively, the term "redundancy" or "network redundancy" at least in some examples refers to the use of redundant physical or virtual hardware and/or interconnections. An example of network redundancy includes deploying a pair of network appliances with duplicated cabling connecting to the inside and/or outside a specific network, placing multiple appliances in active states, and the like.

The term "resilience" at least in some examples refers to the ability of a system, device, entity, or element to absorb and/or avoid damage or degradation without suffering complete or partial failure. Additionally or alternatively, the term "resilience" at least in some examples refers to a system, device, entity, or element to that maintains state awareness and/or an accepted level of operational normalcy in response to disturbances, including threats of an unexpected and malicious nature. Additionally or alternatively, the term "resilience", "network resilience", or "networking resilience" at least in some examples refers to a network, system, device, entity, or element to provide and/or implement a level of quality of service (QoS) and/or quality of experience (QoE), provide and/or implement traffic routing and/or rerouting over one or multiple paths, duplication of hardware components and/or physical links, provide and/or implement virtualized duplication (e.g., duplication NFs, VNFs, virtual machines (VMs), containers, and/or the like), provide and/or implement self-recovery mechanisms, and/or the like.

The term "flow" at least in some examples refers to a sequence of data and/or data units (e.g., datagrams, packets, or the like) from a source entity/element to a destination entity/element. Additionally or alternatively, the terms "flow" or "traffic flow" at least in some examples refer to an artificial and/or logical equivalent to a call, connection, or link. Additionally or alternatively, the terms "flow" or "traffic flow" at least in some examples refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some examples refer to a set of data and/or data units (e.g., datagrams, packets, or the like) passing an observation point in a network during a certain time interval. Additionally or alternatively, the term "flow" at least in some examples refers to a user plane data link that is attached to an association. Examples are circuit switched phone call, voice over IP call, reception of an SMS, sending of a contact card. PDP context for internet access, demultiplexing a TV channel from a channel multiplex, calculation of position coordinates from geopositioning satellite signals, and/or the like. For purposes of the present disclosure, the terms "traffic flow", "data flow", "dataflow", "packet flow", "network flow", and/or "flow" may be used interchangeably even though these terms at least in some examples refers to different concepts.

The term "stream" at least in some examples refers to a sequence of data elements made available over time. At least in some examples, functions that operate on a stream, which may produce another stream, are referred to as "filters," and can be connected in pipelines, analogously to function composition. Filters may operate on one item of a stream at a time, or may base an item of output on multiple items of input, such as a moving average.

The term "distributed computing" at least in some examples refers to computation resources that are geographically distributed within the vicinity of one or more localized networks' terminations.

The term "distributed computations" at least in some examples refers to a model in which components located on networked computers communicate and coordinate their actions by passing messages interacting with each other in order to achieve a common goal.

The term "service" at least in some examples refers to the provision of a discrete function within a system and/or environment. Additionally or alternatively, the term "service" at least in some examples refers to a functionality or a set of functionalities that can be reused.

The term "microservice" at least in some examples refers to one or more processes that communicate over a network to fulfil a goal using technology-agnostic protocols (e.g., HTTP or the like). Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components. Additionally or alternatively, the term "microservice architecture" at least in some examples refers to a variant of the service-oriented architecture (SOA) structural style wherein applications are arranged as a collection of loosely-coupled services (e.g., fine-grained services) and may use lightweight protocols.

The term "session" at least in some examples refers to a temporary and interactive information interchange between two or more communicating devices, two or more application instances, between a computer and user, and/or between any two or more entities or elements. Additionally or alternatively, the term "session" at least in some examples refers to a connectivity service or other service that provides or enables the exchange of data between two entities or elements. The term "network session" at least in some examples refers to a session between two or more communicating devices over a network. The term "web session" at least in some examples refers to session between two or more communicating devices over the Internet or some other network. The term "session identifier," "session ID," or "session token" at least in some examples refers to a piece of data that is used in network communications to identify a session and/or a series of message exchanges.

The term "quality" at least in some examples refers to a property, character, attribute, or feature of something as being affirmative or negative, and/or a degree of excellence of something. Additionally or alternatively, the term "quality" at least in some examples, in the context of data processing, refers to a state of qualitative and/or quantitative aspects of data, processes, and/or some other aspects of data processing systems.

The term "Quality of Service" or "QoS' at least in some examples refers to a description or measurement of the overall performance of a service (e.g., telephony and/or cellular service, network service, wireless communication/connectivity service, cloud computing service, and/or the like). In some cases, the QoS may be described or measured from the perspective of the users of that service, and as such, QoS may be the collective effect of service performance that determine the degree of satisfaction of a user of that service. In other cases, QoS at least in some examples refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS' at least in some examples refers to mechanisms that provide traffic-forwarding treatment based on flow-specific traffic classification. In some implementations, the term "Quality of Service" or "QoS" can be used interchangeably with the term "Class of Service" or "CoS".

The term "Class of Service" or "CoS' at least in some examples refers to mechanisms that provide traffic-forwarding treatment based on non-flow-specific traffic classification. In some implementations, the term "Class of Service" or "CoS" can be used interchangeably with the term "Quality of Service" or "QoS".

The term "QoS flow" at least in some examples refers to the finest granularity for QoS forwarding treatment in a network. The term "5G QoS flow' at least in some examples refers to the finest granularity for QoS forwarding treatment in a 5G System (5GS). Traffic mapped to the same QoS flow (or 5G QoS flow) receive the same forwarding treatment.

The term "reliability flow" at least in some examples refers to the finest granularity for reliability forwarding treatment in a network, where traffic mapped to the same reliability flow receive the same reliability treatment. Additionally or alternatively, the term "reliability flow" at least in some examples refers to the a reliability treatment assigned to packets of a data flow The term "reliability forwarding treatment" or "reliability treatment" refers to the manner in which packets belonging to a data flow are handled to provide a certain level of reliability to that data flow including, for example, a probability of success of packet delivery, QoS or Quality of Experience (QoE) over a period of time (or unit of time), admission control capabilities, a particular coding scheme, and/or coding rate for arrival data bursts.

The term "forwarding treatment" at least in some examples refers to the precedence, preferences, and/or prioritization a packet belonging to a particular data flow receives in relation to other traffic of other data flows. Additionally or alternatively, the term "forwarding treatment" at least in some examples refers to one or more parameters, characteristics, and/or configurations to be applied to packets belonging to a data flow when processing the packets for forwarding. Examples of such characteristics may include resource type (e.g., non-guaranteed bit rate (GBR), GBR, delay-critical GBR, and/or the like); priority level; class or classification; packet delay budget; packet error rate; averaging window; maximum data burst volume; minimum data burst volume; scheduling policy/weights; queue management policy; rate shaping policy; link layer protocol and/or RLC configuration; admission thresholds;

and/or the like. In some implementations, the term "forwarding treatment" may be referred to as "Per-Hop Behavior" or "PHB".

The term "admission control" at least in some examples refers to a function or process that decides if new packets, messages, work, tasks, and/or the like, entering a system should be admitted to enter the system or not. Additionally or alternatively, the term "admission control" at least in some examples refers to a validation process where a check is performed before a connection is established to see if current resources are sufficient for the proposed connection.

The term "QoS Identifier" at least in some examples refers to a scalar that is used as a reference to a specific QoS forwarding behavior (e.g., packet loss rate, packet delay budget, and/or the like) to be provided to a QoS flow. This may be implemented in an access network by referencing node specific parameters that control the QoS forwarding treatment (e.g., scheduling weights, admission thresholds, queue management thresholds, link layer protocol configuration, and/or the like).

The term "time to live" (or "TTL") or "hop limit" at least in some examples refers to a mechanism which limits the lifespan or lifetime of data in a computer or network. TTL may be implemented as a counter or timestamp attached to or embedded in the data Once the prescribed event count or timespan has elapsed, data is discarded or revalidated.

The term "queue" at least in some examples refers to a collection of entities (e.g., data, objects, events, and/or the like) are stored and held to be processed later, that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some examples refers to one or more operations of adding an element to the rear of a queue. The term "dequeue" at least in some examples refers to one or more operations of removing an element from the front of a queue.

The term "channel coding" at least in some examples refers to processes and/or techniques to add redundancy to messages or packets in order to make those messages or packets more robust against noise, channel interference, limited channel bandwidth, and/or other errors. For purposes of the present disclosure, the term "channel coding" can be used interchangeably with the terms "forward error correction" or "FEC"; "error correction coding", "error correction code", or "ECC"; and/or "network coding" or "NC".

The term "network coding" at least in some examples refers to processes and/or techniques in which transmitted data is encoded and decoded to improve network performance.

The term "code rate" at least in some examples refers to the proportion of a data stream or flow that is useful or non-redundant (e.g., for a code rate of k/n, for every k bits of useful information, the (en)coder generates a total of n bits of data, of which n−k are redundant).

The term "systematic code" at least in some examples refers to any error correction code in which the input data is embedded in the encoded output. The term "non-systematic code" at least in some examples refers to any error correction code in which the input data is not embedded in the encoded output.

The term "interleaving" at least in some examples refers to a process to rearrange code symbols so as to spread bursts of errors over multiple codewords that can be corrected by ECCs.

The term "code word" or "codeword" at least in some examples refers to an element of a code or protocol, which is assembled in accordance with specific rules of the code or protocol.

The term "PDU Connectivity Service" at least in some examples refers to a service that provides exchange of protocol data units (PDUs) between a UE and a data network (DN). The term "PDU Session" at least in some examples refers to an association between a UE and a DN that provides a PDU connectivity service. A PDU Session type can be IPv4, IPv6, IPv4v6, Ethernet, Unstructured, or any other network/connection type, such as those discussed herein. The term "MA PDU Session" at least in some examples refers to a PDU Session that provides a PDU connectivity service, which can use one access network at a time or multiple access networks simultaneously.

The term "traffic shaping" at least in some examples refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some examples refers to the regulation of flows into or out of a network, or into or out of a specific device or element.

The term "access traffic steering" or "traffic steering" at least in some examples refers to a procedure that selects an access network for a new data flow and transfers the traffic of one or more data flows over the selected access network. Access traffic steering is applicable between one 3GPP access and one non-3GPP access.

The term "access traffic switching" or "traffic switching" at least in some examples refers to a procedure that moves some or all traffic of an ongoing data flow from at least one access network to at least one other access network in a way that maintains the continuity of the data flow.

The term "access traffic splitting" or "traffic splitting" at least in some examples refers to a procedure that splits the traffic of at least one data flow across multiple access networks. When traffic splitting is applied to a data flow, some traffic of the data flow is transferred via at least one access channel, link, or path, and some other traffic of the same data flow is transferred via another access channel, link, or path.

The term "network address" at least in some examples refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI) (including any RNTI discussed in clause 8.1 of 3GPP TS 38.300 v17.0.0 (2022-04-13) ("[TS38300]")), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), and the like), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), a socket address, universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof.

The term “application identifier”, “application ID”, or “app ID” at least in some examples refers to an identifier that can be mapped to a specific application or application instance; in the context of 3GPP 5G/NR systems, an “application identifier” at least in some examples refers to an identifier that can be mapped to a specific application traffic detection rule.

The term “endpoint address” at least in some examples refers to an address used to determine the host/authority part of a target URI, where the target URI is used to access an NF service (e.g., to invoke service operations) of an NF service producer or for notifications to an NF service consumer.

The term “closed access group” or “CAG” at least in some examples refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term “CAG-ID” at least in some examples refers to an identifier of a CAG.

The term “port” in the context of computer networks, at least in some examples refers to a communication endpoint, a virtual data connection between two or more entities, and/or a virtual point where network connections start and end. Additionally or alternatively, a “port” at least in some examples is associated with a specific process or service.

The term “localized network” at least in some examples refers to a local network that covers a limited number of connected vehicles in a certain area or region.

The term “local data integration platform” at least in some examples refers to a platform, device, system, network, or element(s) that integrate local data by utilizing a combination of localized network(s) and distributed computation.

The term “physical rate” or “PHY rate” at least in some examples refers to a speed at which one or more bits are actually sent over a transmission medium. Additionally or alternatively, the term “physical rate” or “PHY rate” at least in some examples refers to a speed at which data can move across a wireless link between a transmitter and a receiver.

The term “delay” at least in some examples refers to a time interval between two events. Additionally or alternatively, the term “delay” at least in some examples refers to a time interval between the propagation of a signal and its reception.

The term “packet delay” at least in some examples refers to the time it takes to transfer any packet from one point to another. Additionally or alternatively, the term “packet delay” or “per packet delay” at least in some examples refers to the difference between a packet reception time and packet transmission time. Additionally or alternatively, the “packet delay” or “per packet delay” can be measured by subtracting the packet sending time from the packet receiving time where the transmitter and receiver are at least somewhat synchronized.

The term “processing delay” at least in some examples refers to an amount of time taken to process a packet in a network node.

The term “transmission delay” at least in some examples refers to an amount of time needed (or necessary) to push a packet (or all bits of a packet) into a transmission medium.

The term “propagation delay” at least in some examples refers to amount of time it takes a signal’s header to travel from a sender to a receiver.

The term “network delay” at least in some examples refers to the delay of an a data unit within a network (e.g., an IP packet within an IP network).

The term “queuing delay” at least in some examples refers to an amount of time a job waits in a queue until that job can be executed. Additionally or alternatively, the term “queuing delay” at least in some examples refers to an amount of time a packet waits in a queue until it can be processed and/or transmitted.

The term “delay bound” at least in some examples refers to a predetermined or configured amount of acceptable delay. The term “per-packet delay bound” at least in some examples refers to a predetermined or configured amount of acceptable packet delay where packets that are not processed and/or transmitted within the delay bound are considered to be delivery failures and are discarded or dropped.

The term “packet drop rate” at least in some examples refers to a share of packets that were not sent to the target due to high traffic load or traffic management and should be seen as a part of the packet loss rate.

The term “packet loss rate” at least in some examples refers to a share of packets that could not be received by the target, including packets dropped, packets lost in transmission and packets received in wrong format.

The term “latency” at least in some examples refers to the amount of time it takes to transfer a first/initial data unit in a data burst from one point to another.

The term “throughput” or “network throughput” at least in some examples refers to a rate of production or the rate at which something is processed. Additionally or alternatively, the term “throughput” or “network throughput” at least in some examples refers to a rate of successful message (date) delivery over a communication channel.

The term "goodput" at least in some examples refers to a number of useful information bits delivered by the network to a certain destination per unit of time.

The term "performance indicator" at least in some examples refers to performance data aggregated over a group of network functions (NFs), which is derived from performance measurements collected at the NFs that belong to the group, according to the aggregation method identified in a Performance Indicator definition.

The term "application" at least in some examples refers to a computer program designed to carry out a specific task other than one relating to the operation of the computer itself. Additionally or alternatively, term "application" at least in some examples refers to a complete and deployable package, environment to achieve a certain function in an operational environment.

The term "algorithm" at least in some examples refers to an unambiguous specification of how to solve a problem or a class of problems by performing calculations, input/output operations, data processing, automated reasoning tasks, and/or the like.

The terms "instantiate," "instantiation," and the like at least in some examples refers to the creation of an instance. An "instance" also at least in some examples refers to a concrete occurrence of an object, which may occur, for example, during execution of program code.

The term "data processing" or "processing" at least in some examples refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "software agent" at least in some examples refers to a computer program that acts for a user or other program in a relationship of agency.

The term "use case" at least in some examples refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "analytics" at least in some examples refers to the discovery, interpretation, and communication of meaningful patterns in data.

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. An API may be for a web-based system, operating system, database system, computer hardware, or software library.

The term "datagram" at least in some examples at least in some examples refers to a basic transfer unit associated with a packet-switched network; a datagram may be structured to have header and payload sections. The term "datagram" at least in some examples may be referred to as a "data unit", a "protocol data unit" or "PDU", a "service data unit" or "SDU", a frame, a packet, and/or the like.

The term "information element" at least in some examples refers to a structural element containing one or more fields.

The term "field" at least in some examples refers to individual contents of an information element, or a data element that contains content.

The term "data element" or "DE" at least in some examples refers to a data type that contains one single data.

The term "data frame" or "DF" at least in some examples refers to a data type that contains more than one data element in a predefined order.

The term "data element" at least in some examples refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some examples refers to a data type that contains one single data. Data elements may store data, which may be referred to as the data element's content (or "content items"). Content items may include text content, attributes, properties, and/or other elements referred to as "child elements." Additionally or alternatively, data elements may include zero or more properties and/or zero or more attributes, each of which may be defined as database objects (e.g., fields, records, and/or the like), object instances, and/or other data elements. An "attribute" at least in some examples refers to a markup construct including a name-value pair that exists within a start tag or empty element tag. Attributes contain data related to its element and/or control the element's behavior.

The term "reference" at least in some examples refers to data useable to locate other data and may be implemented a variety of ways (e.g., a pointer, an index, a handle, a key, an identifier, a hyperlink, and/or the like).

The term "translation" at least in some examples refers to the process of converting or otherwise changing data from a first form, shape, configuration, structure, arrangement, embodiment, description, and/or the like. into a second form, shape, configuration, structure, arrangement, embodiment, description, and/or the like; at least in some examples there may be two different types of translation: transcoding and transformation.

The term "transcoding" at least in some examples refers to taking information/data in one format (e.g., a packed binary format) and translating the same information/data into another format in the same sequence. Additionally or alternatively, the term "transcoding" at least in some examples refers to taking the same information, in the same sequence, and packaging the information (e.g., bits or bytes) differently.

The term "transformation" at least in some examples refers to changing data from one format and writing it in another format, keeping the same order, sequence, and/or nesting of data items. Additionally or alternatively, the term "transformation" at least in some examples involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some examples refers to changing the schema of a data object to another schema.

The term "stream" or "streaming" refers to a manner of processing in which an object is not represented by a complete logical data structure of nodes occupying memory proportional to a size of that object, but are processed "on the fly" as a sequence of events.

The term "cryptographic mechanism" at least in some examples refers to any cryptographic protocol and/or cryptographic algorithm. Additionally or alternatively, the term "cryptographic protocol" at least in some examples refers to a sequence of steps precisely specifying the actions required of two or more entities to achieve specific security objectives (e.g., cryptographic protocol for key agreement). Additionally or alternatively, the term "cryptographic algorithm" at least in some examples refers to an algorithm specifying the steps followed by a single entity to achieve specific security objectives (e.g., cryptographic algorithm for symmetric key encryption). The term "cryptographic hash function", "hash function", or "hash") at least in some examples refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert.

The term "accuracy" at least in some examples refers to the closeness of one or more measurements to a specific value.

The term "artificial intelligence" or "A1" at least in some examples refers to any intelligence demonstrated by machines, in contrast to the natural intelligence displayed by humans and other animals. Additionally or alternatively, the term "artificial intelligence" or "A1" at least in some examples refers to the study of "intelligent agents" and/or any device that perceives its environment and takes actions that maximize its chance of successfully achieving a goal.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), echo state network (ESN), and/or the like), spiking NN (SNN), deep stacking network (DSN), Markov chain, perception NN, generative adversarial network (GAN), transformers, stochastic NNs (e.g., Bayesian Network (BN), Bayesian belief network (BBN), a Bayesian NN (BNN), Deep BNN (DBNN), Dynamic BN (DBN), probabilistic graphical model (PGM), Boltzmann machine, restricted Boltzmann machine (RBM), Hopfield network or Hopfield NN, convolutional deep belief network (CDBN), and/or the like), Linear Dynamical System (LDS), Switching LDS (SLDS), Optical NNs (ONNs), an NN for reinforcement learning (RL) and/or deep RL (DRL), and/or the like.

The term "Bayesian optimization" at least in some examples refers to a sequential design strategy for global optimization of black-box functions that does not assume any functional forms.

The term "epoch" at least in some examples refers to one cycle through a full training dataset. Additionally or alternatively, the term "epoch" at least in some examples refers to a full training pass over an entire training dataset such that each training example has been seen once; here, an epoch represents N/batch size training iterations, where N is the total number of examples.

The term "event", in probability theory, at least in some examples refers to a set of outcomes of an experiment (e.g., a subset of a sample space) to which a probability is assigned. Additionally or alternatively, the term "event" at least in some examples refers to a software message indicating that something has happened. Additionally or alternatively, the term "event" at least in some examples refers to an object in time, or an instantiation of a property in an object. Additionally or alternatively, the term "event" at least in some examples refers to a point in space at an instant in time (e.g., a location in spacetime). Additionally or alternatively, the term "event" at least in some examples refers to a notable occurrence at a particular point in time.

The term "experiment" in probability theory, at least in some examples refers to any procedure that can be repeated and has a well-defined set of outcomes, known as a sample space.

The term "feature" at least in some examples refers to an individual measureable property, quantifiable property, or characteristic of a phenomenon being observed. Additionally or alternatively, the term "feature" at least in some examples refers to an input variable used in making predictions. At least in some examples, features may be represented using numbers/numerals (e.g., integers), strings, variables, ordinals, real-values, categories, and/or the like.

The term "feature extraction" at least in some examples refers to a process of dimensionality reduction by which an initial set of raw data is reduced to more manageable groups for processing. Additionally or alternatively, the term "feature extraction" at least in some examples refers to retrieving intermediate feature representations calculated by an unsupervised model or a pre-trained model for use in another model as an input. Feature extraction is sometimes used as a synonym of "feature engineering."

The term "feature map" at least in some examples refers to a function that takes feature vectors (or feature tensors) in one space and transforms them into feature vectors (or feature tensors) in another space. Additionally or alternatively, the term "feature map" at least in some examples refers to a function that maps a data vector (or tensor) to feature space. Additionally or alternatively, the term "feature map" at least in some examples refers to a function that applies the output of one filter applied to a previous layer. In some embodiments, the term "feature map" may also be referred to as an "activation map".

The term "feature vector" at least in some examples, in the context of ML, refers to a set of features and/or a list of feature values representing an example passed into a model. Additionally or alternatively, the term "feature vector" at least in some examples, in the context of ML, refers to a vector that includes a tuple of one or more features.

The term "inference engine" at least in some examples refers to a component of a computing system that applies logical rules to a knowledge base to deduce new information.

The term "intelligent agent" at least in some examples refers to an a software agent or other autonomous entity which acts, directing its activity towards achieving goals upon an environment using observation through sensors and consequent actuators (i.e. it is intelligent). Intelligent agents may also learn or use knowledge to achieve their goals.

The term"iteration" at least in some examples refers to the repetition of a process in order to generate a sequence of outcomes, wherein each repetition of the process is a single iteration, and the outcome of each iteration is the starting point of the next iteration. Additionally or alternatively, the term "iteration" at least in some examples refers to a single update of a model's weights during training.

The term "loss function" or "cost function" at least in some examples refers to an event or values of one or more variables onto a real number that represents some "cost" associated with the event. A value calculated by a loss function may be referred to as a "loss" or "error". Additionally or alternatively, the term "loss function" or "cost function" at least in some examples refers to a function used to determine the error or loss between the output of an algorithm and a target value. Additionally or alternatively, the term "loss function" or "cost function" at least in some examples refers to a function are used in optimization problems with the goal of minimizing a loss or error.

The term "mathematical model" at least in some examples refer to a system of postulates, data, and inferences presented as a mathematical description of an entity or state of affairs including governing equations, assumptions, and constraints.

The term "machine learning" or "ML" at least in some examples refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained A1/ML models can be chained together in a A1/ML pipeline during inference or prediction generation. Although the term "ML algorithm at least in some examples refers to different concepts than the term "ML model," these terms may be used interchangeably for the purposes of the present disclosure. Furthermore, the term "A1/ML application" or the like at least in some examples refers to an application that contains some A1/ML models and application-level descriptions. ML techniques generally fall into the following main types of learning problem categories: supervised learning, unsupervised learning, and reinforcement learning.

The term "matrix" at least in some examples refers to a rectangular array of numbers, symbols, or expressions, arranged in rows and columns, which may be used to represent an object or a property of such an object.

The term "nondeterministic polynomial time" or "NP" at least in some examples refers to a class of computational decision problems for which any given yes-solution can be verified as a solution in polynomial time by a deterministic Turing machine (or solvable by a non-deterministic Turing machine in polynomial time). The term "NP-hard" at least in some examples refers to a class of problems which are at least as hard as the hardest problems in NP; problems that are NP-hard do not have to be elements of NP and may not even be decidable. The term "NP-complete" at least in some examples refers to a class of decision problems that contains the hardest problems in NP; each NP-complete problem is in NP.

The term "objective function" at least in some examples refers to a function to be maximized or minimized for a specific optimization problem. In some cases, an objective function is defined by its decision variables and an objective. The objective is the value, target, or goal to be optimized, such as maximizing profit or minimizing usage of a particular resource. The specific objective function chosen depends on the specific problem to be solved and the objectives to be optimized. Constraints may also be defined to restrict the values the decision variables can assume thereby influencing the objective value (output) that can be achieved. During an optimization process, an objective function's decision variables are often changed or manipulated within the bounds of the constraints to improve the objective function's values. In general, the difficulty in solving an objective function increases as the number of decision variables included in that objective function increases. The term "decision variable" refers to a variable that represents a decision to be made.

The term "optimization" at least in some examples refers to an act, process, or methodology of making something (e.g., a design, system, or decision) as fully perfect, functional, or effective as possible. Optimization usually includes mathematical procedures such as finding the maximum or minimum of a function. The term "optimal" at least in some examples refers to a most desirable or satisfactory end, outcome, or output. The term "optimum" at least in some examples refers to an amount or degree of something that is most favorable to some end. The term "optima" at least in some examples refers to a condition, degree, amount, or compromise that produces a best possible result. Additionally or alternatively, the term "optima" at least in some examples refers to a most favorable or advantageous outcome or result.

The term "probability" at least in some examples refers to a numerical description of how likely an event is to occur and/or how likely it is that a proposition is true. The term "probability distribution" at least in some examples refers to a mathematical function that gives the probabilities of occurrence of different possible outcomes for an experiment or event.

The term "probability distribution" at least in some examples refers to a function that gives the probabilities of occurrence of different possible outcomes for an experiment or event. Additionally or alternatively, the term "probability distribution" at least in some examples refers to a statistical function that describes all possible values and likelihoods that a random variable can take within a given range (e.g., a bound between minimum and maximum possible values). A probability distribution may have one or more factors or attributes such as, for example, a mean or average, mode, support, tail, head, median, variance, standard deviation, quantile, symmetry, skewness, kurtosis, and/or the like. A probability distribution may be a description of a random phenomenon in terms of a sample space and the probabilities of events (subsets of the sample space). Example probability distributions include discrete distributions (e.g., Bernoulli distribution, discrete uniform, binomial, Dirac measure, Gauss-Kuzmin distribution, geometric, hypergeometric, negative binomial, negative hypergeometric, Poisson, Poisson binomial, Rademacher distribution, Yule-Simon distribution, zeta distribution, Zipf distribution, and/or the like), continuous distributions (e.g., Bates distribution, beta, continuous uniform, normal distribution, Gaussian distribution, bell curve, joint normal, gamma, chi-squared, non-central chi-squared, exponential, Cauchy, lognormal, logit-normal, F distribution, t distribution, Dirac delta function, Pareto distribution. Lomax distribution, Wishart distribution, Weibull distribution, Gumbel distribution, Irwin-Hall distribution, Gompertz distribution, inverse Gaussian distribution (or Wald distribution), Chernoff's distribution, Laplace distribution, Pólya-Gamma distribution, and/or the like), and/or joint distributions (e.g., Dirichlet distribution, Ewens's sampling formula, multinomial distribution, multivariate normal distribution, multivariate t-distribution, Wishart distribution, matrix normal distribution, matrix t distribution, and/or the like).

The term "probability density function" or "PDF" at least in some examples refers to a function whose value at any given sample (or point) in a sample space can be interpreted as providing a relative likelihood that the value of the random variable would be close to that sample. Additionally or alternatively, the term "probability density function" or "PDF" at least in some examples refers to a probability of a random variable falling within a particular range of values. Additionally or alternatively, the term "probability density function" or "PDF" at least in some examples refers to a value at two different samples can be used to infer, in any particular draw of the random variable, how much more likely it is that the random variable would be close to one sample compared to the other sample.

The term "precision" at least in some examples refers to the closeness of the two or more measurements to each other. The term "precision" may also be referred to as "positive predictive value".

The term "sample space" in probability theory (also referred to as a "sample description space" or "possibility space") of an experiment or random trial at least in some examples refers to a set of all possible outcomes or results of that experiment.

The term "search space", in the context of optimization, at least in some examples refers to an a domain of a function to be optimized. Additionally or alternatively, the term "search space", in the context of search algorithms, at least in some examples refers to a feasible region defining a set of all possible solutions. Additionally or alternatively, the term "search space" at least in some examples refers to a subset of all hypotheses that are consistent with the observed training examples. Additionally or alternatively, the term "search space" at least in some examples refers to a version space, which may be developed via machine learning.

The term "stochastic" at least in some examples refers to a property of being described by a random probability distribution. Although the terms "stochasticity" and "randomness" are distinct in that the former refers to a modeling approach and the latter refers to phenomena themselves, for purposes of the present disclosure these two terms may be used synonymously unless the context indicates otherwise.

The term "vector" at least in some examples refers to a one-dimensional array data structure. Additionally or alternatively, the term "vector" at least in some examples refers to a tuple of one or more values called scalars.

The term "service level agreement" or "SLA" at least in some examples refers to a level of service expected from a service provider. At least in some examples, an SLA may represent an entire agreement between a service provider and a service consumer that specifies one or more services is to be provided, how the one or more services are to be provided or otherwise supported, times, locations, costs, performance, priorities for different traffic classes and/or QoS classes (e.g., highest priority for first responders, lower priorities for non-critical data flows, and the like), and responsibilities of the parties involved.

The term "service level objective" or "SLO" at least in some examples refers to one or more measurable characteristics, metrics, or other aspects of an SLA such as, for example, availability, throughput, frequency, response time, latency, QoS, QoE, and/or other like performance metrics/measurements. At least in some examples, a set of SLOs may define an expected service (or an service level expectation (SLE)) between the service provider and the service consumer and may vary depending on the service's urgency, resources, and/or budget.

The term "service level indicator" or "SLI" at least in some examples refers to a measure of a service level provided by a service provider to a service consumer. At least in some examples, SLIs form the basis of SLOs, which in turn, form the basis of SLAs. Examples of SLIs include latency (including end-to-end latency), throughout, availability, error rate, durability, correctness, and/or other like performance metrics/measurements. At least in some examples, term "service level indicator" or "SLI" can be referred to as "SLA metrics" or the like.

The term "service level expectation" or "SLE" at least in some examples refers to an unmeasurable service-related request, but may still be explicitly or implicitly provided in an SLA even if there is little or no way of determining whether the SLE is being met. At least in some examples, an SLO may include a set of SLIs that produce, define, or specify an SLO achievement value. As an example, an availability SLO may depend on multiple components, each of which may have a QoS availability measurement. The combination of QoS measures into an SLO achievement value may depend on the nature and/or architecture of the service.

The term "scheduling algorithm", "scheduling policy", or "scheduling discipline" at least in some examples refers to an algorithm used for distributing resources among entities that request them, where the requests for resources may be simultaneous and/or asynchronous.

The term "proportional-fair scheduling" at least in some examples refers to a compromise-based scheduling algorithm that attempts to maintain a balance between maximizing a total throughput of a network while allowing all users at least a minimal level of service.

The term "round-robin scheduling" at least in some examples refers to a scheduling algorithm that uses time-sharing or time slots for allocating resources in a round-robin fashion.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and/or the like). Furthermore, various standards (e.g, 3GPP, ETSI, and/or the like) may define various message formats, PDUs, containers, frames, and/or the like, as comprising a sequence of optional or mandatory data elements (DEs), data frames (DFs), information elements (IEs), and/or the like. However, it should be understood that the requirements of any particular standard should not limit the examples discussed herein, and as such, any combination of containers, frames, DFs, DEs, IEs, values, actions, and/or features are possible in various examples, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. An apparatus, comprising:

memory circuitry to store instructions for operating an intelligent network slice manager; and processor circuitry connected to the memory circuitry, wherein the processor circuitry is to execute the instructions to:

collect network performance measurements from one or more data sources;

generate or update a network slice configuration based on service level agreements (SLAs) for a network slice, the collected network performance measurements, and one or more machine models that are to utilize the collected network performance measurements, wherein the network slice configuration includes a set of network slice parameters that define how a portion of allocated radio resources are to be prioritized for the network slice; and send the network slice configuration to a distributed unit (DU), wherein the network slice configuration instructs the DU to provide the network slice according to the set of network slice parameters.

2. The apparatus of claim 1, wherein the network performance measurements include radio access network (RAN) performance metrics, and the processor circuitry is to execute the instructions to:

receive the RAN performance measurements over a RAN performance monitoring interface, wherein the RAN performance measurements include one or more of per flow physical resource block (PRB) utilization level measurements, per UE physical layer (PHY) rate, slice traffic volume, data radio bearers (DRB) traffic volume, latency measurements, delay violation rate, and throughput measurements.

3. The apparatus of claim 1, wherein the network slice configuration includes a data flow handling configuration, and the data flow handling configuration includes one or more of parameters for performing packet duplication, parameters for performing semi-persistent scheduling, and parameters for performing grant-free scheduling.

4. The apparatus of claim 1, wherein the network slice configuration includes a per-slice radio resource configuration.

5. The apparatus of claim 4, wherein the per-slice radio resource configuration is a radio resource management (RRM) policy information object class (IOC), and the RRM policy IOC includes one or more of:

a resource type attribute and an RRM policy member list attribute, wherein the resource type attribute includes a type of resources to be used for the network slice and the RRM policy member list attribute includes a set of RRM policy members that are subject to the per-slice radio resource configuration;

a shared resources attribute, and the shared resources attribute includes resources that can be shared with network slices or other users outside of the set of RRM policy members in the RRM policy member list attribute;

a prioritized resources attribute, and the prioritized resources attribute includes resources that are preferentially used by members of the set of RRM policy members in the RRM policy member list attribute;

a dedicated resources attribute, and the dedicated resources attribute includes resources that are dedicated for use by members of the set of RRM policy members in the RRM policy member list attribute;

a maximum ratio attribute that defines a maximum resource usage quota for the members of the set of RRM policy members, a minimum ratio attribute that defines a minimum resource usage quota for the members of the set of RRM policy members, and a dedicated ratio attribute that defines dedicated resource usage quota for the members of the set of RRM policy members.

6. The apparatus of claim 5, wherein the network slice configuration includes one or more of a slice priority configuration, an SLA target or quality of service (QOS) target, and a data flow handling configuration.

7. The apparatus of claim 1, wherein the SLAs are based on one or more of a latency bound, a reliability target, and a set of QoS parameters.

8. The apparatus of claim 1, wherein the processor circuitry is to execute the instructions to:

estimate an average rate per resource unit per scheduling unit ("R") based on the collected network performance measurements; and determine a resource ratio and time window based on the estimated R.

9. The apparatus of claim 8, wherein, to estimate the R, the processor circuitry is to execute the instructions to:

perform a lookup operation on a lookup table, wherein the lookup table maps one or more network performance measurements to respective modulation and coding schemes (MCSs), wherein the one or more network performance measurements in the lookup table include signal-to-interference-and-noise-ratio (SINR) and block error rate (BLER) such that a set of an SINR and a BLER corresponds to at least one MCS in the lookup table.

10. The apparatus of claim 9, wherein the lookup table is generated using the one or more machine learning models.

11. The apparatus of claim 8, wherein, to estimate the R, the processor circuitry is to execute the instructions to:

operate a trained machine learning model to predict the estimated R based on the collected network performance measurements.

12. The apparatus of claim 8, wherein the processor circuitry is to execute the instructions to:

determine the resource ratio based on the time window, a payload size, and the estimated R when the network slice is a deterministic traffic network slice; and determine the resource ratio based on a guaranteed bit rate and the estimated R when the network slice is a non-deterministic traffic network slice.

13. The apparatus of claim 1, wherein the intelligent network slice manager is implemented as:

an xApp implemented by a Near-Real-Time (RT) RAN Intelligent Controller (RIC) in an O-RAN framework;

an rApp implemented by a Non-RT RIC in the O-RAN framework;

a Multi-Access Edge Computing (MEC) application in a MEC framework;

a RAN management function in a centralized unit (CU) of a 3GPP next generation (NG)-RAN;

a RAN management function in a distributed unit (DU) of the 3GPP NG-RAN; or a Zero-touch System Management (ZSM) application in a ZSM framework.

* * * * *